United States Patent [19]
Kumagai et al.

[11] Patent Number: 6,108,714
[45] Date of Patent: *Aug. 22, 2000

[54] APPLICATION PROGRAM GROUPING METHOD AND APPARATUS

[75] Inventors: Yoshitomo Kumagai; Hitoshi Chida, both of Yokohama, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/630,595

[22] Filed: Apr. 11, 1996

[30] Foreign Application Priority Data

Jun. 20, 1995 [JP] Japan ................................. 7-153461

[51] Int. Cl.⁷ ........................... G06F 9/46; G06F 15/163; G06F 3/00; G06F 13/00
[52] U.S. Cl. ............................................. 709/310; 345/346
[58] Field of Search ..................................... 395/680, 356, 395/335, 340, 346, 650; 709/300, 310–332; 345/346; 364/498

[56] References Cited

U.S. PATENT DOCUMENTS

| | | | |
|---|---|---|---|
| 5,175,854 | 12/1992 | Cheung | 395/650 |
| 5,404,534 | 4/1995 | Foss | 709/300 |
| 5,418,728 | 5/1995 | Yada | 364/468 |
| 5,423,043 | 6/1995 | Fitzpatrick et al. | 395/700 |
| 5,564,002 | 10/1996 | Brown | 395/155 |
| 5,572,649 | 11/1996 | Elliott et al. | 395/340 |
| 5,615,326 | 3/1997 | Orton et al. | 395/356 |
| 5,634,019 | 5/1997 | Koppolu et al. | 395/335 |
| 5,694,561 | 12/1997 | Malamud et al. | 395/346 |

FOREIGN PATENT DOCUMENTS

| | | |
|---|---|---|
| 0 380 211 | 8/1990 | European Pat. Off. . |
| 0 567 699 | 11/1993 | European Pat. Off. . |
| 94/14115 | 6/1994 | WIPO . |

*Primary Examiner*—Majid Banankhah
*Assistant Examiner*—P. Caldwell
*Attorney, Agent, or Firm*—Staas & Halsey LLP

[57] ABSTRACT

The present invention relates to an application program grouping method which specifies a group in a multi-window system, where the group is a combination of application programs which carry out a process by linking with each other, and the multi-window system is capable of simultaneously executing in parallel a plurality of application programs respectively having one or a plurality of conversational or interactive windows that are displayed on a display. The application program grouping method includes the steps of (a) specifying at least two application programs which are to belong to one group, and (b) carrying out a grouping process which automatically generates one group made up of the specified application programs.

24 Claims, 57 Drawing Sheets

FIG. 18A

| SELECTION |
|---|
| UNDEFINED |

FIG. 18B

| SELECTION CANCEL |
|---|

FIG. 18C

| LINK CANCEL |
|---|

FIG. 18D

| PAIRING |
|---|
| COLOR OF FRAME |
| APPLICATION A |
| APPLICATION B |

FIG. 18E

| GROUPING |
|---|
| COLOR OF FRAME |
| No. OF APPLICATIONS (=n) |
| APPLICATION 1 |
| APPLICATION 2 |
| APPLICATION n |

FIG. 18F

| LINK DELETION |
|---|
| (DELETE) APPLICATION |

FIG. 50
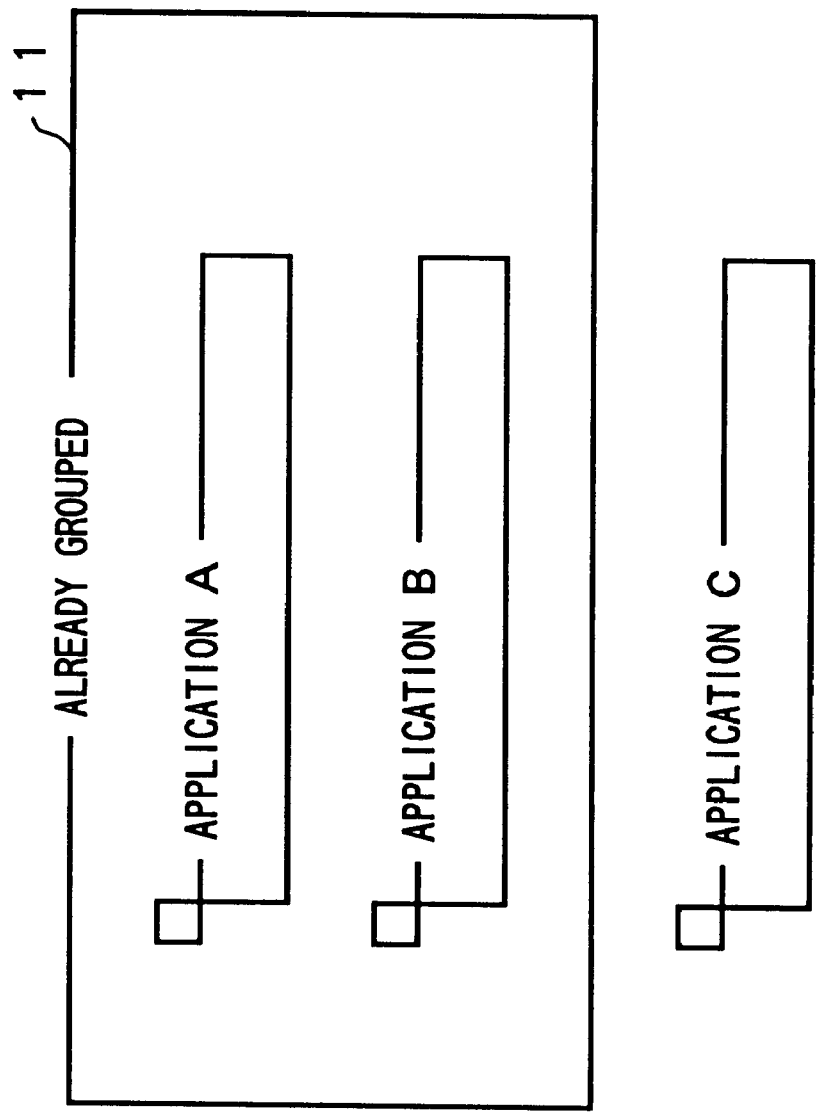
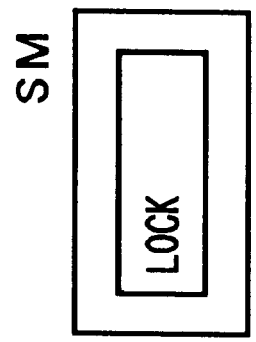

EXISTING APPLICATIONS
(ALREADY GROUPED)

APPLICATIONS STARTED AFTER SELECTING
NEW GROUP TYPE AUTO GROUPING FUNCTION

APPLICATION PROGRAM GROUPING METHOD AND APPARATUS

BACKGROUND OF THE INVENTION

The present invention generally relates to application program grouping methods and apparatuses, and more particularly to an application program grouping method and an application program grouping apparatus which dynamically specify a combination or group of application programs which carry out a process by linking the application programs in a multi-window system which can simultaneously execute, in parallel, a plurality of application programs having conversational or interactive windows.

In the multi-window system, it is possible to simultaneously execute, in parallel, a plurality of application programs (hereinafter simply referred to as "applications") which have mutually independent formats. In such a multi-window system, a process is often carried out by linking the applications. In this specification, the process which is carried out by linking the applications will be referred to as an "inter-application link".

A circuit design is one example of the process which is carried out using the multi-window system. In this case, various applications are employed, including an application which inputs a circuit diagram that becomes the basis of the circuit to be designed, an application which edits the circuit construction on the input circuit diagram, an application which obtains characteristics of the circuit to be designed by simulation, and the like. By the inter-application link of such applications, it is possible to design the circuit while confirming the performance or the like of the circuit by simulation. More particularly, when an operator specifies a terminal on the circuit diagram while editing the circuit construction which is input and displayed, for example, it becomes possible to display a signal waveform obtained at the specified terminal.

The following two methods are conceivable as an application grouping method which specifies the combination of the applications which carry out the inter-application link.

According to a first conceivable application grouping method, a parent application which is common to the applications is made in order to specify the applications to be linked. Hence, each application is started from the parent application, and the linking applications are managed by the parent application. FIG. 1 shows a case where a parent application P is common to applications A and B. If the applications A and B are to be linked in FIG. 1, the application A or B to be linked to the other is specified via the parent application P.

On the other hand, according to a second conceivable application grouping method, the applications to be linked can be started independently, and the application to be linked to another is specified by an application name. FIG.2 shows a case where the application A can start the applications B having the same application name by specifying the application name.

But according to the first conceivable application grouping method described above, it is necessary to make the common parent application in order to carry out the inter-application link. For this reason, if a child application to be linked is newly made or an operating environment of the child application changes, for example, it becomes necessary to modify a mechanism that is used by the parent application to understand and recognize the child application, and there is a problem in that it is troublesome to make and manage the parent application.

On the other hand, according to the second conceivable application grouping method described above, if a plurality of applications having the same application name are started, a link must be made with respect to all of these applications in order to specify one of these applications, and there is a problem in that time is wasted by message exchanges brought thereby.

Furthermore, suppose that the grouping is to be made such that 2 groups of application pairs having the same inter-application link are formed. If the first conceivable application grouping method is employed in this case, it becomes necessary to make 2 parent applications, and there is a problem in that it is troublesome to make and manage the parent applications. On the other hand, there is a problem in that such 2 groups of application pairs cannot be made by employing the second conceivable application grouping method in this case.

Therefore, both the first and second conceivable application grouping methods described above cannot dynamically specify the combination of the applications which are to make the inter-application link in the multi-window system by a simple operation.

SUMMARY OF THE INVENTION

Accordingly, it is a general object of the present invention to provide a novel and useful application program grouping method and apparatus in which the problems described above are eliminated.

Another and more specific object of the present invention is to provide an application program grouping method and apparatus which can dynamically specify a combination of application programs which are to make an inter-application link in a multi-window system by a simple operation.

Still another object of the present invention is to provide an application program grouping method which specifies a group in a multi-window system, where the group is a combination of application programs which carry out a process by linking with each other, the multi-window system is capable of simultaneously executing in parallel a plurality of application programs respectively having one or a plurality of conversational or interactive windows that are displayed on a display, and the application program grouping method comprises the steps of (a) specifying at least two application programs which are to belong to one group, and (b) carrying out a grouping process which automatically generates one group made up of the specified application programs. According to the application program grouping method of the present invention, the application programs can be linked by a simple operation, and the operation ease is improved. Because the operator does not need to be conscious of the grouping functions, the load on the operator is reduced, thereby making it possible to improve the operation efficiency. Furthermore, there is no need to create a parent application program as in the case of the first conceivable application grouping method described above.

A further object of the present invention is to provide an application program grouping apparatus which specifies a group in a multi-window system, where the group is a combination of application programs which carry out a process by linking with each other, the multi-window system is capable of simultaneously executing in parallel a plurality of application programs respectively having one or a plurality of conversational or interactive windows that are displayed on a display, and the application program grouping apparatus comprises first means for specifying at least two application programs which are to belong to one group, and second means for carrying out a grouping process which automatically generates one group made up of the specified application programs. According to the application program grouping apparatus of the present invention, the application programs can be linked by a simple operation, and the operation ease is improved. Because the operator does not need to be conscious of the grouping functions, the load on the operator is reduced, thereby making it possible to improve the operation efficiency. Furthermore, there is no need to create a parent application program as in the case of the first conceivable application grouping method described above.

Other objects and further features of the present invention will be apparent from the following detailed description when read in conjunction with the accompanying drawings.

BRIEF DESCRIPTION OF THE DRAWINGS

FIGS. 18A through 18F respectively are diagrams for explaining the structure of various messages;

FIG. 50 is a diagram for explaining the pairing/grouping cancel prohibit function;

DESCRIPTION OF THE PREFERRED EMBODIMENTS

First, a description will be given of a first embodiment of an application grouping method according to the present invention, by referring to FIGS. 3 through 43.

Figure 1:
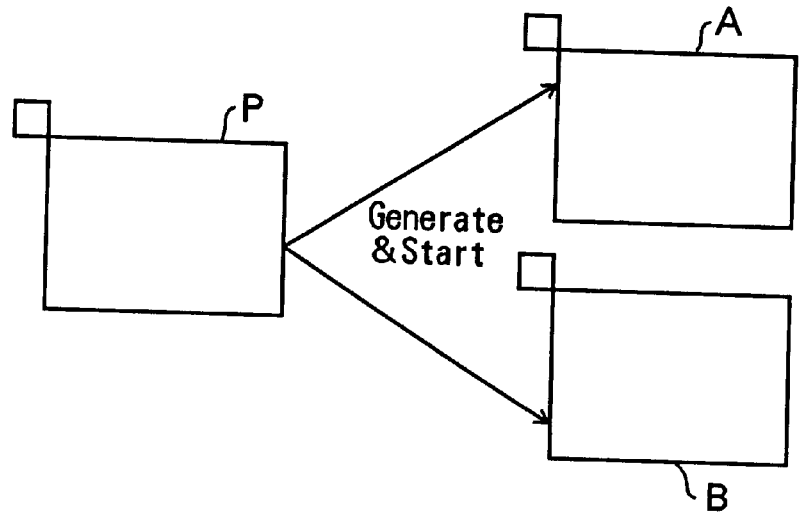
FIG. 1 is a diagram for explaining a first conceivable application grouping method.
Figure 2:
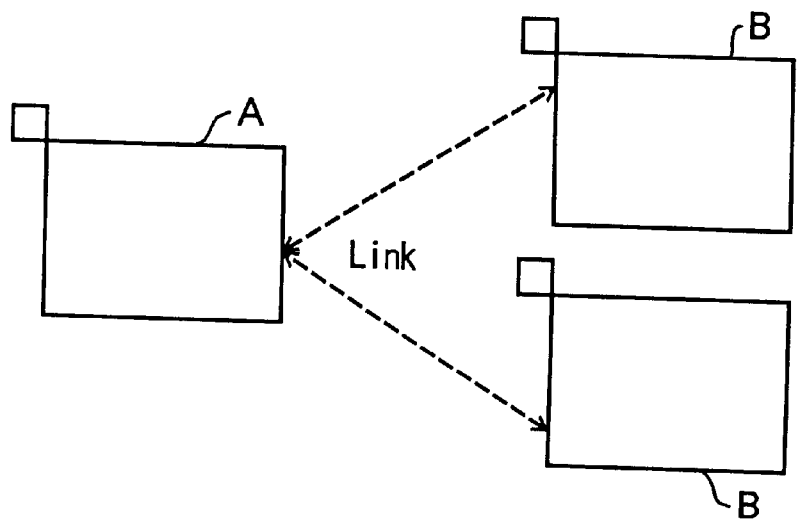
FIG. 2 is a diagram for explaining a second conceivable application grouping method.
Figure 3:
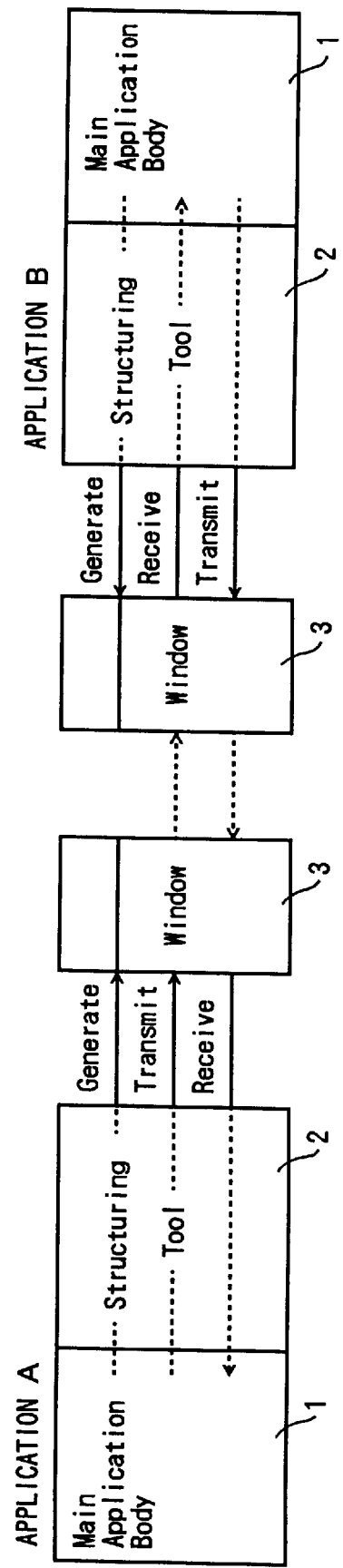
FIG. 3 is a diagram for explaining a first embodiment of an application grouping method according to the present invention.

In this embodiment, application programs (hereinafter simply referred to as "applications) A and B are linked using a common conversational or interactive window system structuring tool 2 as shown in FIG. 3. Each of the applications A and B is made up of a main application body 1 and the structuring tool 2. The structuring tool 2 includes a generating function which generates an application window 3, a communicating function which communicates between the applications A and B, and a describing function which describes a grouping of applications using the communicating function. More particularly, the describing function in this embodiment is a function of changing a display format, such as changing the background color within the application window 3 and changing a frame color of the application window 3. When changing the display format, the method of changing the frame color of the application window 3 is particularly preferable in that a data processing quantity associated with the display format change is small. The main application body 1 generates the application window 3 immediately after the application is started by use of the structuring tool 2. The main application body 1 itself makes a transmission process when a link with another application becomes necessary, and makes a reception process when a link is requested from another application.

In the following description, it will be assumed for the sake of convenience that the plurality of applications which are simultaneously executable in parallel respectively have 1 window. However, each application may of course have a plurality of windows.

Figure 4:
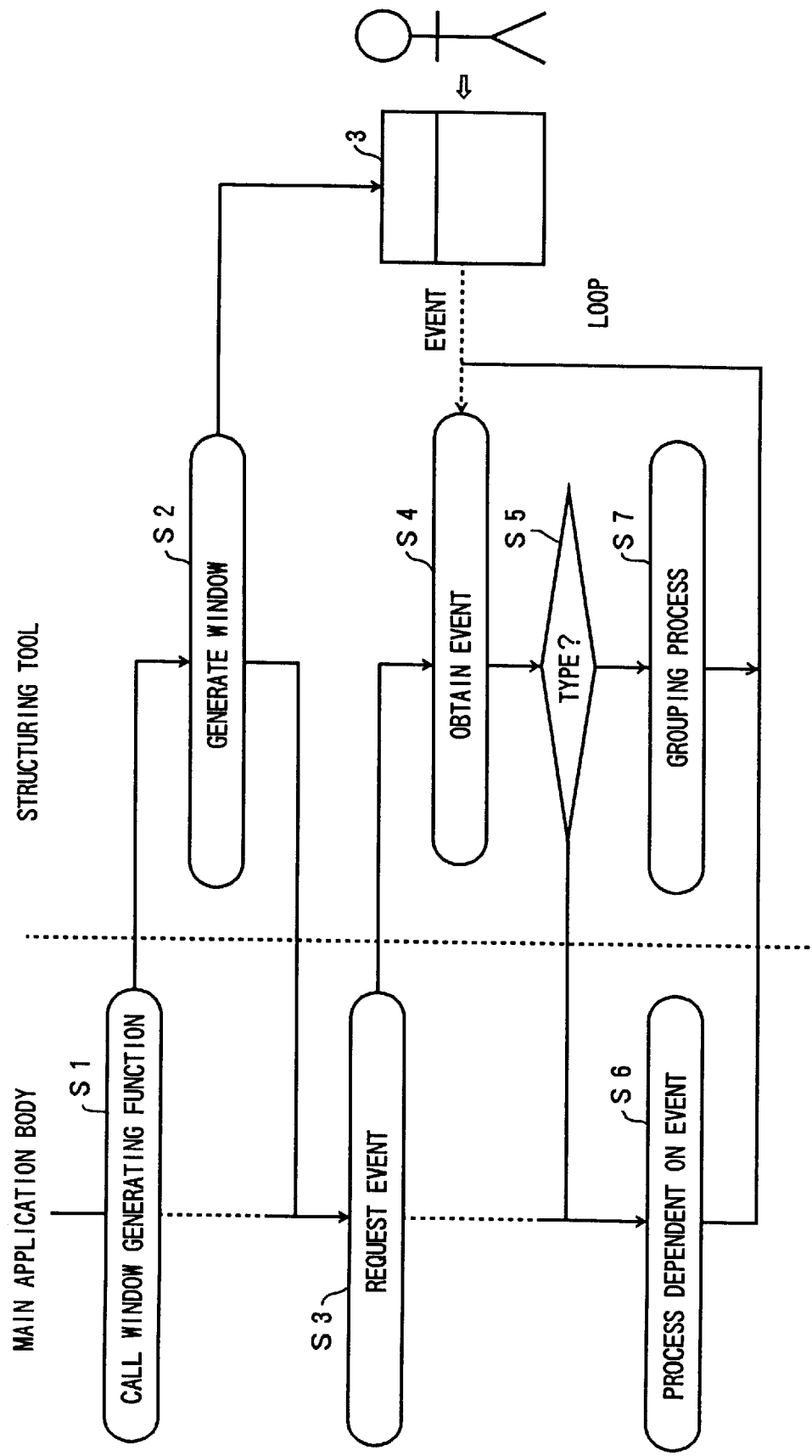
FIG. 4 is a flow chart for explaining processes of a main application body and a structuring tool of each application.

FIG. 4 is a flow chart for explaining processes of the main application body 1 and the structuring tool 2 in each of the applications A and B. In FIG. 4, the main application body 1 calls a window generating function in a step S1. In response to the step S1, the structuring tool 2 generates the application window 3 in a step S2. When the application window is generated, the main application body 1 requests an event in a step S3, and the structuring tool 2 obtains an event based on an input instruction made by an operator in a step S4. In addition, the structuring tool 2 discriminates the kind of the obtained event in a step S5, and the main application body 1 and the structuring tool 2 carry out processes depending on the discriminated kind of describes a grouping of applications using the event. In other words, the main application body 1 carries out a process dependent on the kind of event in a step S6, and the structuring tool 2 carries out a grouping process in a step S7.

In this embodiment, the function of carrying out the grouping process is structured in an application which is called a system manager which manages operating states of all applications, so that the grouping of the applications can be made freely and dynamically after the application is started. Grouping information obtained in the system manager is notified to each application as a message. At each application, it is possible to recognize the application which is grouped therewith by receiving the message, that is, recognize the application to which the inter-application link is made. When the applications need to be linked, the linking is made in accordance with the message, that is, grouping information. As a result, the grouping for carrying out the inter-application link becomes flexible, and the operation ease of the system as a whole is improved.

Figure 5:
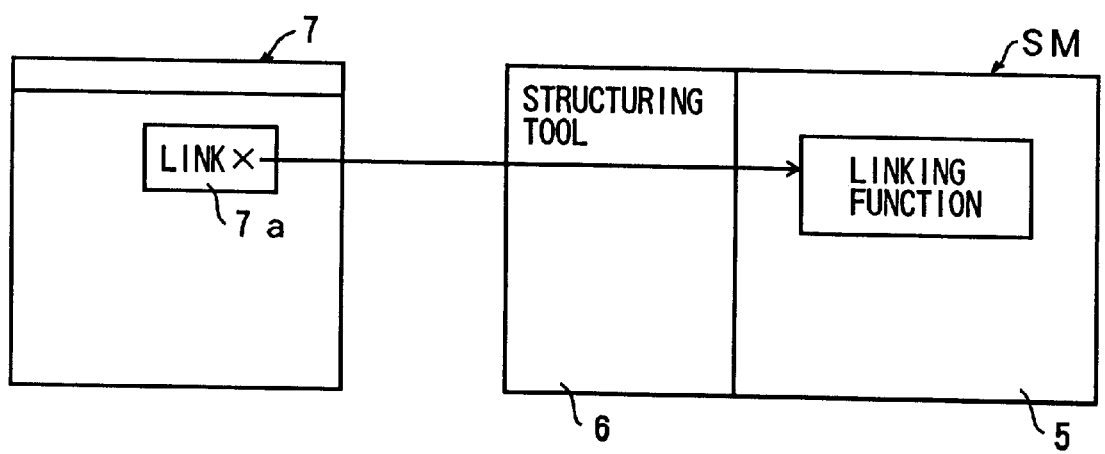
FIG. 5 is a diagram for explaining a system manager.

FIG. 5 is a diagram for explaining the system manager. In FIG. 5, a system manager SM includes a main system manager body 5 and a structuring tool 6. A command button 7a for starting the linking function is provided in a window 7 of the system manager SM. The main system manager body 5 of the system manager SM starts a linking process when the command button 7a is manipulated.

The inter-application linking function for carrying out the inter-application link generally includes a pairing function, a grouping function, and a pairing/grouping cancel function. The pairing function forms a pair by selecting 2 applications (windows) which are to be linked. Hence, in the case of the circuit design described above, the 2 applications selected by the pairing function correspond to a circuit arrangement program and a wiring program, for example. The grouping function forms a group by selecting a plurality of applications (windows) which are to be linked. In the case of the circuit design described above, the applications selected by the grouping function correspond to the circuit arrangement program, the wiring program and a signal delay time calculation program, for example. The pairing corresponds to a special case of the grouping, and the pairing and the grouping are the same when the number of selected applications (windows) is 2. On the other hand, the pairing/grouping cancel function cancels the pairing or grouping.

Figure 6:
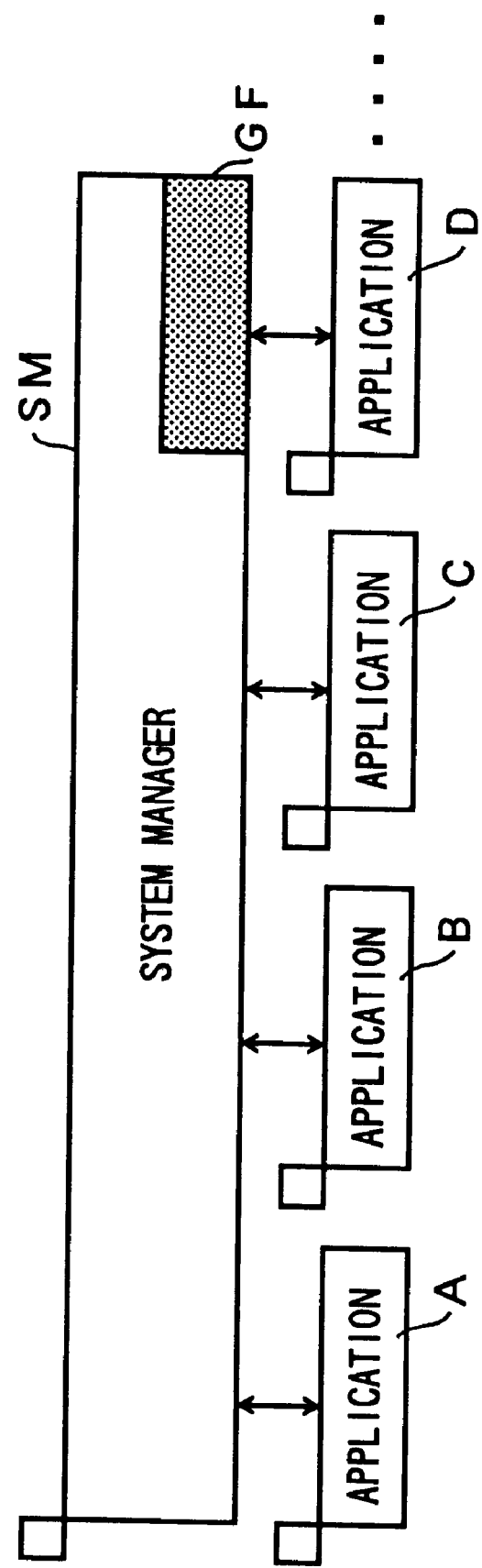
FIG. 6 is a diagram for explaining a grouping function.

A grouping function GF which includes the pairing function described above is structured in the system manager SM which manages the operating states of all applications A, B, C, D, . . . , as shown in FIG. 6. The grouping function GF can independently start the applications A, B, C, D. , , , .

A command button provided in the window 7 of the system manager SM is manipulated when selecting a command of the system manager SM for carrying out the grouping. The grouping function GF is selected by this manipulation of the command button. The method of selecting the command by manipulating the command button is different between the case where the pairing function is realized to group 2 applications and the case where the grouping function is realized to group 3 or more application, so as to facilitate the grouping operation and also make the grouping operation user-friendly.

Figure 7A:
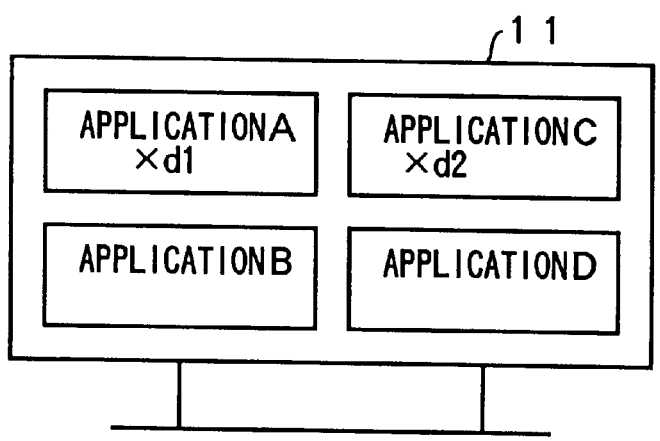
FIGS. 7A and 7B respectively are diagrams for explaining the manipulation of a command button when selecting a pairing command.
Figure 7B:
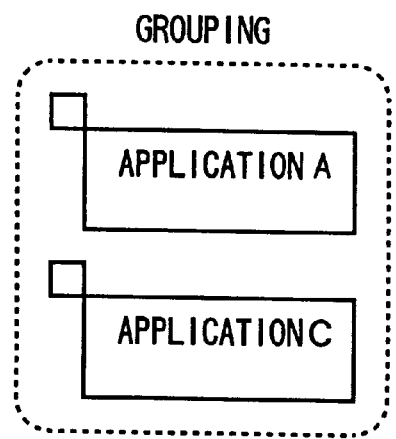

FIGS. 7A and 7B are diagrams for explaining the manipulation of the command button when selecting the pairing command. FIG. 7A shows title parts of the applications A through D displayed on a display 11 of the system, and FIG.

7B shows the applications A and C which are grouped by the manipulation of the command button. The display 11 shown in FIG. 7A displays the title parts of the 4 applications A through D, and when the operator selects title parts d1 and d2 of the 2 applications A and C, for example, command buttons corresponding to these title parts d1 and d2 are manipulated. As a result, a pairing is completed between the 2 selected applications A and C as shown in FIG. 7B.

Figure 8A:
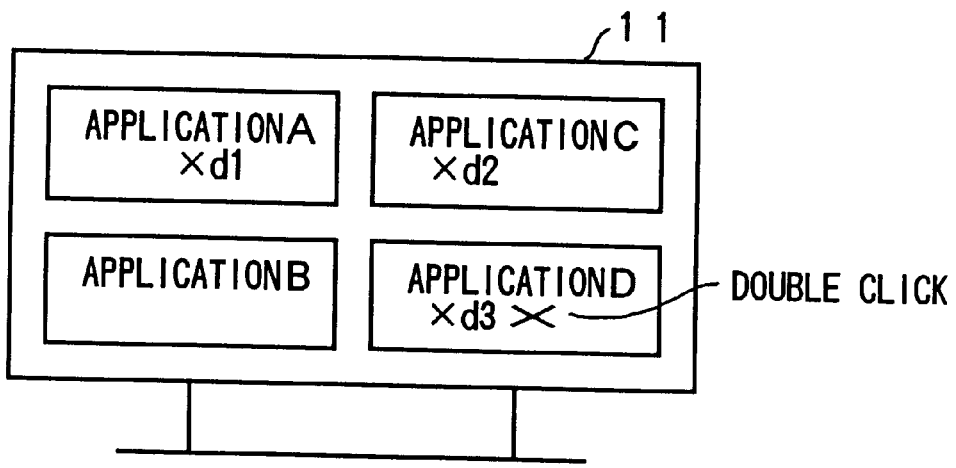
FIGS. 8A and 8B respectively are diagrams for explaining the manipulation of the command button when selecting a grouping command.
Figure 8B:
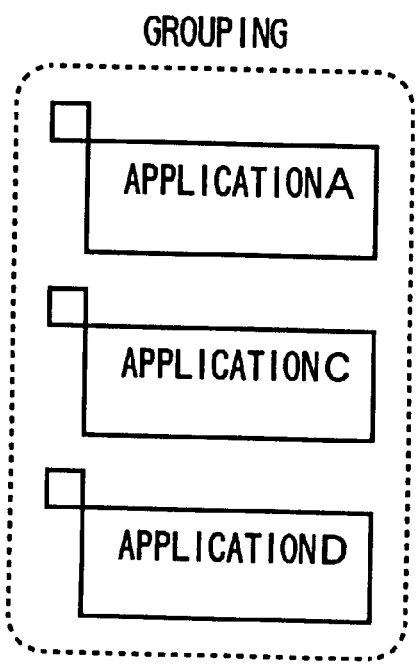

FIGS. 8A and 8B are diagrams for explaining the manipulation of the command button when selecting the grouping command. FIG. 8A shows title parts of the applications A through D displayed on a display 11 of the system, and FIG. 8B shows the applications A, C and D which are grouped by the manipulation of the command button. The display 11 shown in FIG. 8A displays the title parts of the 4 applications A through D, and when the operator selects title parts d1, d2 and d3 of the 3 applications A, C and D, for example, command buttons corresponding to these title parts d1, d2 and d3 are manipulated. As a result, a grouping is completed among the 3 selected applications A, C and D as shown in FIG. 8B.

When selecting the pairing or grouping command, the title part of the application can be selected by clicking the title part by a pointing device, for example. In this case, it is possible to discriminate the pairing or grouping and also discriminate the number of applications to be grouped in the case of the grouping, by making a double-click by the pointing device only after selecting the last title part and making a single click (or hit) in the title part when selecting the title part, for example.

Figure 9:
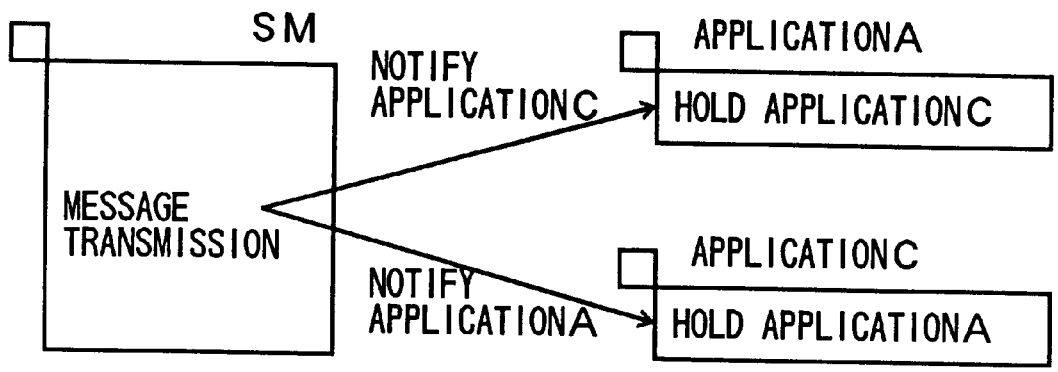
FIG. 9 is a diagram for explaining a message communication during the pairing.

When the pairing shown in FIG. 7B is made, the system manager SM makes a message communication to notify the application A that the application C is the linked application forming the pair with the application A, as shown in FIG. 9. In addition, the system manager SM makes the message communication to notify the application C that the application A is the linked application forming the pair with the application C.

Figure 10:
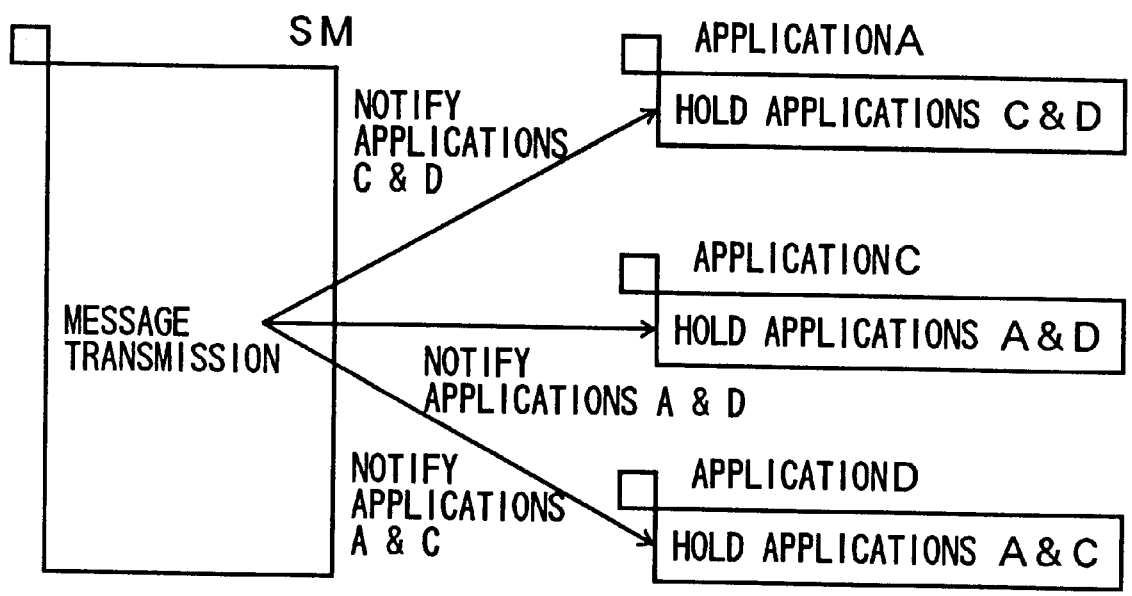
FIG. 10 is a diagram for explaining a message communication during the grouping.

On the other hand, when the grouping shown in FIG. 8B is made, the system manager SM makes a message communication to notify the application A that the applications C and D are the linked applications forming the group with the application A, as shown in FIG. 10. In addition, the system manager SM makes the message communication to notify the application C that the applications A and D are the linked applications forming the group with the application C. Further, the system manager SM makes the message communication to notify the application D that the applications A and C are the linked applications forming the group with the application D.

Figure 11:
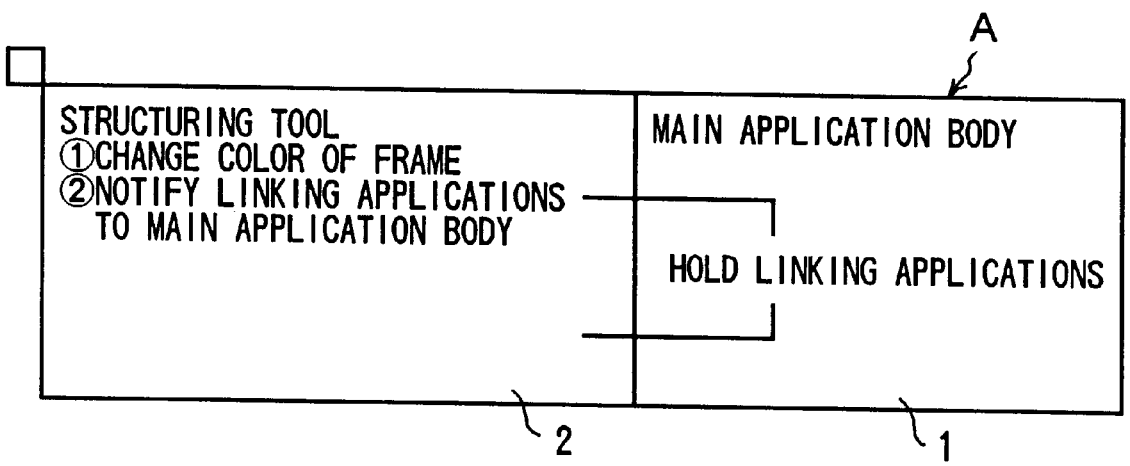
FIG. 11 is a diagram for explaining a process of an application process which receives a notification from the system manager.
Figure 12:
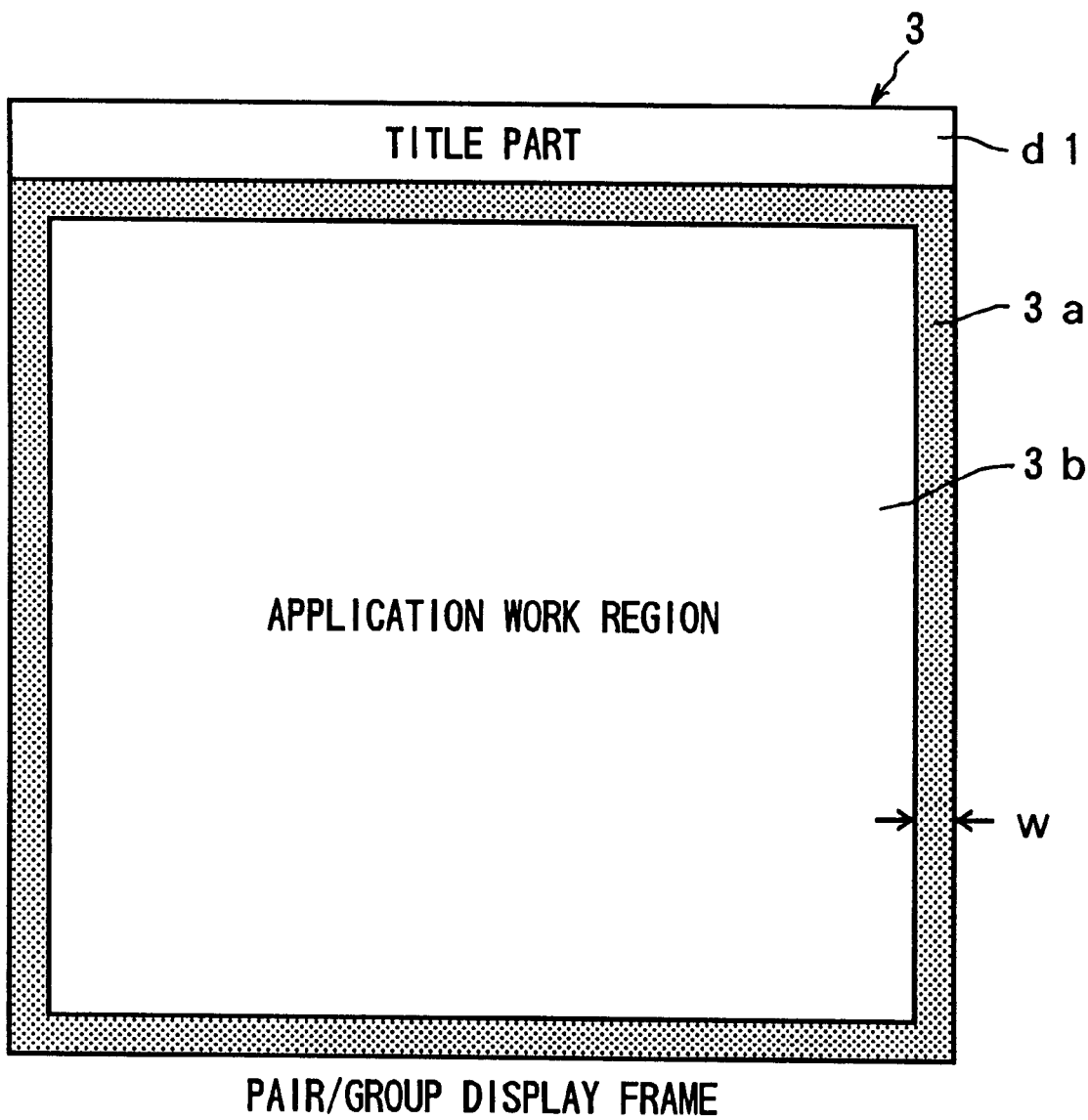
FIG. 12 is a diagram showing an application window.

As shown in FIG. 11, the structuring tool 2 of the application changes the color of the application window 3 into a predetermined color based on a notification from the system manager SM. In the case of the structuring tool 2 of the application A, for example, the structuring tool 2 also notifies to the main application body 1 of the application A the linked applications to which the application A is linked, and also holds the linked applications. The linked applications are the applications C and D in the case of the grouping shown in FIG. 10. As a result, the color of a frame (or box) 3a of the application window 3 shown in FIG. 12 is changed to a predetermined color. A width W of the frame 3a corresponds to several pixels, for example, and in this case, it is indicated that the applications A, C and D are grouped when these applications A, C and D are displayed within the frame 3a having the same color. In FIG. 12, the title part d1 is provided at the top portion of the application window 3, and an application work region 3b which is surrounded by the frame 3a is provided at the bottom portion of the application window 3.

Next, a more detailed description will be given of the pairing function.

Figure 13:
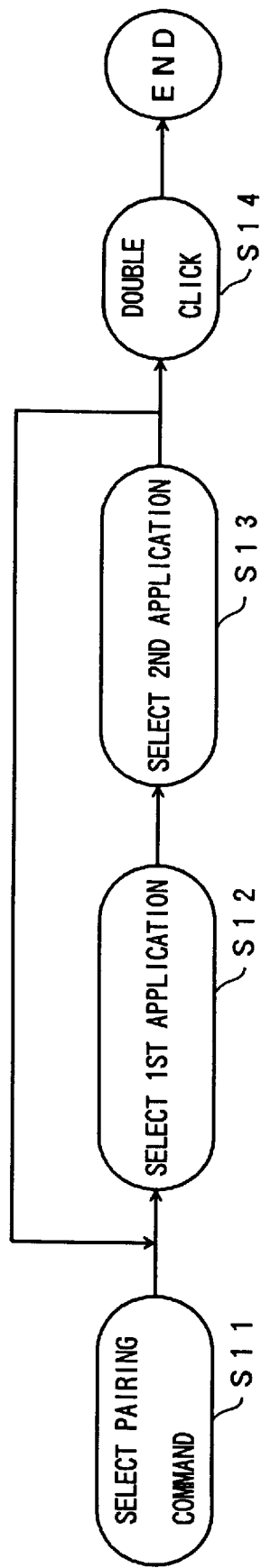
FIG. 13 is a flow chart for explaining the operation of an operator when carrying out the pairing.

FIG. 13 is a flow chart for explaining the operation of the operator when carrying out the pairing. In FIG. 13, the pairing command is selected by the command button in a step S11, and a first application is selected in a step S12. A second application is selected in a step S13. The process ends when a double click is made by the pointing device in a step S14.

Figure 14:
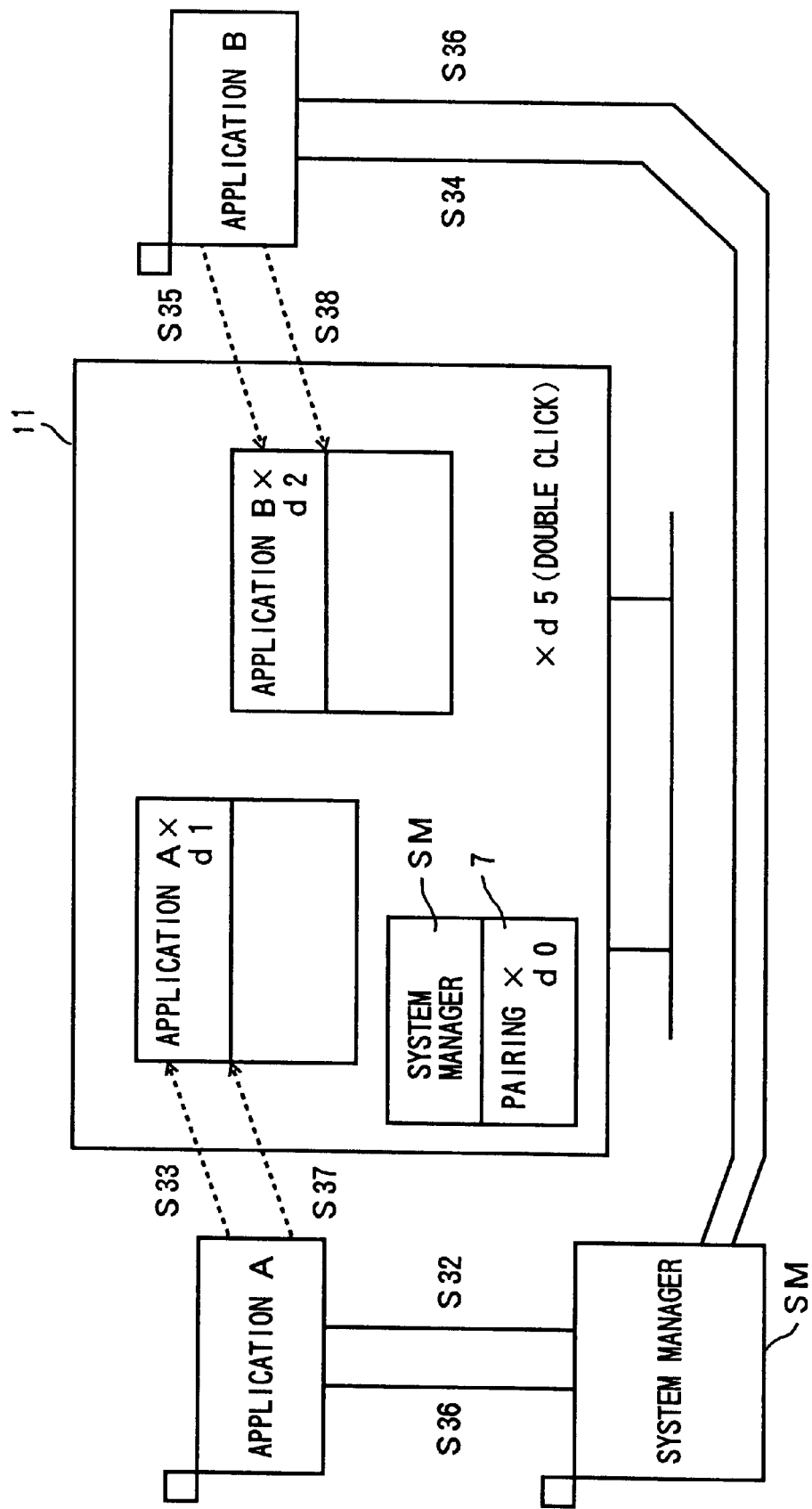
FIG. 14 is a diagram for explaining the operation for the pairing.
Figure 15:
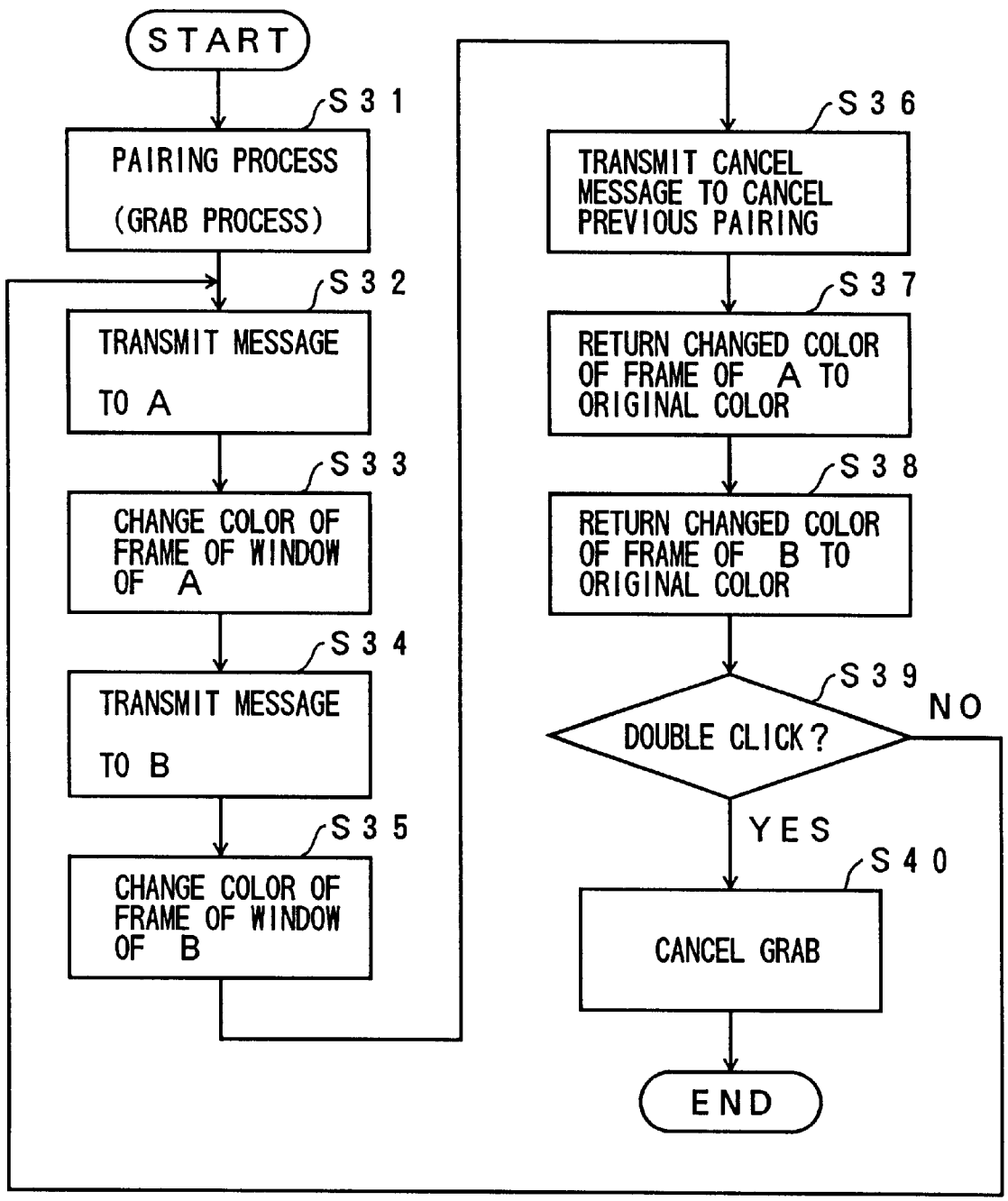
FIG. 15 is a flow chart for explaining a process of a pairing function.

FIG. 14 is a diagram for explaining the operation for the pairing, and FIG. 15 is a flow chart for explaining the process of the pairing function. In FIG. 14, the process flow is indicated by the same reference numerals as in the flow chart of FIG. 15.

In FIGS. 14 and 15, when a pairing button 7-1 within the window 7 of the system manager SM is selected, the system manager SM starts the process of the pairing function which is one of the linking functions in a step S31. In this embodiment, the pairing function uses a grab function of the X-window in order to obtain all events on the display 11. The events in this case are inputs of command buttons corresponding to the title parts d0, d1, d2 and the like which are selected by a mouse (not shown) that is used as the pointing device. The pairing button 7-1 is selected by clicking the mouse at the title part d0.

When the title part d1 of the application A is selected by clicking the mouse, the system manager SM recognizes the application A and makes a message transmission in a step S32, so as to notify the structuring tool 2 of the application A that the application A is selected.

Figure 16:
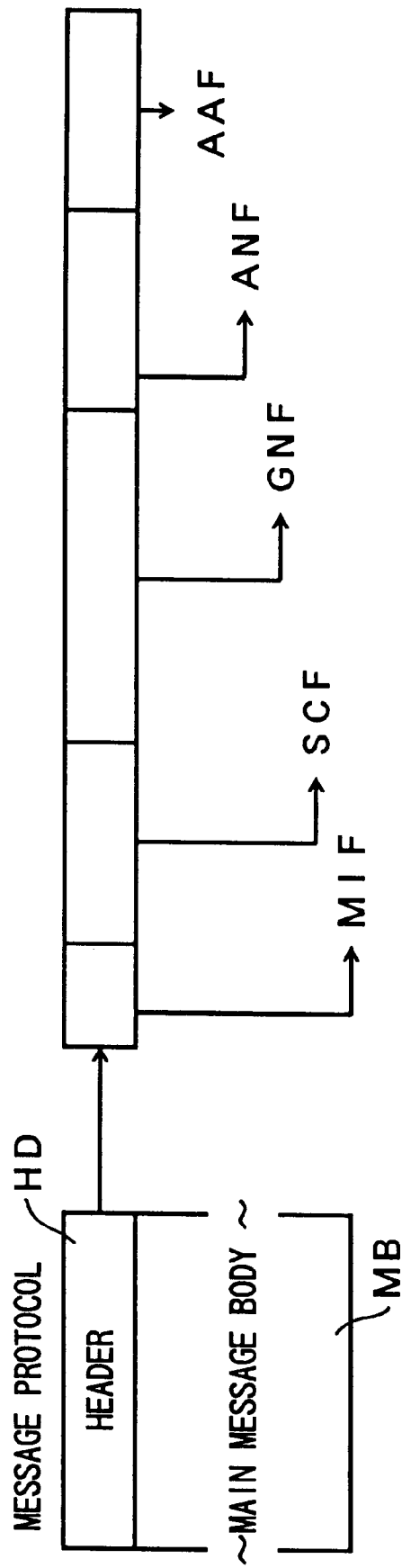
FIG. 16 is a diagram for explaining a message protocol.

FIG. 16 is a diagram for explaining a message protocol. In FIG. 16, a message includes a header HD and a main message body MD. The header HD includes a message identification field MIF which indicates whether the message is a general message or a system message, a system controller field SCF, a group number field GNF which indicates a number assigned to a group of applications which are grouped (or paired), an application number field ANF which indicates a number such as A and B assigned to the application, and an application additional field AAF. For example, when the application number field ANF indicates the number of the application which edits the circuit construction on the circuit diagram or the application which obtains the characteristics of the circuit to be designed, the application additional field AAF indicates whether or not the display of a signal waveform is to be made in the simulation application, for example.

Figure 17:
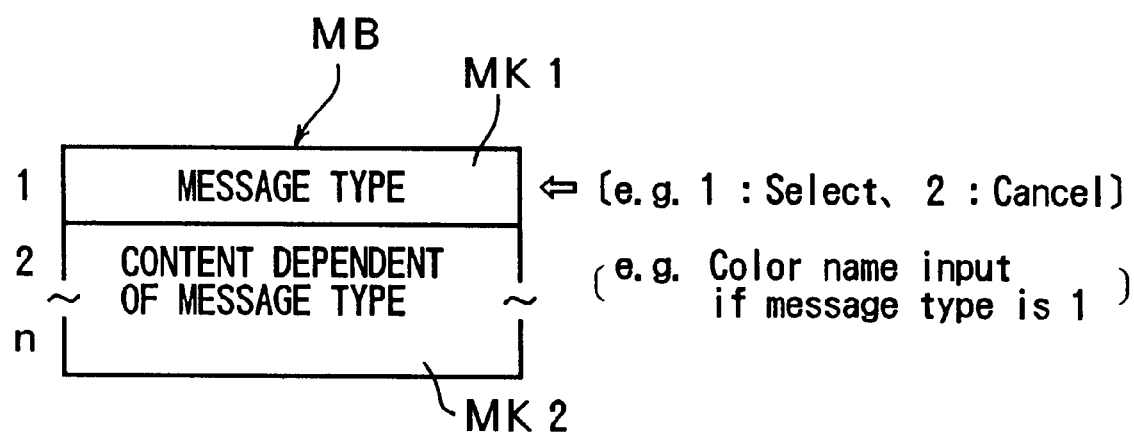
FIG. 17 is a diagram for explaining the structure of a main application message body.

On the other hand, as shown in FIG. 17, the main message body MB includes a message type portion MK1 which indicates the selection, cancellation or the like, and a content portion MK2 which indicates the content depending on the message type such as the color name. The message which is transmitted to the application A in the step S32 described above is a selection message shown in FIG. 18A, for example.

In other words, the system manager SM which manages the pairing and grouping may have a structure that is basically the same as that of each of the applications, and the system manager SM and the ordinary applications are distinguished by the messages which are transmitted thereby. In addition, when carrying out the pairing or grouping, all of the messages are exchanged using the functions within the structuring tools 2 and 6, thereby effectively reducing the load on the system manager SM.

In a step S33, when the structuring tool 2 of the application A receives the selection message, the color of the frame 3a of the window 3 of the application A shown in FIG. 12 is changed to a conspicuous color such as a red color, so as to indicate that the application A is selected.

In a step S34, when the title part d2 of the application B is selected by clicking the mouse, the system manager SM recognizes the application B and makes a message transmission, so as to notify the structuring tool 2 of the application B that the application B is selected. The message that is transmitted to the application B in this case is also the selection message shown in FIG. 18A, for example.

In a step S35, when the structuring tool 2 of the application B receives the selection message, the color of the frame 3a of the window 3 of the application B is changed similarly to the case shown in FIG. 12 so as to indicate that the application B is selected.

In this particular case, 2 windows 3, that is, the 2 applications A and B are selected by the above described steps. Hence, the system manager SM judges that the pairing is specified and completed, and transmits a cancel message shown in FIG. 18B with respect to the structuring tools 2 of the applications A and B in a step S36 so as to cancel the previous pairing selection. In addition, the step S36 also transmits a pairing message shown in FIG. 18D to the structuring tools 2 of the applications A and B to indicate that the applications A and B are paired. The pairing message includes information related to the color of the frame 3a.

When the structuring tool 2 of the application receives the cancel message, the color of the frame 3a that is changed in the step S33 is returned to the original color in a step S37. In addition, the step S37 changes the color of the frame 3a to a color which indicates the pair, and also stores the paired application B which is paired with the application A.

Similarly, when the structuring tool 2 of the application B receives the cancel message, the color of the frame 3a that is changed in the step S35 is returned to the original color in a step S38. In addition, the step S38 changes the color of the frame 3a to a color which indicates the pair, and also stores the paired application A which is paired with the application B.

As a result, the colors of the frames 3a of the windows 2 of the paired applications A and B are both changed to a green color, for example, so that the operator can readily see that the applications A and B are paired. In other words, the color management is made in the system manager SM, and the application has the function of changing the color of the frame 3a to the color transmitted by the pairing message.

In a step S39, the system manager SM decides whether or not a double click of the mouse is made at a position d5 shown in FIG. 14, for example. If the decision result in the step S39 is NO, the process returns to the step S32 so as to specify the next pairing. On the other hand, if the decision result in the step S39 is YES, the system manager SM cancels the grab function described above in a step S40, and the process of the pairing function ends.

The operator may make a manipulation error during the pairing. An exception process is carried out as follows in such a case.

When the operator notices that an erroneous application is selected at the point in time when the step S33 shown in FIG. 15 is carried out, that is, at the time when the first application A to be paired is selected, the erroneous selection is cancelled by re-selecting the application. For example, if the application A is erroneously selected, the structuring tool 2 of the application A receives the cancel message shown in FIG. 18B from the system manager SM and carries out a process of returning the color of the frame 3a that is changed in the step S33 to the original color.

Figure 19:
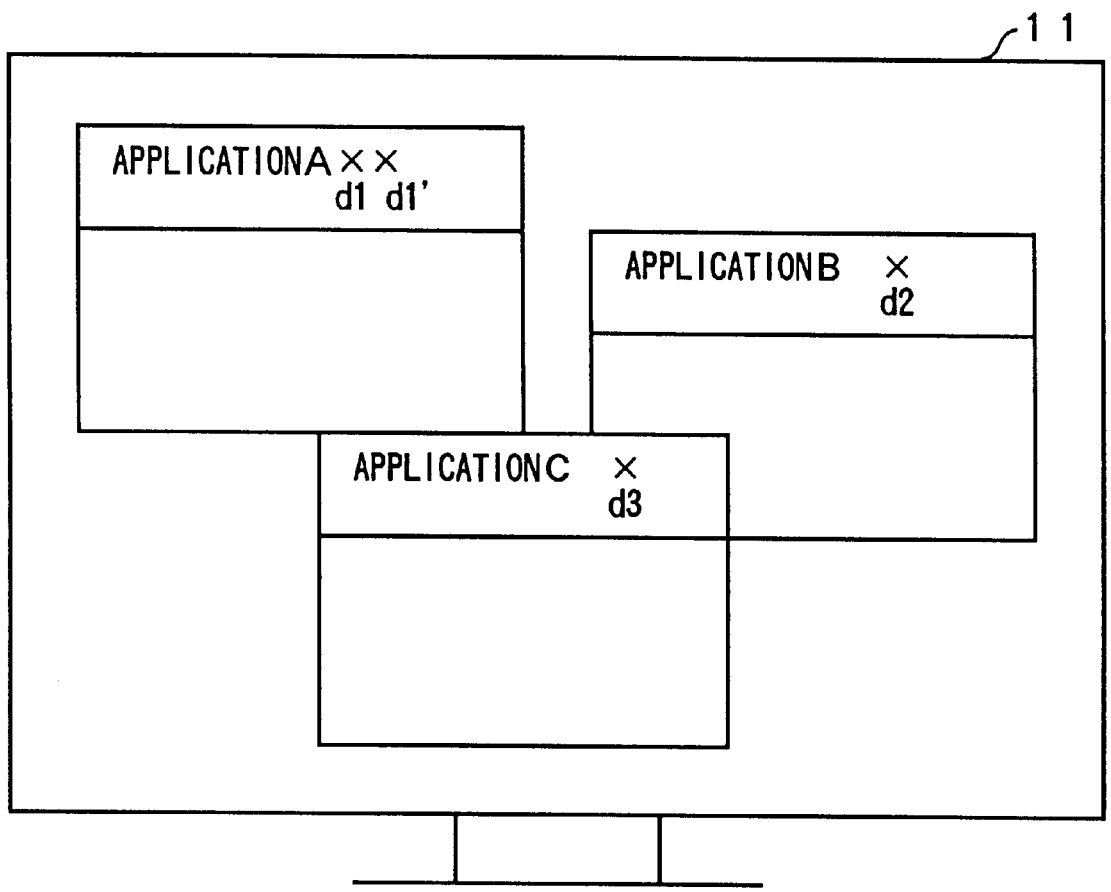
FIG. 19 is a diagram for explaining an exception process during the pairing process.
Figure 20:
FIG. 20 is a diagram for explaining an application selection sequence to explain the exception process during the pairing process.

Accordingly, when the mouse is successively clicked at the title part d1 of the application A, a title part d1' of the application A, the title part d2 of the application B and the title part d3 of the application C in this sequence as shown in FIG. 20, the frame 3a of the window 3 of the application A is displayed with the original color in FIG. 19, and only the frames 3a of the windows 3 of the paired applications B and C are displayed with the same color (for example, green color) in FIG. 19.

When the operator notices that an erroneous application is selected at the point in time when the process of the step S34 shown in FIG. 15 is carried out, that is, at the time when the second application B to be paired is selected, the erroneous application link is cancelled by re-selecting the second application B and the correct first application C. For example, when the first application A is erroneously selected, the applications A and B are linked at the time when the second application B is selected. However, by re-selecting the applications B and C, the structuring tool 2 of the application B transmits a cancel message shown in FIG. 18C to the application A which is selected in the step S32, so as to notify the application A that the application A is cancelled from the pairing with the application B. As a result, a process is carried out to return the color of the frame 3a that is changed in the step S33 to the original color.

Figure 21:
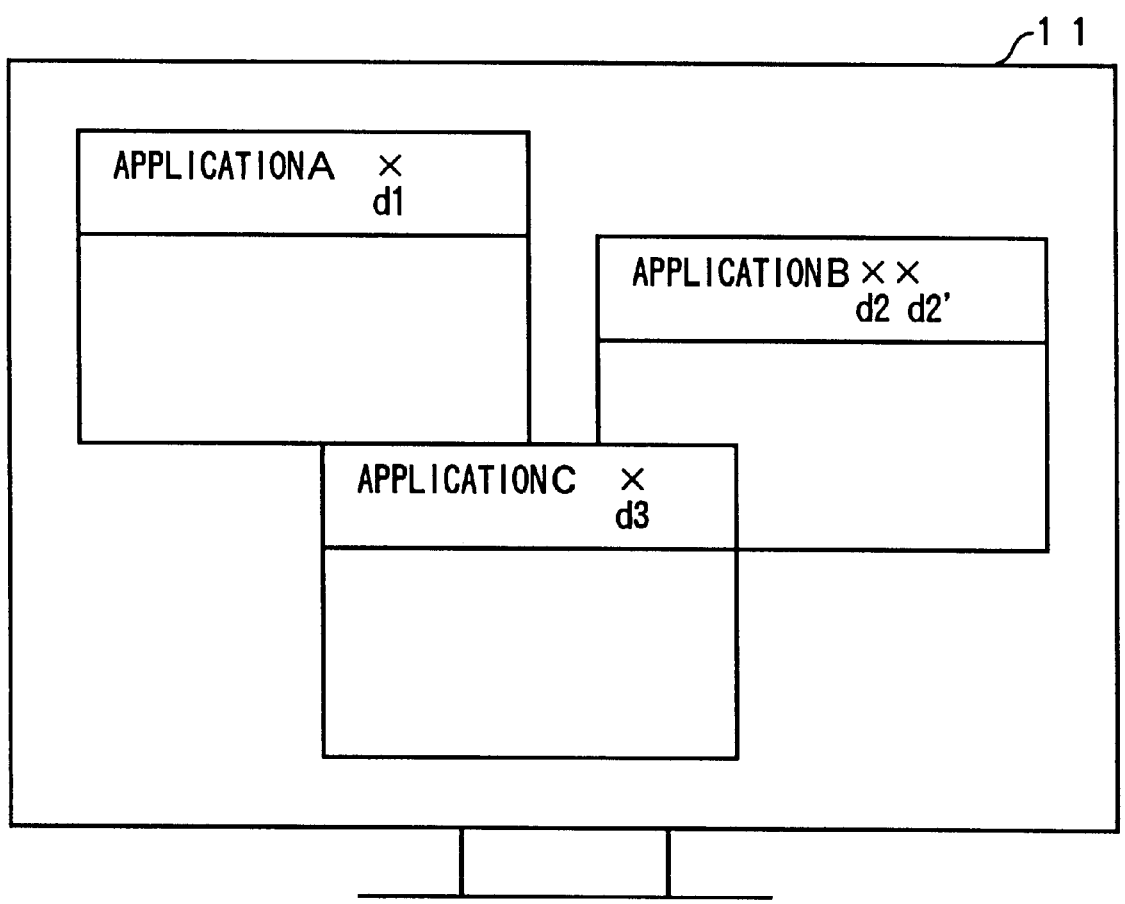
FIG. 21 is a diagram for explaining the exception process during the pairing process.
Figure 22:
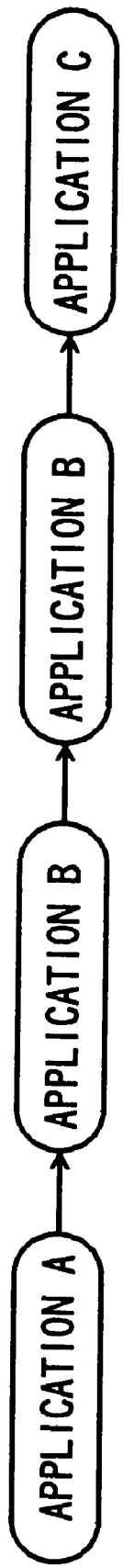
FIG. 22 is a diagram for explaining the application selection sequence to explain the exception process during the pairing process.

Therefore, when the mouse is successively clicked at the title part d1 of the application A, the title part d2 of the application B, a title part d2' of the application B and the title part d3 of the application C in this sequence as shown in FIG. 22, the frame 3a of the window 3 of the application A is displayed with the original color in FIG. 21, and only the frames 3a of the windows 3 of the paired applications B and C are displayed with the same color (for example, green color) in FIG. 21.

Next, a description will be given of a pairing cancel function which cancels the link of the applications which are already paired.

Figure 23:
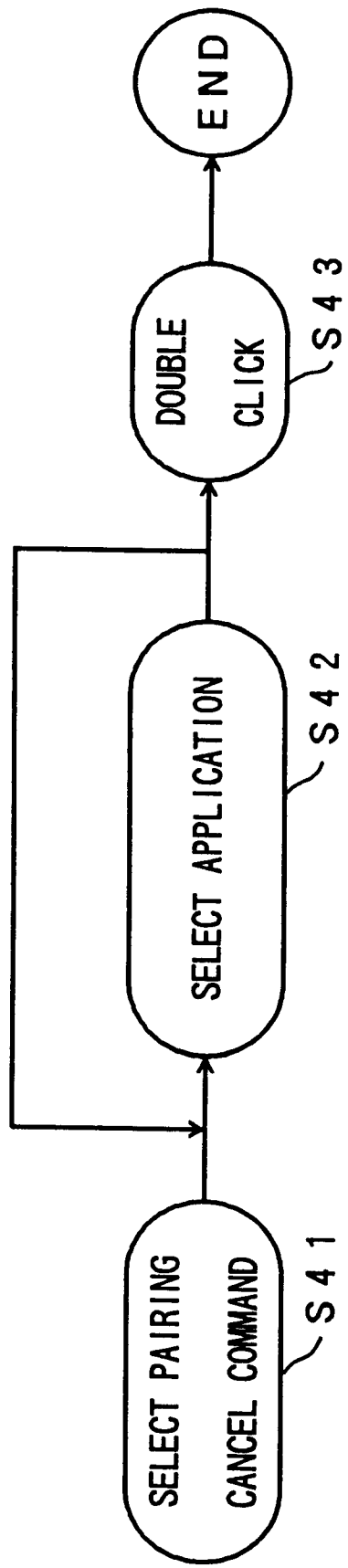
FIG. 23 is a flow chart for explaining the operation of the operator when cancelling the pairing.

FIG. 23 is a flow chart for explaining the operation of the operator when cancelling the pairing. In FIG. 23, a pairing cancel command is selected by a command button in a step S41, and the application to be cancelled from the pairing is selected in a step S42. In addition, the process ends if a double click is made by the mouse in a step S43.

Figure 24:
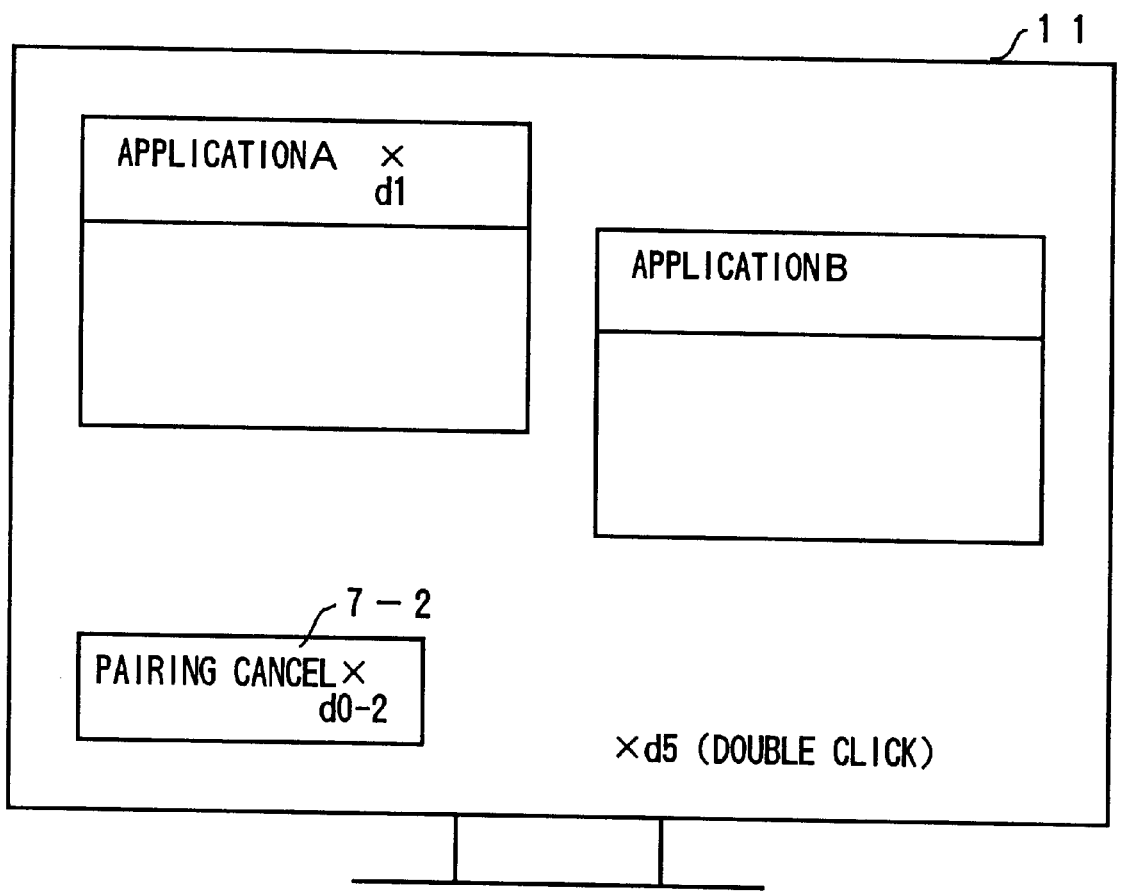
FIG. 24 is a diagram for explaining the operation of cancelling the pairing.
Figure 25:
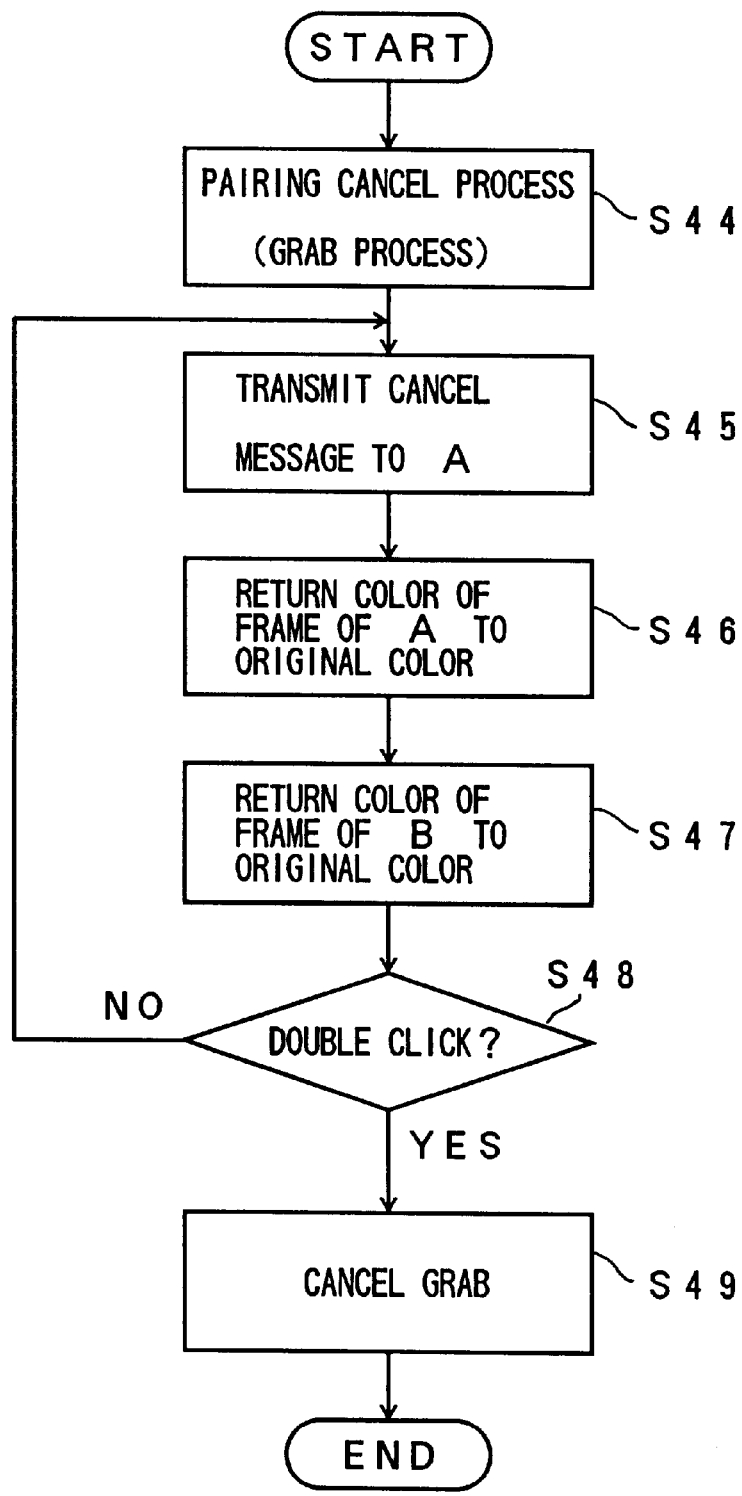
FIG. 25 is a flow chart for explaining the process of a pairing cancel function.

FIG. 24 is a diagram for explaining the operation of cancelling the pairing, and FIG. 25 is a flow chart for explaining the process of the pairing cancel function. FIG. 24 shows a display that is made on the display 11 by a related step shown in FIG. 25. For the sake of convenience, it is assumed that the pairing of the applications A and B is already made.

When a pairing cancel button 7-2 within the window 7 of the system manager SM shown in FIG. 24 is selected in a step S44 shown in FIG. 25, the system manager SM starts the process of the pairing cancel function which is one of the linking functions. In this embodiment, the pairing cancel function uses the grab function of the X-window in order to obtain all of the events on the display 11. The events in this case are inputs of command buttons corresponding to the title parts d1, d2 and the like which are selected by the mouse that is used as the pointing device. The pairing cancel button 7-2 is selected by clicking the mouse at a title part d0-2.

When the title part d1 of the application A is selected by clicking the mouse, the system manager SM recognizes the application A and makes a message transmission in a step S45 and transmits the cancel message shown in FIG. 18C, so as to notify the structuring tools 2 of the applications A and B that the application A is cancelled from the pairing.

In a step S46, when thee structuring tool 2 of the application A receives the cancel message, the color of the frame 3a of the window 3 of the application A that is changed to indicate that the application A is paired is returned to the original color, and the application B linked to the application A is cleared. Similarly, in a step S47, when the structuring tool 2 of the application B receives the cancel message, the color of the frame 3a of the window 3 of the application B that is changed to indicate that the application B is paired is returned to the original color, and the application A linked to the application B is cleared.

In a step S48, the system manager SM decides whether or not a double click of the mouse is made at a position d5 shown in FIG. 24, for example. If the decision result in the step S48 is NO, the process returns to the step S45 so as to specify another pairing to be cancelled. On the other hand, if the decision result in the step S48 is YES, the system manager SM cancels the grab function described above in a step S49, and the process of the pairing cancel function ends.

The operator may make a manipulation error during the cancellation of the pairing. An exception process is carried out as follows in such a case.

In other words, if the application which is actually being cancelled from the pairing is not the application A which is selected in the step S45 shown in FIG. 25, it is possible to carry out the pairing of the application A again using the pairing function described above in conjunction with FIG. 15. Alternatively, it is possible to make a double click by a second button of the mouse, that is, make a cancel-click, so as to return the pairing which is erroneously cancelled back to the original state. In this case, the cancel-click of the mouse can only return the state of the immediately preceding process back to its original state.

The system manager SM which receives the cancel-click transmits the pairing message shown in FIG. 18D with respect to the applications A and B, so as to return the pairing to that at the immediately preceding process. The operations of the applications A and B which receive the pairing message in this case are the same as those described above with reference to the pairing function.

Next, a more detailed description will be given of the grouping function.

Figure 26:
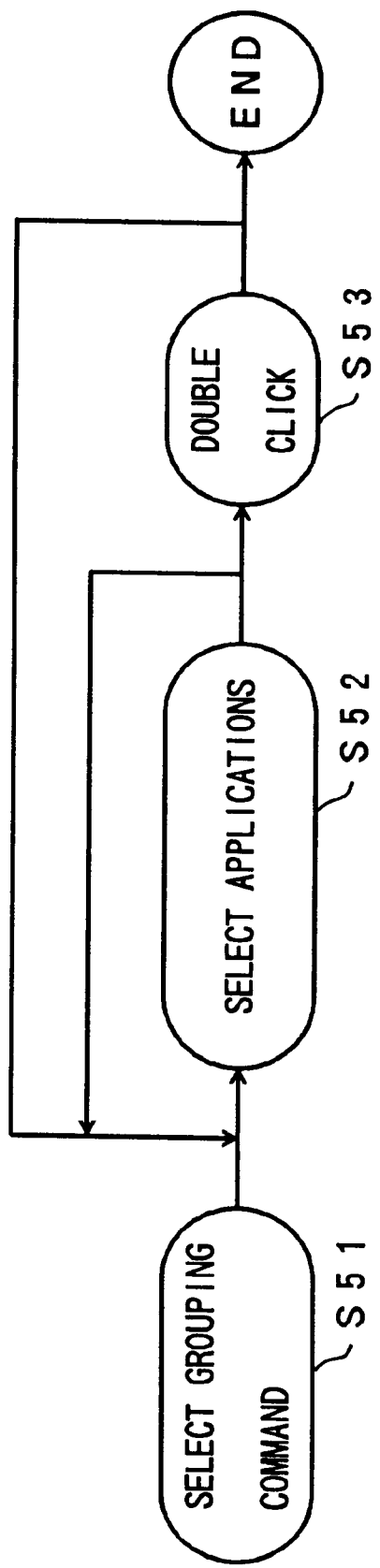
FIG. 26 is a flow chart for explaining the operation of the operator when carrying out a grouping.

FIG. 26 is a flow chart for explaining the operation of the operator when carrying out the grouping. In FIG. 26, the grouping command is selected by the command button in a step S51, and the applications to be grouped are selected in a step S52. The process ends when a double click is made by the pointing device in a step S53.

Figure 27:
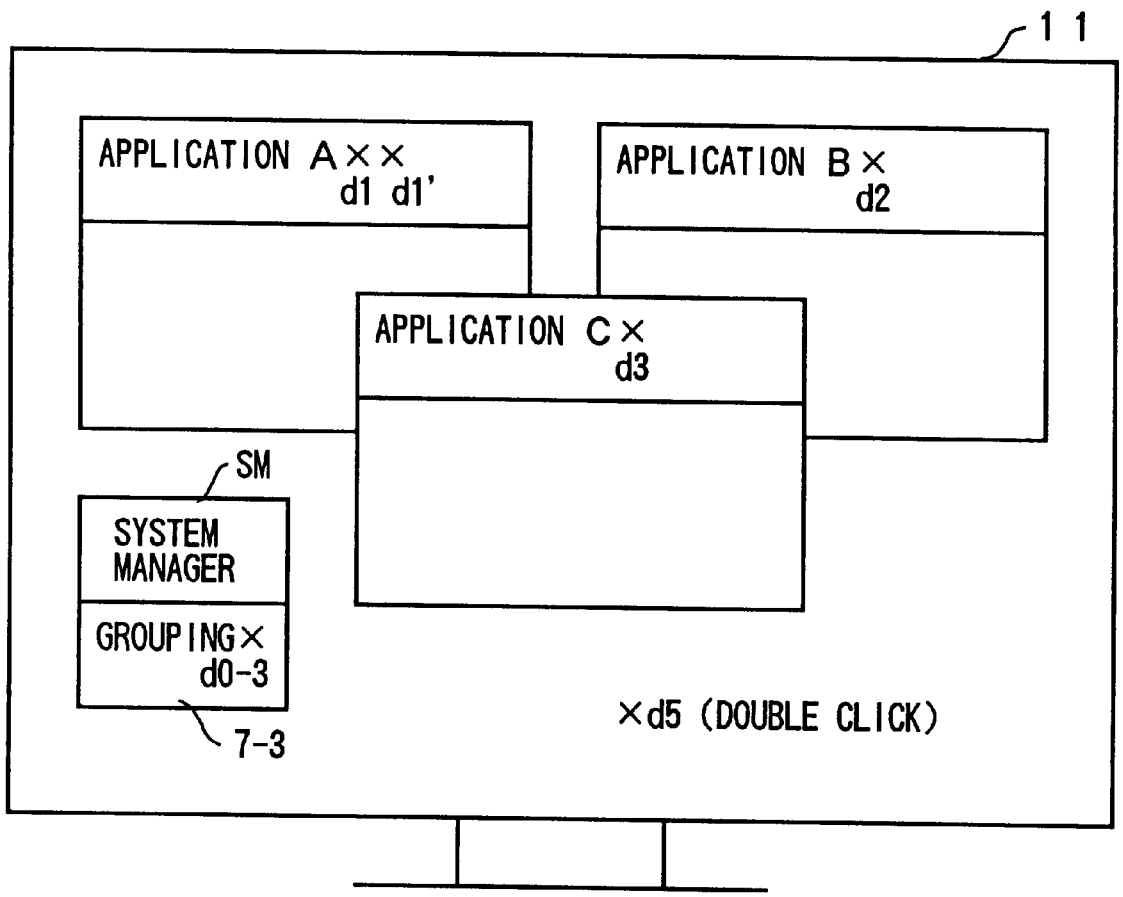
FIG. 27 is a diagram for explaining the operation for the grouping.
Figure 28:
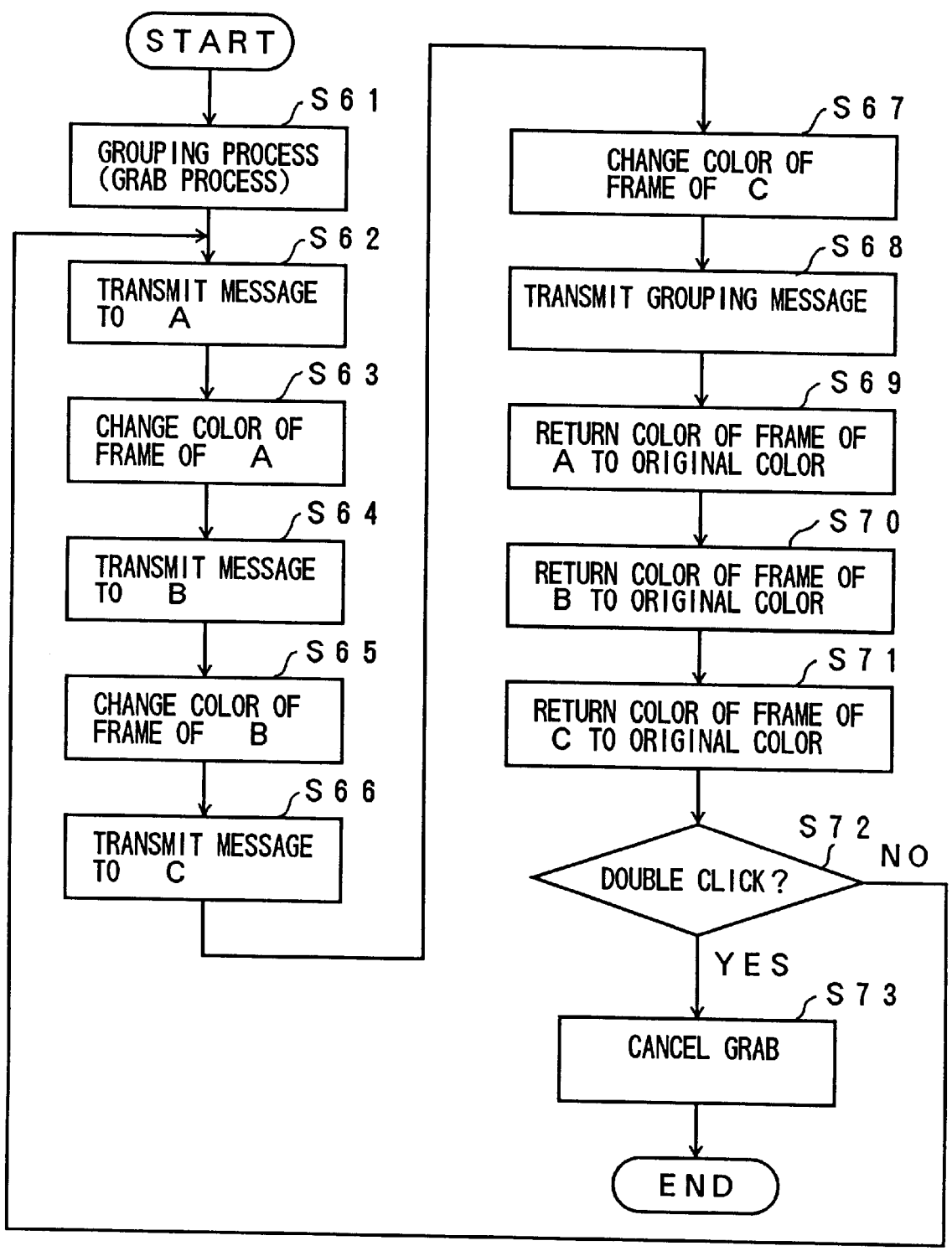
FIG. 28 is a flow chart for explaining the process of a grouping function.

FIG. 27 is a diagram for explaining the operation for the grouping, and FIG. 28 is a flow chart for explaining the process of the grouping function. FIG. 27 shows a display that is made on the display 11 by a related step shown in FIG. 28.

In FIGS. 27 and 28, when a grouping button 7-3 within the window 7 of the system manager SM is selected, the system manager SM starts the process of the grouping function which is one of the linking functions in a step S61. In this embodiment, the grouping function uses the grab function of the X-window in order to obtain all events on the display 11. The events in this case are inputs of command buttons corresponding to the title parts d1, d2, d3 and the like which are selected by the mouse that is used as the pointing device. The grouping button 7-3 is selected by clicking the mouse at a title part d0-3.

When the title part d1 of the application A is selected by clicking the mouse, the system manager SM recognizes the application A and transmits the selection message shown in FIG. 18A to the application A in a step S62, so as to notify the structuring tool 2 of the application A that the application A is selected.

In a step S63, when the structuring tool 2 of the application A receives the selection message, the color of the frame 3a of the window 3 of the application A shown in FIG. 12 is changed to a conspicuous color such as a red color, so as to indicate that the application A is selected.

In a step S64, when the title part d2 of the application B is selected by clicking the mouse, the system manager SM recognizes the application B and makes a message transmission, so as to notify the structuring tool 2 of the application B that the application B is selected. The message that is transmitted to the application B in this case is also the selection message shown in FIG. 18A, for example.

In a step S65, when the structuring tool 2 of the application B receives the selection message, the color of the frame 3a of the window 3 of the application B is changed similarly to the case shown in FIG. 12 so as to indicate that the application B is selected.

In a step S66, when the title part d3 of the application C is selected by clicking the mouse, the system manager SM recognizes the application C and makes a message transmission, so as to notify the structuring tool 2 of the application C that the application C is selected. The message that is transmitted to the application C in this case is also the selection message shown in FIG. 18A, for example.

In a step S67, when the structuring tool 2 of the application C receives the selection message, the color of the frame 3a of the window 3 of the application C is changed similarly to the case shown in FIG. 12 so as to indicate that the application C is selected.

In this particular case, 3 windows 3, that is, the 3 applications A, B and C are selected by the above described steps. Hence, the system manager SM judges that the grouping is specified and completed, and transmits the cancel message shown in FIG. 18B with respect to the structuring tools 2 of the applications A, B and C in a step S66 so as to cancel the previous grouping selection. In addition, the step S66 also transmits a grouping message shown in FIG. 18E to the structuring tools 2 of the applications A, B and C to indicate that the applications A, B and C are grouped. The grouping message includes information related to the color of the frame 3a.

When the structuring tool 2 of the application receives the cancel message, the color of the frame 3a that is changed in the step S63 is returned to the original color in a step S69. In addition, the step S69 changes the color of the frame 3a to a color which indicates the group, and also stores the grouped applications B and C which are grouped with the application A.

Similarly, when the structuring tool 2 of the application B receives the cancel message, the color of the frame 3a that is changed in the step S65 is returned to the original color in a step S70. In addition, the step S70 changes the color of the frame 3a to a color which indicates the group, and also stores the grouped applications A and C which are grouped with the application B.

Furthermore, when the structuring tool 2 of the application C receives the cancel message, the color of the frame 3a that is changed in the step S67 is returned to the original color in a step S71. In addition, the step S71 changes the color of the frame 3a to a color which indicates the group, and also stores the grouped applications A and B which are grouped with the application C.

As a result, the colors of the frames 3a of the windows 2 of the grouped applications A, B and C are all changed to a green color, for example, so that the operator can readily see that the applications A, B and C are grouped. In other words, the color management is made in the system manager SM, and the application has the function of changing the color of the frame 3a to the color transmitted by the grouping message.

In a step S72, the system manager SM decides whether or not a double click of the mouse is made at the position d5 shown in FIG. 27, for example. If the decision result in the step S72 is NO, the process returns to the step S62 so as to specify the next grouping. On the other hand, if the decision result in the step S72 is YES, the system manager SM cancels the grab function described above in a step S73, and the process of the grouping function ends.

The operator may make a manipulation error during the grouping. An exception process is carried out as follows in such a case.

When the operator notices that an erroneous application is selected at the point in time when the step S63 shown in FIG. 28 is carried out, that is, at the time when the first application A to be grouped is selected, the erroneous selection is cancelled by re-selecting the application. For example, if the application A is erroneously selected, the structuring tool 2 of the application A receives the cancel message shown in FIG. 18B from the system manager SM and carries out a process of returning the color of the frame 3a that is changed in the step S63 to the original color.

Figure 29:
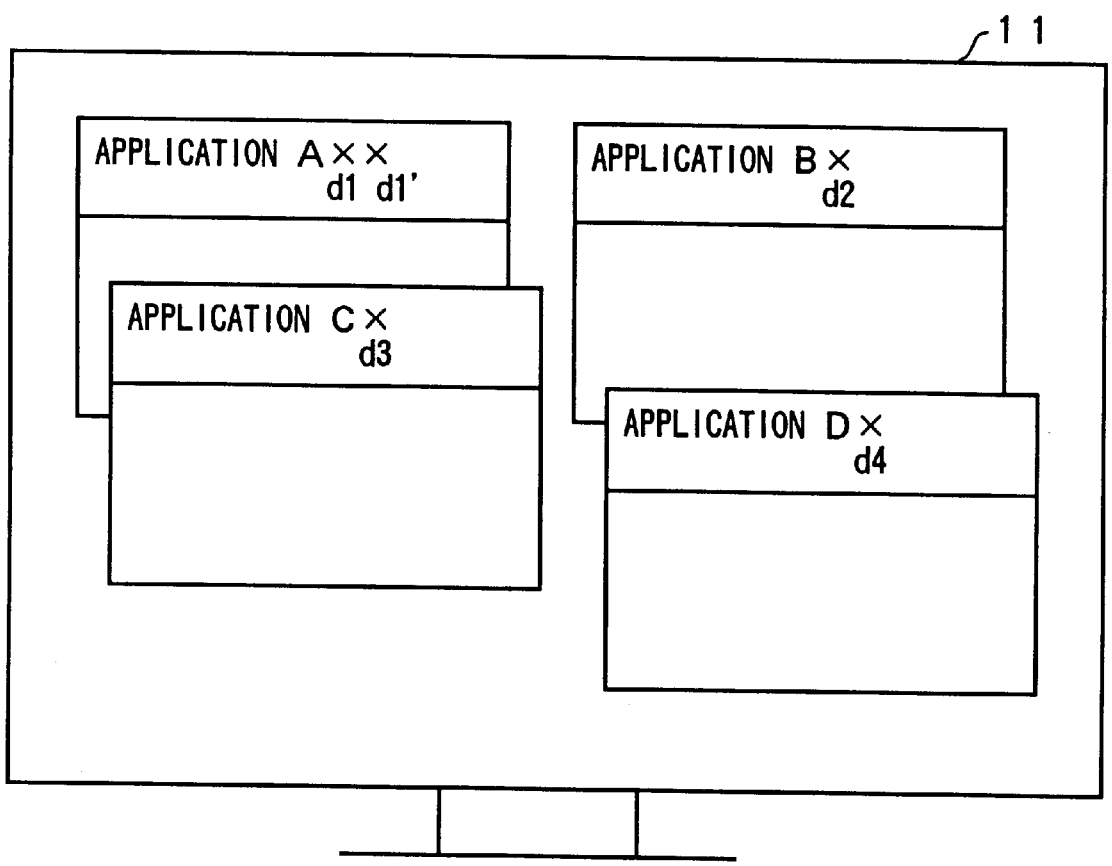
FIG. 29 is a diagram for explaining an exception process during the grouping process.

Accordingly, when the mouse is successively clicked at the title part d1 of the application A, the title part d1' of the application A, the title part d2 of the application B, the title part d3 of the application C and a title part d4 of an application D shown in FIG. 29 in this sequence, the frame 3a of the window 3 of the application A is displayed with the original color in FIG. 29, and only the frames 3a of the windows 3 of the grouped applications B, C and D are displayed with the same color (for example, green color) in FIG. 29.

When the operator notices that an erroneous application is selected at the point in time when the process of the step S67 shown in FIG. 28 is carried out, that is, at the time when the third application C to be grouped is selected, the erroneous application link is cancelled by re-selecting the application after selecting the third application C. For example, when the first application A is erroneously selected, the applications A, B and C are linked at the time when the third application C is selected. However, by re-selecting the application A, the structuring tool 2 of the application C transmits the cancel message shown in FIG. 18C to the application A which is selected in the step S62, so as to notify the application A that the application A is cancelled from the grouping with the applications B and C. As a result, a process is carried out to return the color of the frame 3a that is changed in the step S63 to the original color.

Figure 30A:
FIGS. 30A and 30B respectively are diagrams for explaining an application selection sequence to explain the exception process during the grouping process.
Figure 30B:

Therefore, when the mouse is successively clicked at the title part d1 of the application A, the title part d1' of the application A, the title part d2 of the application B, the title part d3 of the application C and the title part d4 of the application D in this sequence as shown in FIG. 30A, the frame 3a of the window 3 of the application A is displayed with the original color in FIG. 29, and only the frames 3a of the windows 3 of the grouped applications B, C and D are displayed with the same color (for example, green color) in FIG. 29. Similarly, when the mouse is successively clicked at the title part d1 of the application A, the title part d2 of the application B, the title part d3 of the application C, the title part d1' of the application A and the title part d4 of the application D in this sequence as shown in FIG. 30B, the frame 3a of the window 3 of the application A is displayed with the original color in FIG. 29, and only the frames 3a of the windows 3 of the grouped applications B, C and D are displayed with the same color (for example, green color) in FIG. 29.

Next, a description will be given of a grouping cancel function which cancels the link of the applications which are already grouped.

Figure 31:
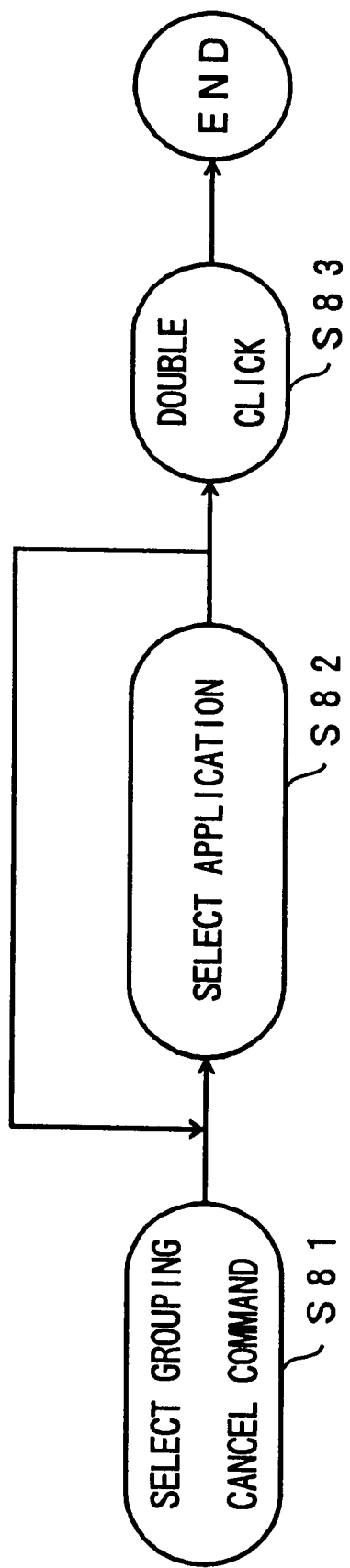
FIG. 31 is a flow chart for explaining the operation of the operator when cancelling the grouping.

FIG. 31 is a flow chart for explaining the operation of the operator when cancelling the grouping. In FIG. 31, a grouping cancel command is selected by a command button in a step S81, and the application to be cancelled from the grouping is selected in a step S82. In addition, the process ends if a double click is made by the mouse in a step S83.

Figure 32:
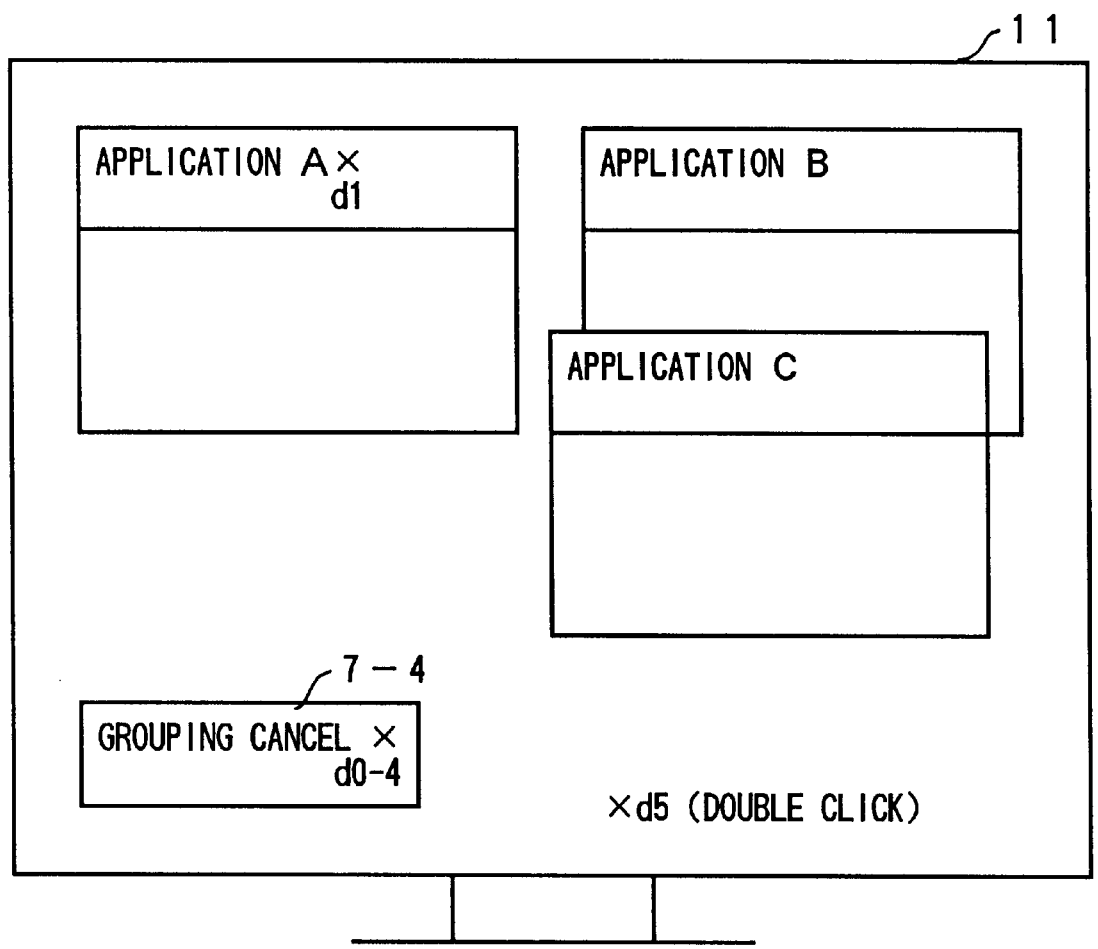
FIG. 32 is a diagram for explaining the operation of cancelling the grouping.
Figure 33:
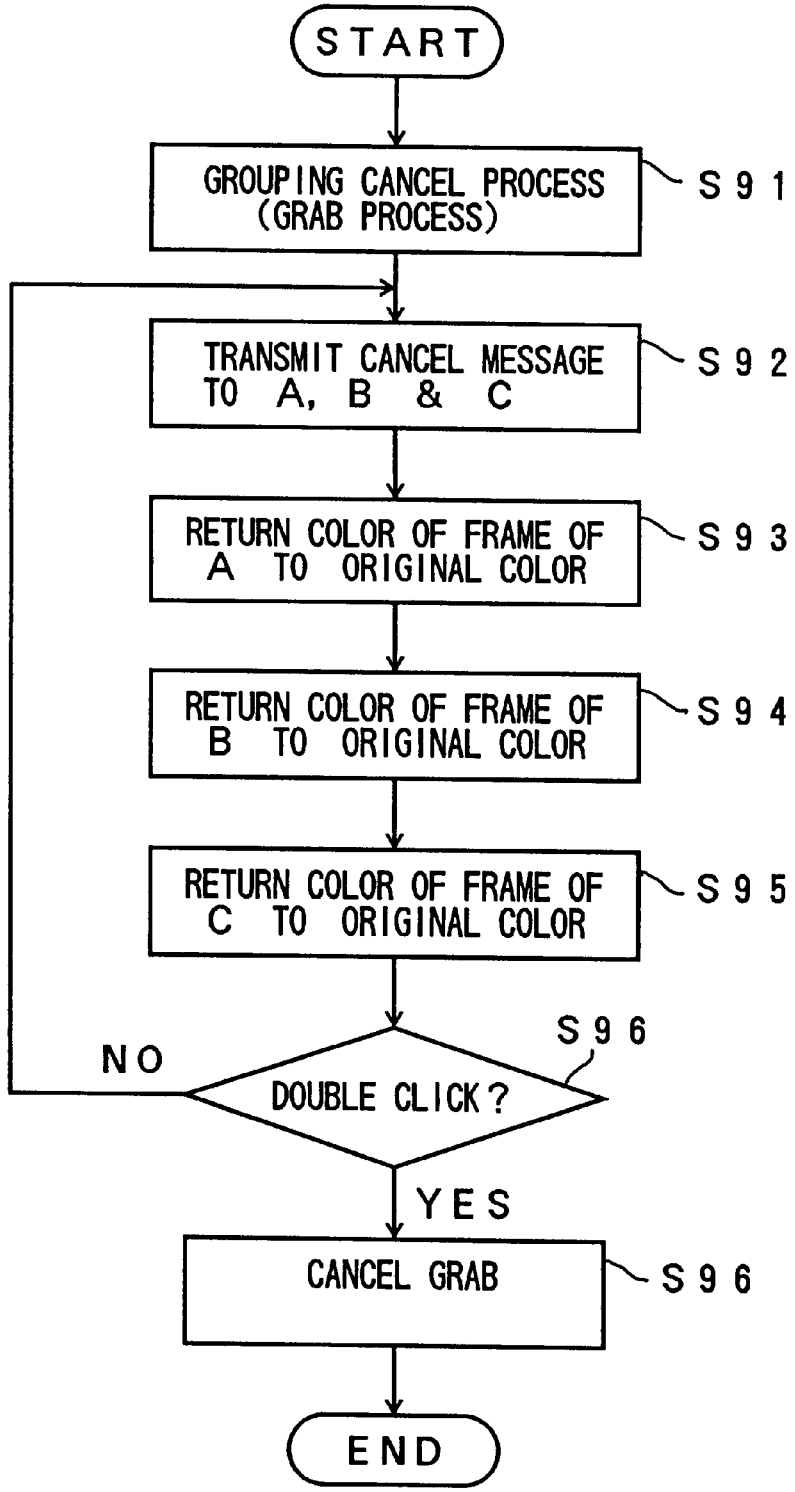
FIG. 33 is a flow chart for explaining a process of a grouping cancel function.

FIG. 32 is a diagram for explaining the operation of cancelling the grouping, and FIG. 33 is a flow chart for explaining the process of the grouping cancel function. FIG. 32 shows a display that is made on the display 11 by a related step shown in FIG. 33. For the sake of convenience, it is assumed that the grouping of the applications A, B and C is already made.

When a grouping cancel button 7-4 within the window 7 of the system manager SM shown in FIG. 32 is selected in a step S91 shown in FIG. 33, the system manager SM starts the process of the grouping cancel function which is one of the linking functions. In this embodiment, the grouping cancel function uses the grab function of the X-window in order to obtain all of the events on the display 11. The events in this case are inputs of command buttons corresponding to the title parts d1, d2 and the like which are selected by the mouse that is used as the pointing device. The grouping cancel button 7-4 is selected by clicking the mouse at a title part d0-4.

When the title part d1 of the application A is selected by clicking the mouse, the system manager SM recognizes the application A and makes a message transmission in a step S92 and transmits the cancel message shown in FIG. 18C, so as to notify the structuring tools 2 of the application A and the applications B and C grouped with the application A that the application A is cancelled from the grouping.

In a step S93, when thee structuring tool 2 of the application A receives the cancel message, the color of the frame 3a of the window 3 of the application A that is changed to indicate that the application A is grouped is returned to the original color, and the applications B and C linked to the application A are cleared. Similarly, in a step S94, when the structuring tool 2 of the application B receives the cancel message, the color of the frame 3a of the window 3 of the application B that is changed to indicate that the application B is grouped is returned to the original color, and the applications A and C linked to the application B are cleared. Furthermore, in a step S95, when the structuring tool 2 of the application C receives the cancel message, the color of the frame 3a of the window 3 of the application C that is changed to indicate that the application C is grouped is returned to the original color, and the applications A and B linked to the application C are cleared.

In a step S96, the system manager SM decides whether or not a double click of the mouse is made at a position d5 shown in FIG. 32, for example. If the decision result in the step S96 is NO, the process returns to the step S92 so as to specify another grouping to be cancelled. On the other hand, if the decision result in the step S96 is YES, the system manager SM cancels the grab function described above in a step S97, and the process of the grouping cancel function ends.

The operator may make a manipulation error during the cancellation of the grouping. An exception process is carried out as follows in such a case.

In other words, if the application which is actually being cancelled from the grouping is not the application A which is selected in the step S92 shown in FIG. 33, it is possible to carry out the grouping of the application A again using the grouping function described above in conjunction with FIG. 28. Alternatively, it is possible to make a double click by the second button of the mouse, that is, make a cancel-click, so as to return the grouping which is erroneously cancelled back to the original state. In this case, the cancel-click of the mouse can only return the state of the immediately preceding process back to its original state.

The system manager SM which receives the cancel-click transmits the grouping message shown in FIG. 18E with respect to the applications A, B and C, so as to return the grouping to that at the immediately preceding process. The operations of the applications A, B and C which receive the grouping message in this case are the same as those described above with reference to the grouping function.

Next, a description will be given of a grouping deletion function which deletes a specific application from the linked applications which are already grouped.

Figure 34:
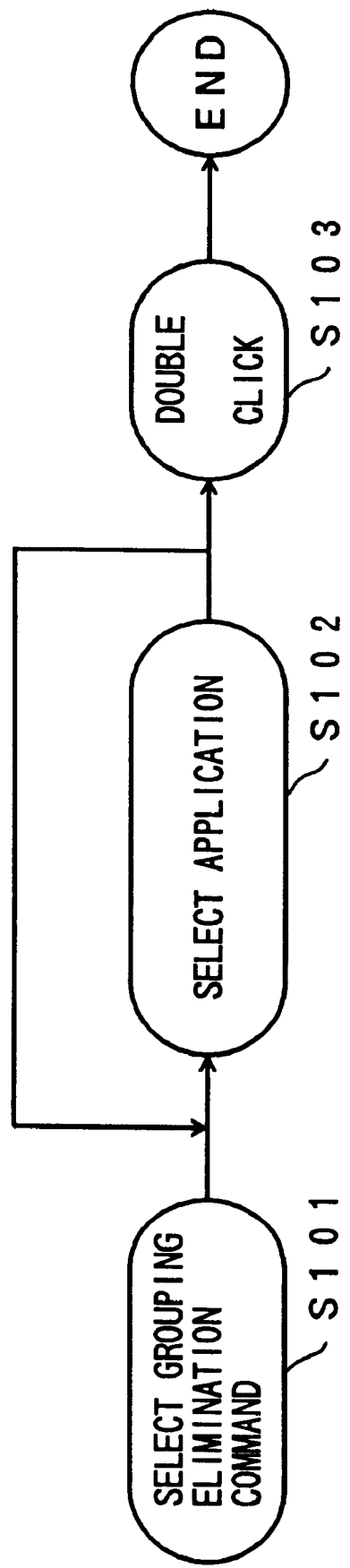
FIG. 34 is a flow chart for explaining the operation of the operator when carrying out a grouping deletion.

FIG. 34 is a flow chart for explaining the operation of the operator in a case where the grouping deletion is carried out. In FIG. 34, a grouping deletion command is selected by a command button in a step S101, and the application which is to be deleted is selected from the grouped applications in a step S102. In addition, the process ends when a double click is made by the mouse.

Figure 35:
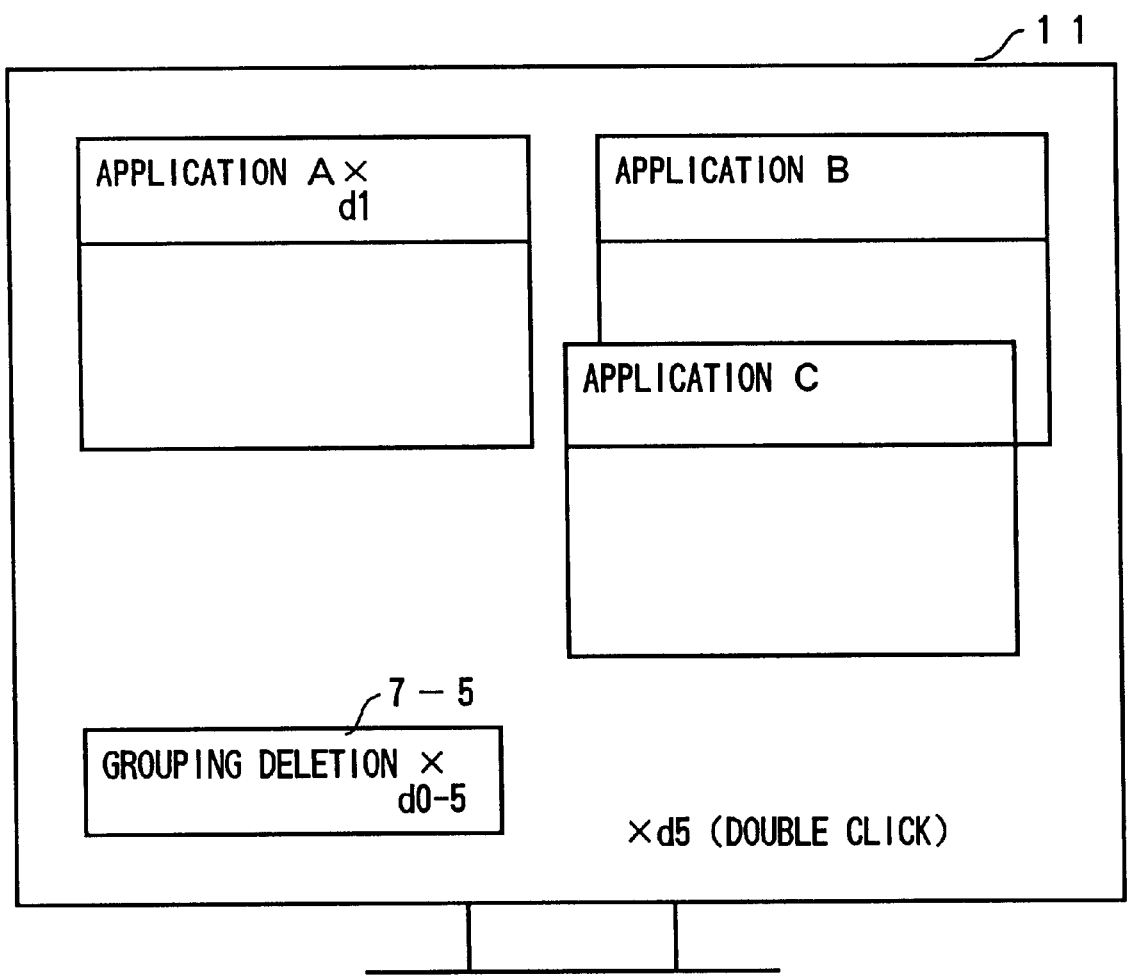
FIG. 35 is a diagram for explaining the operation for the grouping deletion.
Figure 36:
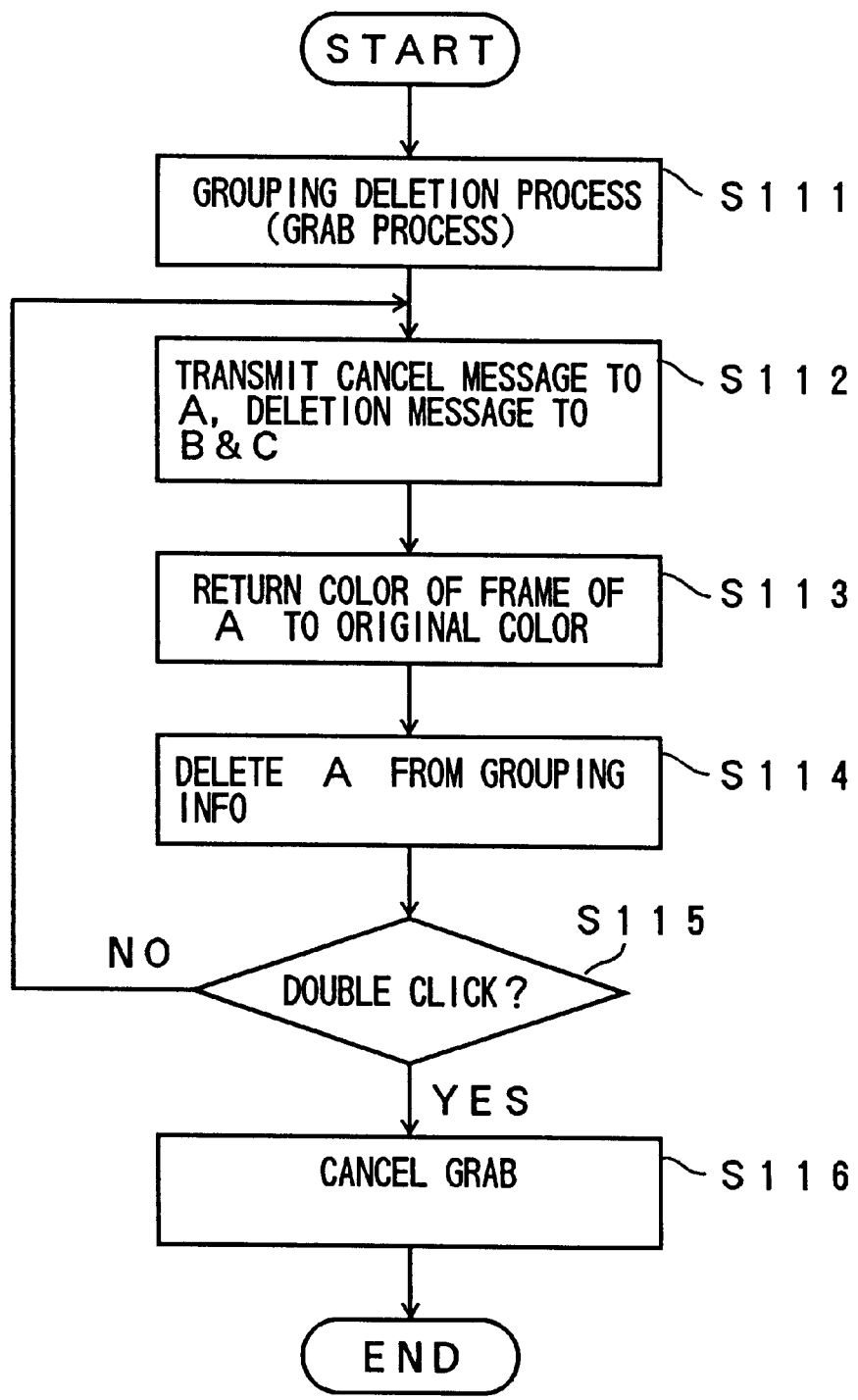
FIG. 36 is a flow chart for explaining a process of a grouping deletion function.

FIG. 35 is a diagram for explaining the operation for the grouping deletion, and FIG. 36 is a flow chart for explaining the process of the grouping deletion function. FIG. 35 shows a display that is made on the display 11 by a related step shown in FIG. 36. For the sake of convenience, it is assumed that the grouping of the applications A, B and C is already made.

When a grouping deletion button 7-5 within the window 7 of the system manager SM shown in FIG. 35 is selected in a step S111 shown in FIG. 36, the system manager SM starts the process of the grouping deletion function which is one of the linking functions. In this embodiment, the grouping deletion function uses the grab function of the X-window in order to obtain all of the events on the display 11. The events in this case are inputs of command buttons corresponding to the title parts d1, d2 and the like which are selected by the mouse that is used as the pointing device. The grouping deletion button 7-5 is selected by clicking the mouse at a title part d0-5.

When the title part d1 of the application A is selected by clicking the mouse, the system manager SM recognizes the application A and makes a message transmission in a step S112. This message transmission in the step S112 includes transmitting the cancel message shown in FIG. 18C to the structuring tool 2 of the application A, and transmitting a deletion message shown in FIG. 18F to the structuring tools 2 of the applications B and C which are grouped with the application A, so as to notify the applications B and C that the application A is deleted from the grouping.

In a step S113, when thee structuring tool 2 of the application A receives the cancel message, the color of the frame 3a of the window 3 of the application A that is changed to indicate that the application A is grouped is returned to the original color, and the applications B and C linked to the application A are cleared to erase the grouping information from the application A. In a step S114, the application A is deleted from the grouping information in the application B when the structuring tool 2 of the application B receives the deletion message, and the application A is deleted from the grouping information in the application C when the structuring tool 2 of the application C receives the deletion message.

In a step S115, the system manager SM decides whether or not a double click of the mouse is made at the position d5 shown in FIG. 35, for example. If the decision result in the step S115 is NO, the process returns to the step S112 so as to specify another grouping to be deleted. On the other hand, if the decision result in the step S115 is YES, the system manager SM cancels the grab function described above in a step S116, and the process of the grouping deletion function ends.

In the step S113, the operator may notice that the application is erroneously selected after the color of the frame 3a of the window 3 of the application A is changed. In this case, it is possible to return the grouping back to the original state by making the cancel-click.

Of course, it is possible to add a new application with respect to the applications which are already grouped. The operation in this case is basically the same as that described above for the grouping function, and the grouping is made such that the newly specified application is added to the applications which are already grouped.

Next, a description will be given of a function which automatically cancels an application which is already paired or grouped from the pairing or grouping, by newly specifying another application to be paired or grouped in a state where the pairing or grouping is already made.

Figure 37:
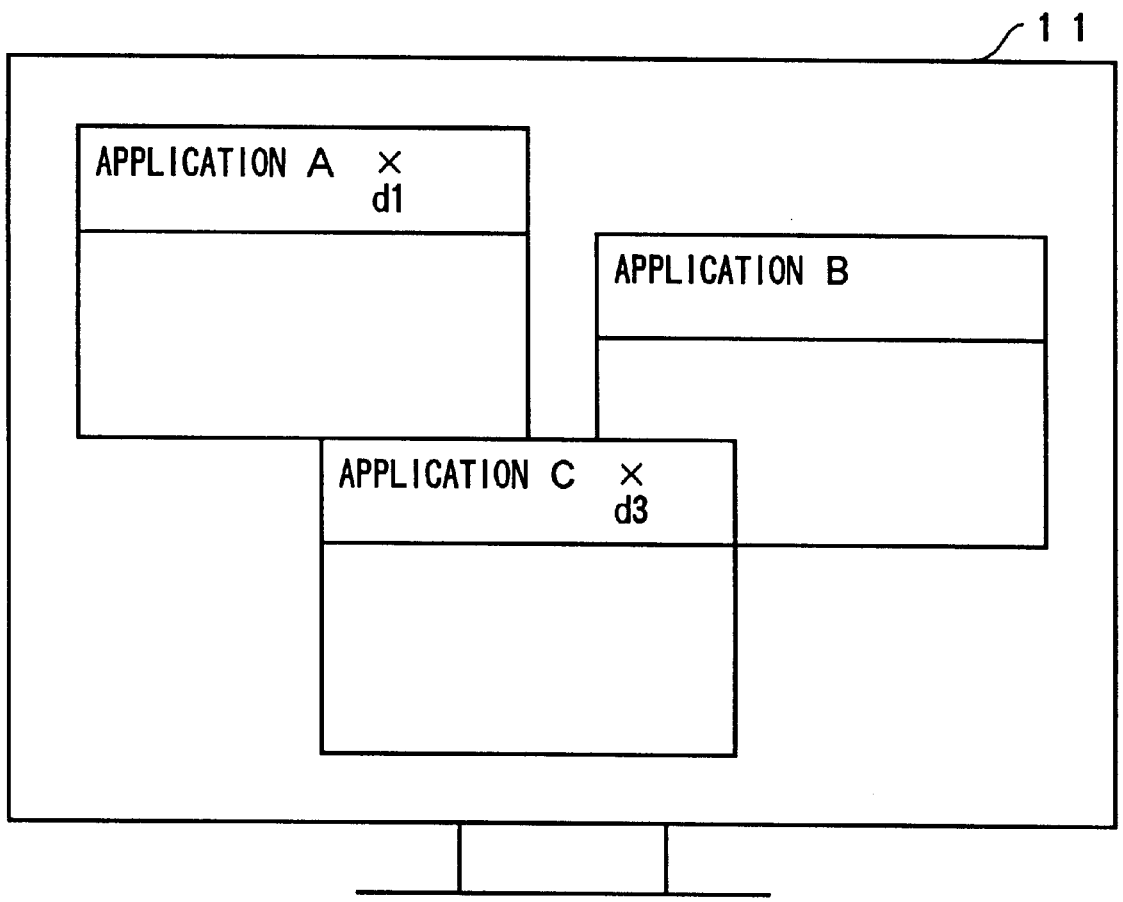
FIG. 37 is a diagram for explaining the operation in a case where an automatic pairing cancel function is provided.

FIG. 37 is a diagram for explaining the operation in the case where an automatic pairing cancel function is provided. In this case, when the applications A and C are newly selected using the pairing function described above in a state where the applications A and B are already paired, for example, the pairing message shown in FIG. 18D is transmitted to the structuring tools 2 of the applications A and C, and the cancel message shown in FIG. 18C is transmitted to the structuring tool 2 of the application B. When newly selecting the applications A and C, the title parts d1 and d3 of the windows 3 of the corresponding applications A and C are clicked by the mouse. As a result, the color of the frame 3a of the window 3 of the application B is returned to the original color, and the colors of the frames 3a of the windows 3 of only the newly paired applications A and C are changed to a conspicuous color such as a red color.

Figure 38:
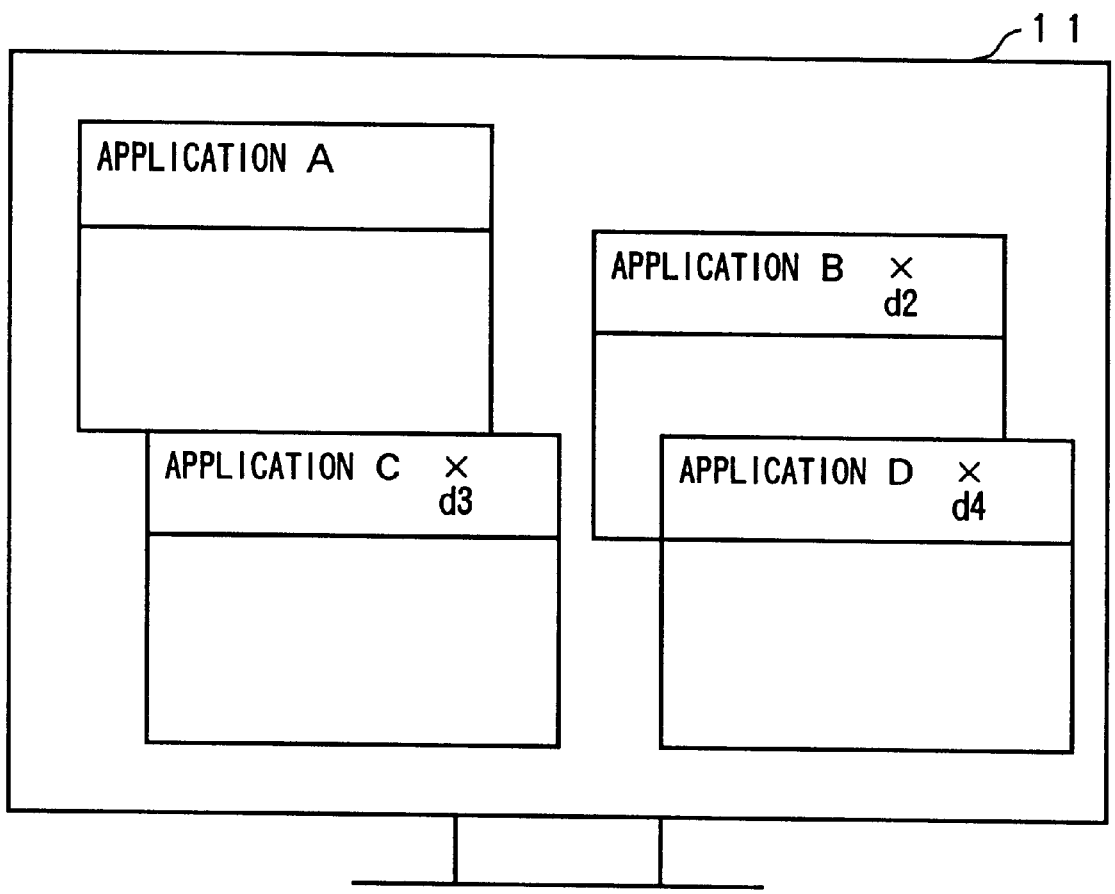
FIG. 38 is a diagram for explaining the operation in a case where an automatic grouping cancel function is provided.

FIG. 38 is a diagram for explaining the operation in the case where an automatic grouping cancel function is provided. In this case, the number of applications that are grouped is determined by making a double click by the mouse after selecting the applications. When the applications B, C and D are newly selected using the grouping function described above in a state where the applications A, B and C are already grouped, for example, the grouping message shown in FIG. 18E is transmitted to the structuring tools 2 of the applications B, C and D, and the cancel message shown in FIG. 18C is transmitted to the structuring tool 2 of the application A. When newly selecting the applications B, C and D, the title parts d2, d2 and d4 of the windows 3 of the corresponding applications B, C and D are clicked by the mouse. As a result, the color of the frame 3a of the window 3 of the application A is returned to the original color, and the colors of the frames 3a of the windows 3 of only the newly grouped applications B, C and D are changed to a conspicuous color such as a red color.

Accordingly, by providing the function of automatically cancelling the application which is already paired or grouped from the pairing or grouping, it becomes unnecessary to manually cancel an already existing pairing or grouping every time a new pairing or grouping is made. As a result, it is possible to make a new pairing or grouping by a simple operation.

In the embodiment described above, the pairing or grouping function is selected by clicking the mouse at a region within the window 3 of the application. However, each of the various functions may be selected by other methods.

Figure 39:
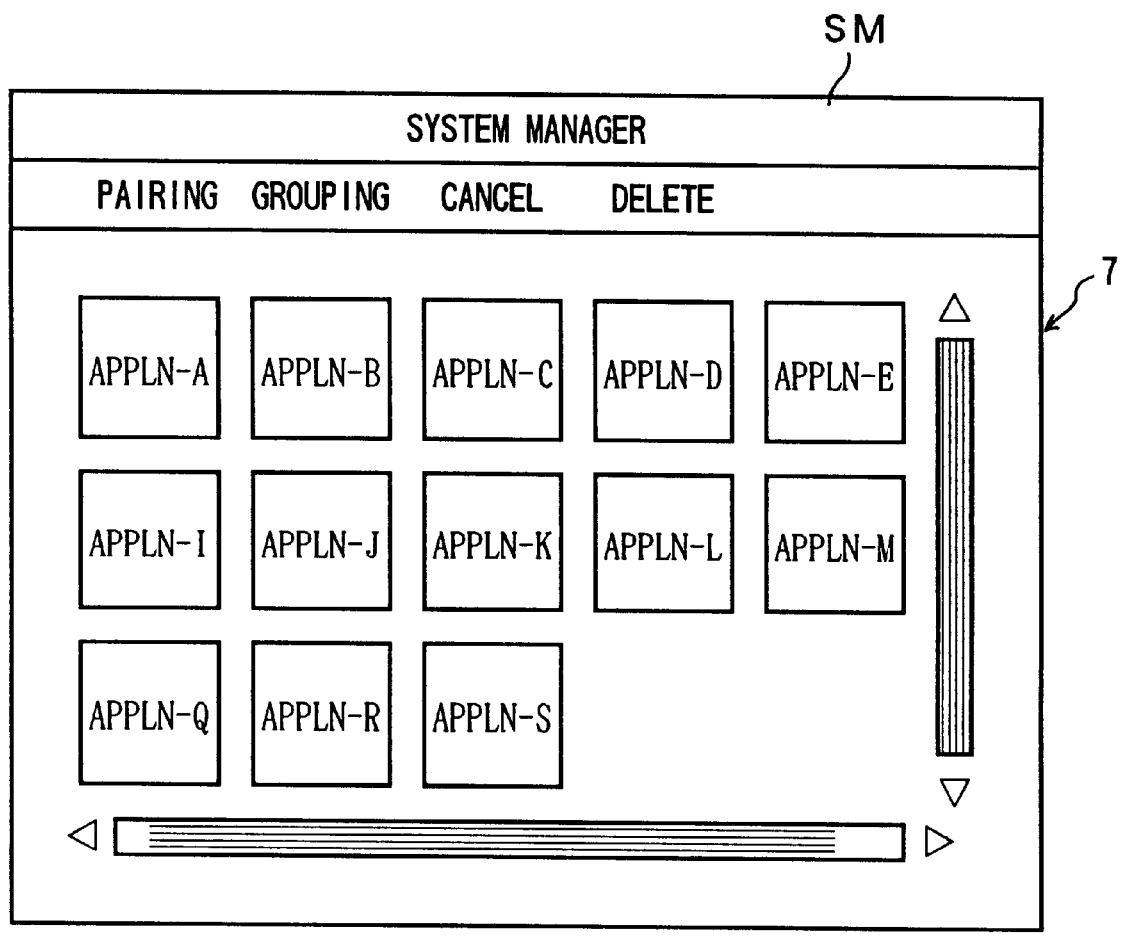
FIG. 39 is a diagram showing a case where icons representing applications are arranged in addition to various command buttons within a window of the system manager.

FIG. 39 is a diagram showing a case where icons representing the applications are arranged within the window 7 of the system manager SM, in addition to the command buttons of the functions such as the pairing, grouping cancel and deletion. In other words, a list of the applications is displayed within the window 7 by the arrangement of the icons. In FIG. 39, each icon has a rectangular shape for the sake of convenience, however, the shape of the icon is of course not limited to the rectangular shape. For example, the pairing is completed by first clicking the command button of the pairing the mouse and then clicking the icons representing the applications to be paired by the mouse. In this case, the colors of the frames 3a of the windows 3 of the paired applications are changed to the same color (for example, red color) as the selected icon, for example. Accordingly, in this case, a message for changing the color of the frame 3a of the window 3 of each paired application to the same color as the selected icon is transmitted from the system manager SM to the structuring tool 2 of each paired application. The operation is similar to that of the pairing in the case of the grouping.

Figure 40:
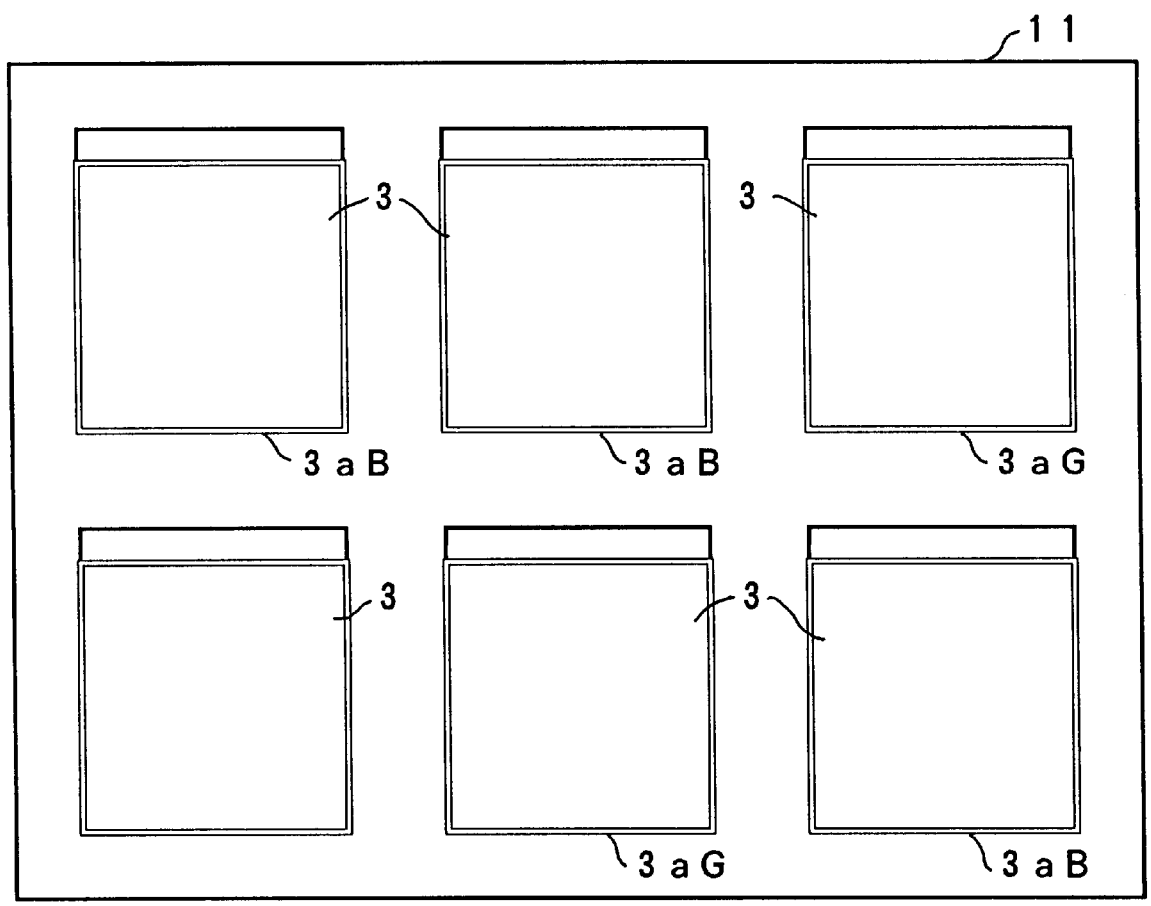
FIG. 40 is a diagram showing a case where paired applications and grouped applications are displayed.

FIG. 40 is a diagram showing the display of the paired applications and the grouped applications. In FIG. 40, the windows 3 of the grouped applications are displayed by blue frames 3aB, and the windows 3 of the paired applications are displayed by green frames 3aG.

Next, a description will be given of the transmission and reception of messages when creating or deleting the application.

Figure 41:
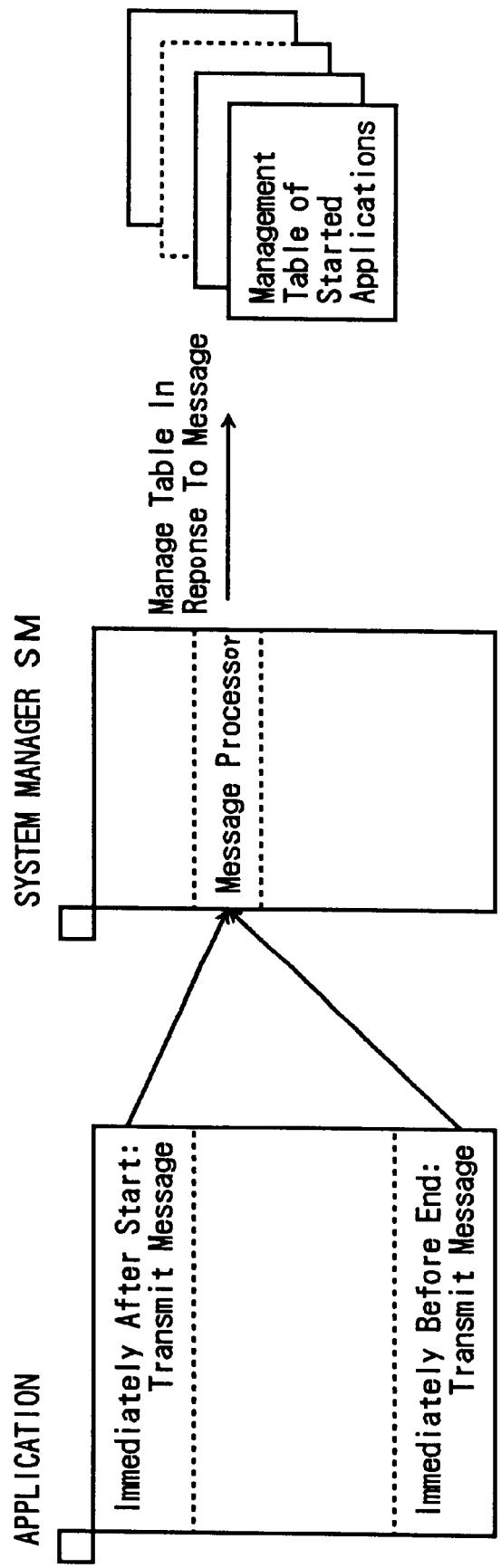
FIG. 41 is a diagram for explaining message exchanges in a case where the system manager is already started.

When the system manager SM is already started and each application is started, the system manager SM receives a message indicating that the application is started from each started application, so as to obtain information related to the applications to be paired or grouped. On the other hand, when each application is stopped, the system manager SM receives a message indicating that the application stopped from each stopped application. The system manager SM can constantly be aware of the state of each operating application based on such messages, as shown in FIG. 41. The main application body 1 does not need to be conscious of the message transmissions at all because a function within the structuring tool 2 of the application manages the message transmissions.

Figure 42:
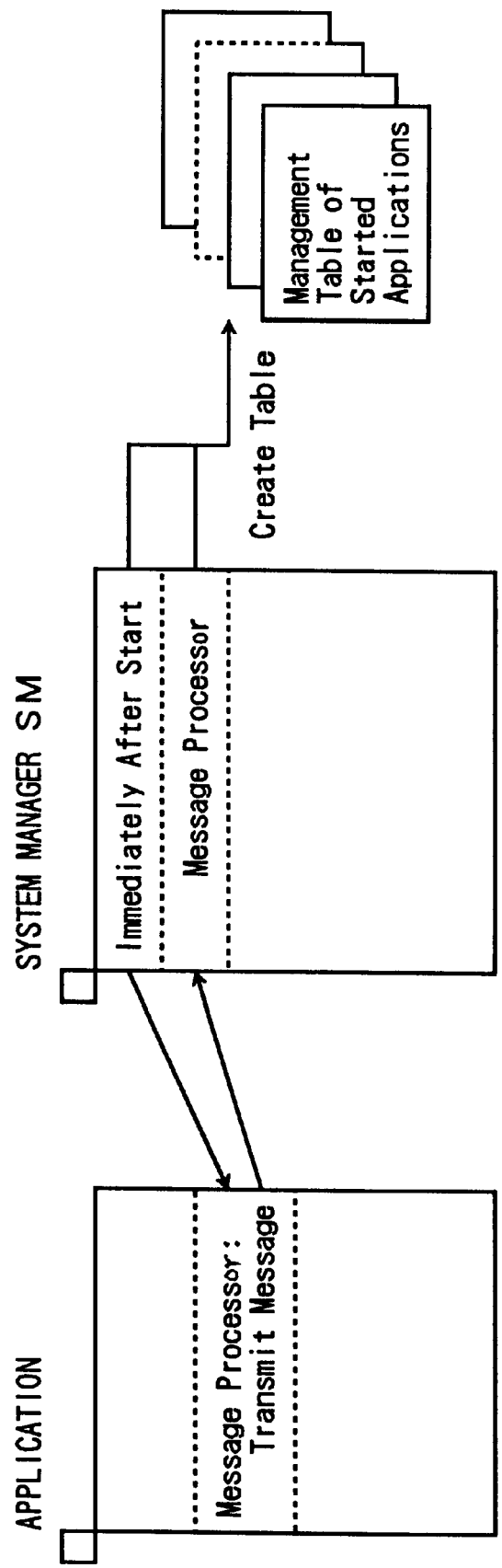
FIG. 42 is a diagram for explaining message exchanges in a case where the system manager is started afterwards.

When the application is started first and the system manager SM is started thereafter, the system manager SM cannot be aware of the state of each operating application according to the method shown in FIG. 41. Hence, in such a case, the system manager SM transmits a message requesting the operating application to notify the type of this operating application, as shown in FIG. 42. Accordingly, the operating application which receives the message that makes this request transmits to the system manager SM a message which is the same as that transmitted to the system manager SM when the application is started in the case shown in FIG. 41 described above. As a result, the system manager SM can be aware of the state of each operating application regardless of the starting order of the application and the system manager SM.

Therefore, according to this embodiment, when the operator carries out an operation which requires linking of the applications, the main application body 1 transmits a message using the message transmitting function of the structuring tool 2 with respect to the stored application to which the link is to be made. The application need only generate a message for linking in the main application body 1 and make a transmission request to the structuring tool 2. The actual message transmission process is carried out by a message processor within the structuring tool 2 of the application.

Figure 43:
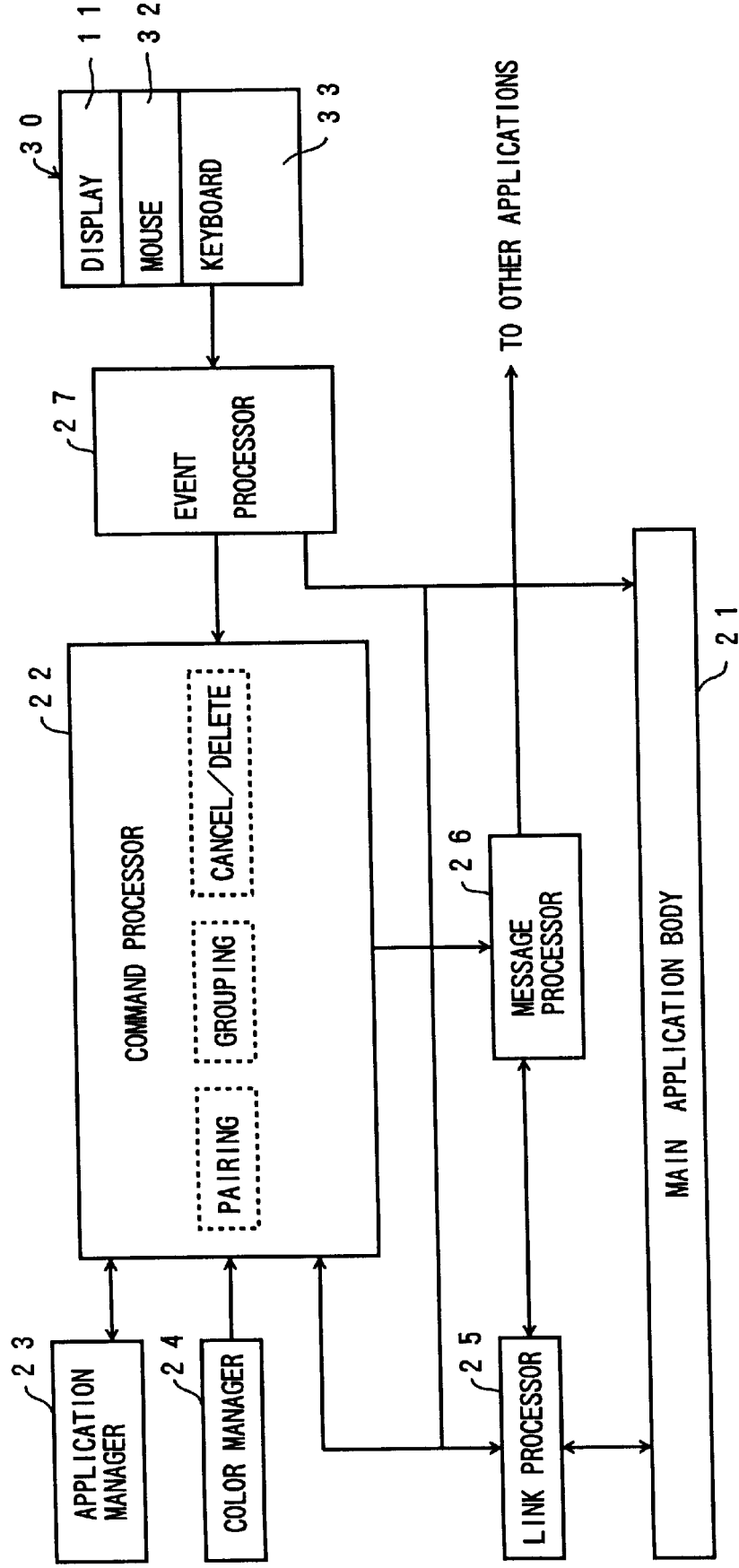
FIG. 43 is a system block diagram showing a first embodiment of an application grouping apparatus according to the present invention.

FIG. 43 is a system block diagram showing a first embodiment of an application grouping apparatus according to the present invention. This embodiment of the application grouping apparatus employs the first embodiment of the application grouping method described above.

A system shown in FIG. 43 corresponding to the application grouping apparatus generally includes a main application body 21, a command processor 22, an application manager 23, a color manager 24, a link processor 25, a message processor 26, an event processor 27, and an input/output system 30 which are connected as shown. The input/output system 30 includes a display 11, a mouse 32 and a keyboard 33.

The main application body 21 forms the main application body 1 of the application and the main system manager body 5 of the system manager SM. In addition, a part of the system made up of the command processor 22, the application manager 23, the color manager 24, the link processor 25, the message processor 26 and the event processor 27 forms the structuring tool 2 of the application and the structuring tool 6 of the system manager SM.

The command processor 22 carries out a process to execute functions including the pairing function, the grouping function, the cancel function, the deletion function and the like. The application manager 23 stores and manages information related to the applications which are paired or grouped. The color manager 24 manages and stores information related to the color of the frame 3a of the window 3 of each application. The link processor 25 carries out a process of linking the applications, cancelling the link and deleting the link when the pairing, grouping, cancel or deletion function is executed by the command processor 22. The message processor 26 carries out a message transmission and reception process to exchange messages between the applications and between the application and the system manager SM. The event processor 27 provides an interface between the input/output system 30 and the command processor 22 and between the input/output system 30 and the main application body 21. The keyboard 33 is used to input a start command, data and the like to the system. The display 11 is used to display the window 7 of the system manager SM, display the window 3 of the application, and input/output data. In addition, the mouse 32 is used to input specific commands by clicking the windows 3 and 7 displayed on the display 11.

In FIG. 43, a part forming the main application body 1 and the structuring tool 2 of the application and a part forming the main system manager body 5 and the structuring tool 6 of the system manager SM can respectively be realized by programs executed by a processor such as a central processing unit (CPU). Therefore, the hardware of the system can be realized by a processor and a storage unit which is coupled to the processor and stores programs and data.

In the first embodiment of the application grouping method and the first embodiment of the application grouping apparatus, it is possible to generate a pair or group in which arbitrary applications are linked among the applications which are independently started, without creating a parent application. In addition, the operator can create the applications without being conscious of the pairing function or the grouping function. Furthermore, even if there exist a plurality of pairs or groups in which the applications are linked, it is possible to easily identify the applications which are linked to each other because each application can be displayed in a display format that is distinguished for each pair or group. Moreover, it is also possible to freely and simply change or delete the linked application from the pair or group.

As described above, the title part d1 or the like within the window 3 of the application can be clicked by the mouse to select this application when making the pairing or grouping. In this case, the title parts d1, d2, . . . of the windows 3 of each of the applications are displayed and no problem exists in selecting the application when the windows 3 of the applications displayed on the display 11 do not overlap, the number of the windows 3 is relatively small or, the windows 3 themselves are relatively small. However, depending on the arrangement, number and size of the windows 3 that are displayed on the display 11, it is not always possible to make access to the title part of all of the windows 3 that are displayed.

Figure 44:
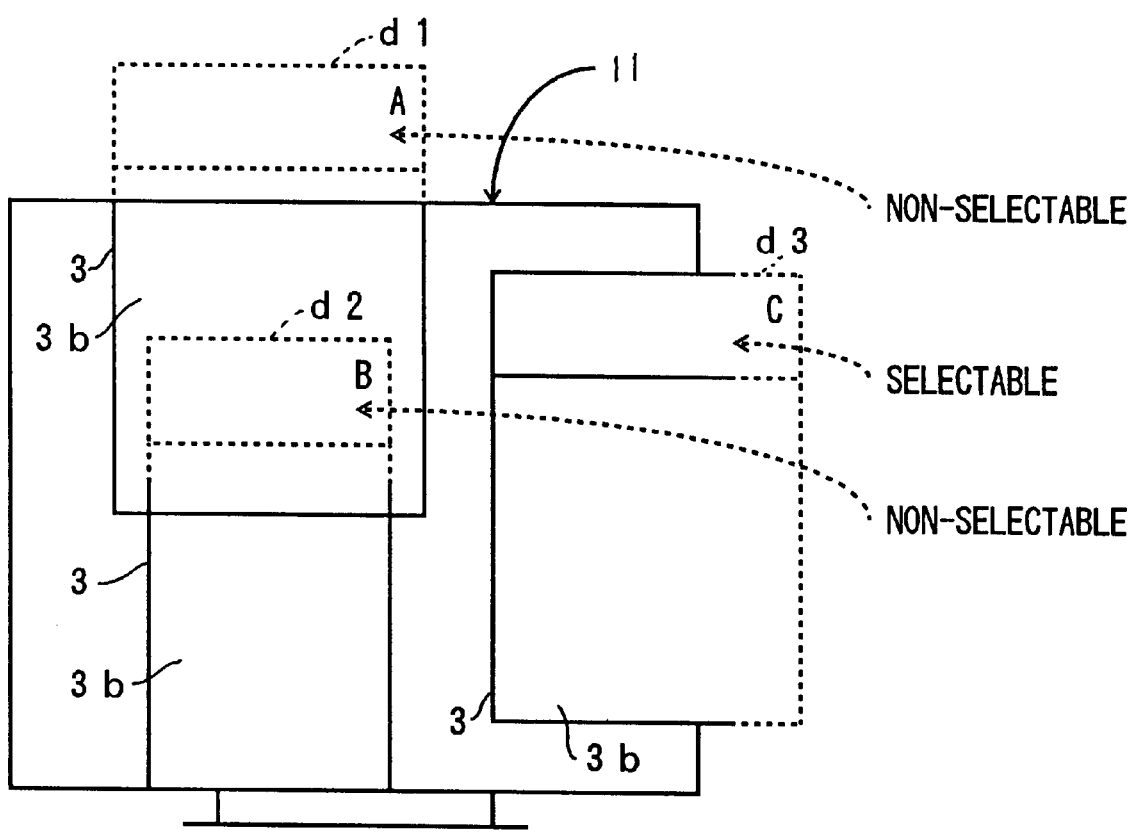
FIG. 44 is a diagram showing a case where application windows overlap and no all windows are within a displayable range of a display.

FIG. 44 is a diagram showing a case where the windows 3 of the applications are displayed in an overlapping manner and not all of the windows 3 are displayed within a displayable range of the display 11. In this case, the top portion of the window 3 of the application A including the title part d1 is outside the displayable range of the display 11, and is not visible on the display 11 as indicated by the phantom lines. In addition, the top portion of the window 3 of the application B including the title part d2 overlaps and is located under the word region 3*b* of the window 3 of the application A, and is not visible on the display 11 as indicated by the phantom lines. Furthermore, the right portion of the window 3 of the application C including the right portions of the title part d3 and the work region 3*b* is outside the displayable range of the display 11, and is not visible on the display 11 as indicated by the phantom lines. Therefore, in this case, the title parts d1 and d2 cannot be clicked by the mouse, and the range in which the title part d3 can be clicked by the mouse is narrow. For this reason, in order for the operator click the title part d1 or d2 by the mouse, the operator must first move the display position of the window 3 of the application A or B so that the title part d1 or d2 falls inside the displayable range of the display 11, and then select the application A or B. Similarly, in order to return the range in which the title part d3 can be clicked by the mouse back to the original wider range, the operator must first move the display positions of the applications A, B and C so that the entire title part d3 falls inside the displayable range of the display 11 without an overlap with the other windows 3, and then select the application C.

Next, a description will be given of an embodiment which further improves the operation ease of the operator by making it possible to select each application without the need to move the display positions of the windows 3 of the applications on the display 11 even in the case such as that shown in FIG. 44.

Figure 45A:
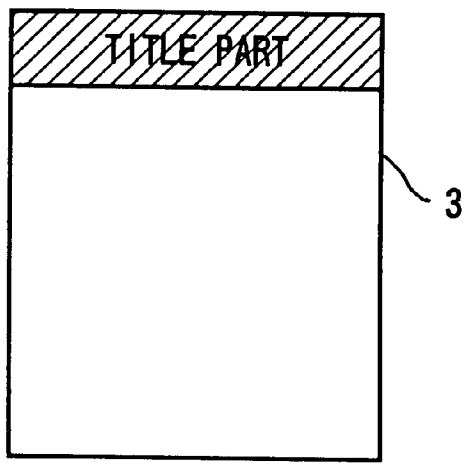
FIGS. 45A and 45B respectively are diagrams for explaining a second embodiment of the application grouping method according to the present invention.
Figure 45B:
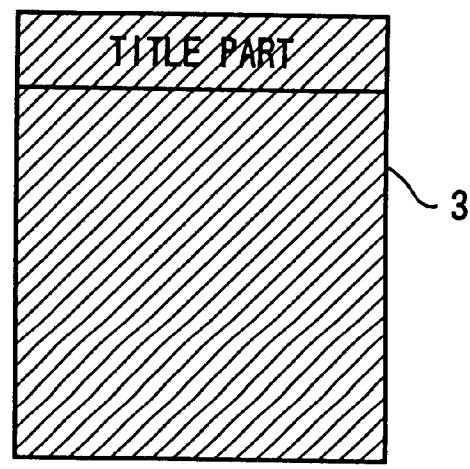

A description will be given of a second embodiment of the application grouping apparatus according to the present invention, by referring to FIGS. 45A, 45B and 46. This second embodiment of the application grouping apparatus employs a second embodiment of the application grouping method according to the present invention. The construction of the second embodiment of the application grouping apparatus is similar to that shown in FIG. 43, and an illustration and description of the construction will be omitted.

In this embodiment, the region that is selectable by the click of the mouse is not limited to the title part of the window 3 of each application, and instead, the application can be selected regardless of which part of the window 3 is clicked by the mouse. Hence, although the region of the window 3 that is clicked by the mouse to select the application is limited to the title part in the first embodiment as indicated by the hatching in FIG. 45A, any part within the window 3 can be clicked by the mouse to select the application in this second embodiment as indicated by the hatching in FIG. 45B.

Figure 46:
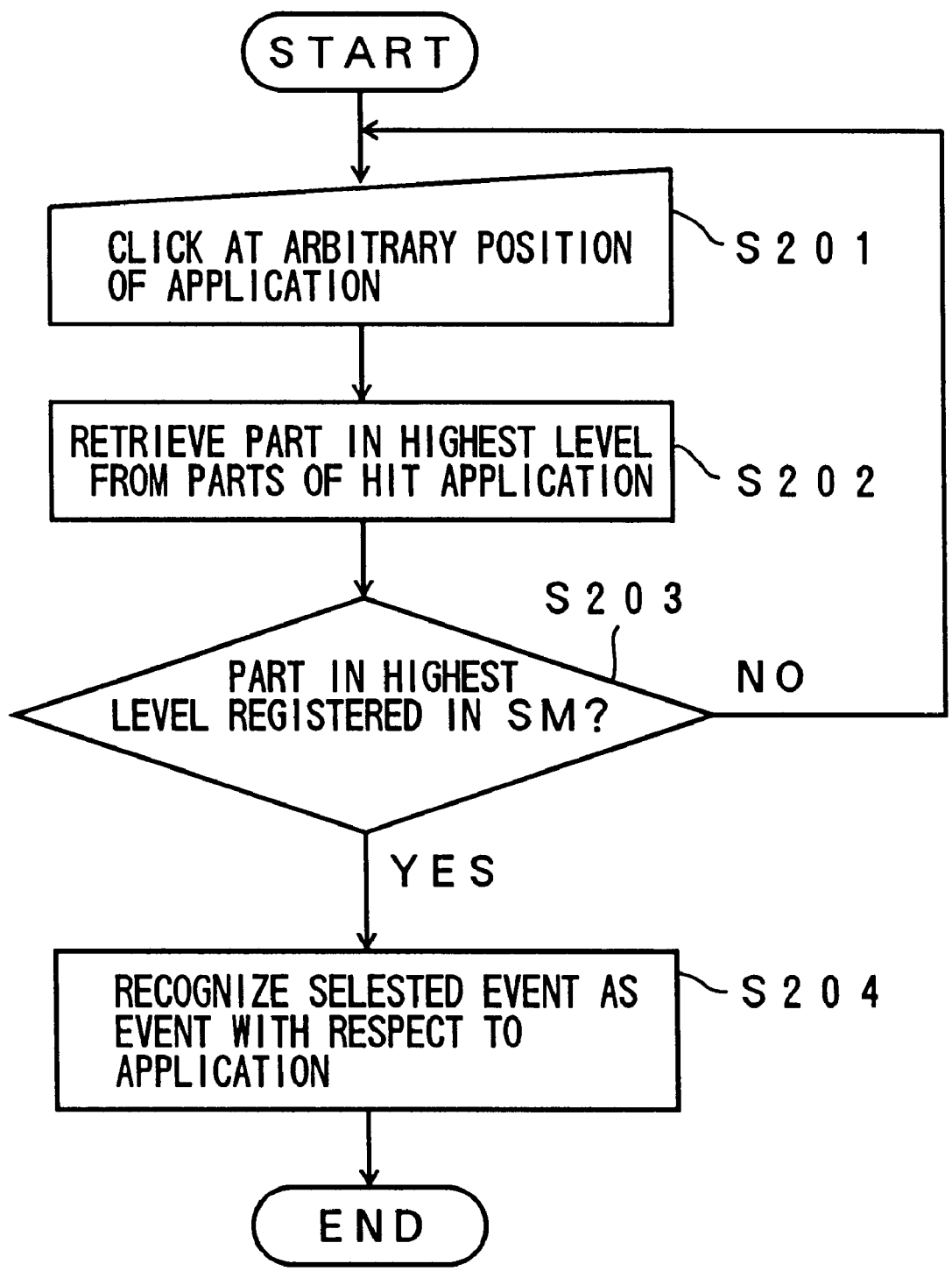
FIG. 46 is a flow chart for explaining the second embodiment of the application grouping method.

FIG. 46 is a flow chart for explaining the operation of the second embodiment. In FIG. 46, when the operator clicks the mouse at an arbitrary position within the window 3 of the application displayed on the display 11 in a step S201, a step S202 retrieves a part in the highest level of a hierarchical structure out of the parts within the hit window 3 of the application that is displayed on the display 11. A step S203 decides whether or not the part in the highest level is registered in the system manager SM, and the process returns to the step S201 if the decision result in the step S203 is NO. On the other hand, if the decision-result in the step S203 is YES, a step S204 recognizes that an event with respect to the application to which the hit window 3 belongs is selected, and the process ends. The process carried out by the steps S202 through S204 corresponds to the process of the event processor 27 shown in FIG. 43.

Figure 47:
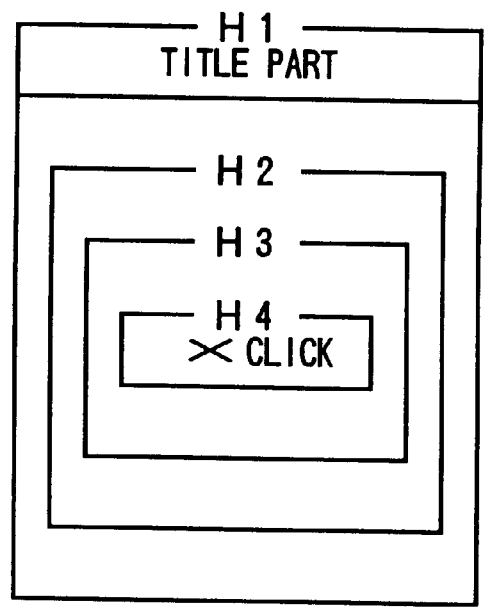
FIG. 47 is a diagram for explaining a process of judging an application to which an event belongs.

According to this embodiment, regardless of the part on which the event of the pair of group is generated in FIG. 47, a judgement is made to determine the application to which the event belongs by tracing the ancestors of the hit part in the hierarchical structure and collating the traced application with the applications that are registered in the system manager SM. In FIG. 47, H1 through H4 denote hierarchical levels of each of the parts H1 through H4 of the application, and for the sake of convenience, it is assumed that the part H1 is registered in the system manager SM as an event of the application. For example, when the part H4 is hit by clicking the mouse, the ancestors of the part H4 are traced up to the highest level of the hierarchical structure, that is, by tracing the parts H3, H2 and H1 in this sequence. In this case, the application to which the part H1 (event) belongs is selected because the part H1 is registered in the system manager SM.

The operator may make an erroneous operation and erroneously change or cancel the application that is already paired or grouped. In such a case, the pairing or grouping may be carried out again to correct the erroneous input. However, the operation of carrying out the pairing or grouping again is troublesome for the operator. In addition, the operator must be very careful when making the operation so as not to make an erroneous operation, particularly when making the operation for the second time to correct an erroneous input. Therefore, it would be very useful if the operation ease can further be improved to reduce the load on the operator, and a description will now be given of a function which can realize such a further improvement.

Figure 48:
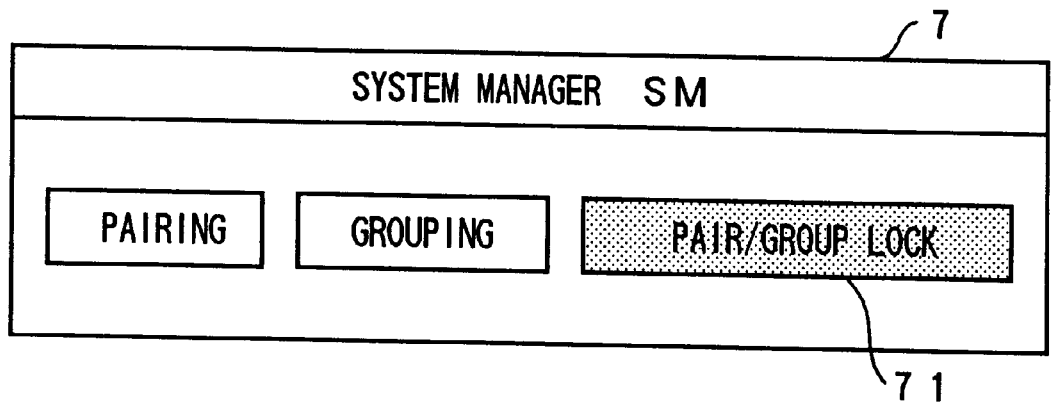
FIG. 48 is a diagram showing a pair/group lock command button provided within the window of the system manager.

FIGS. 48 through 52 are diagrams for explaining a pairing/grouping cancel prohibit function. FIG. 48 is a diagram showing a pair/group lock command button 71 which is provided within the window 7 of the system manager SM and is used to select the pairing/grouping cancel prohibit function. When the pair/group lock command button 81 is clicked by the mouse after the pairing or grouping is made and the pair or group to be prohibited from being cancelled is selected, the locked pair or group cannot be cancelled even when the cancel command button 7-2 or 7-4 is manipulated. The locked pair or group cannot be cancelled until the pair/group lock command button 71 is turned OFF by clicking the pair/group lock command button 71 by the mouse for the second time.

Figure 49:
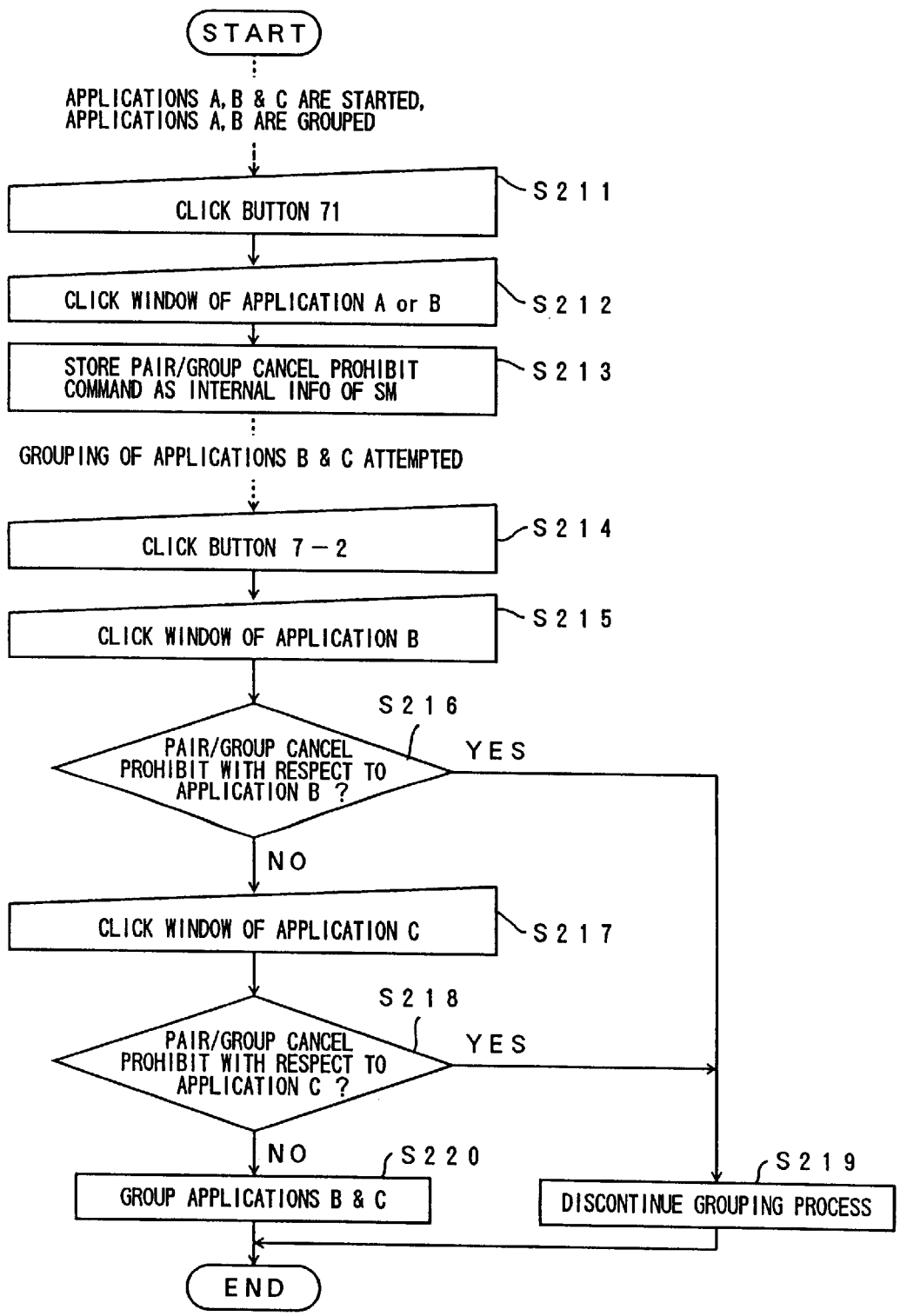
FIG. 49 is a flow chart for explaining a pairing/grouping cancel prohibit function.
Figure 51:
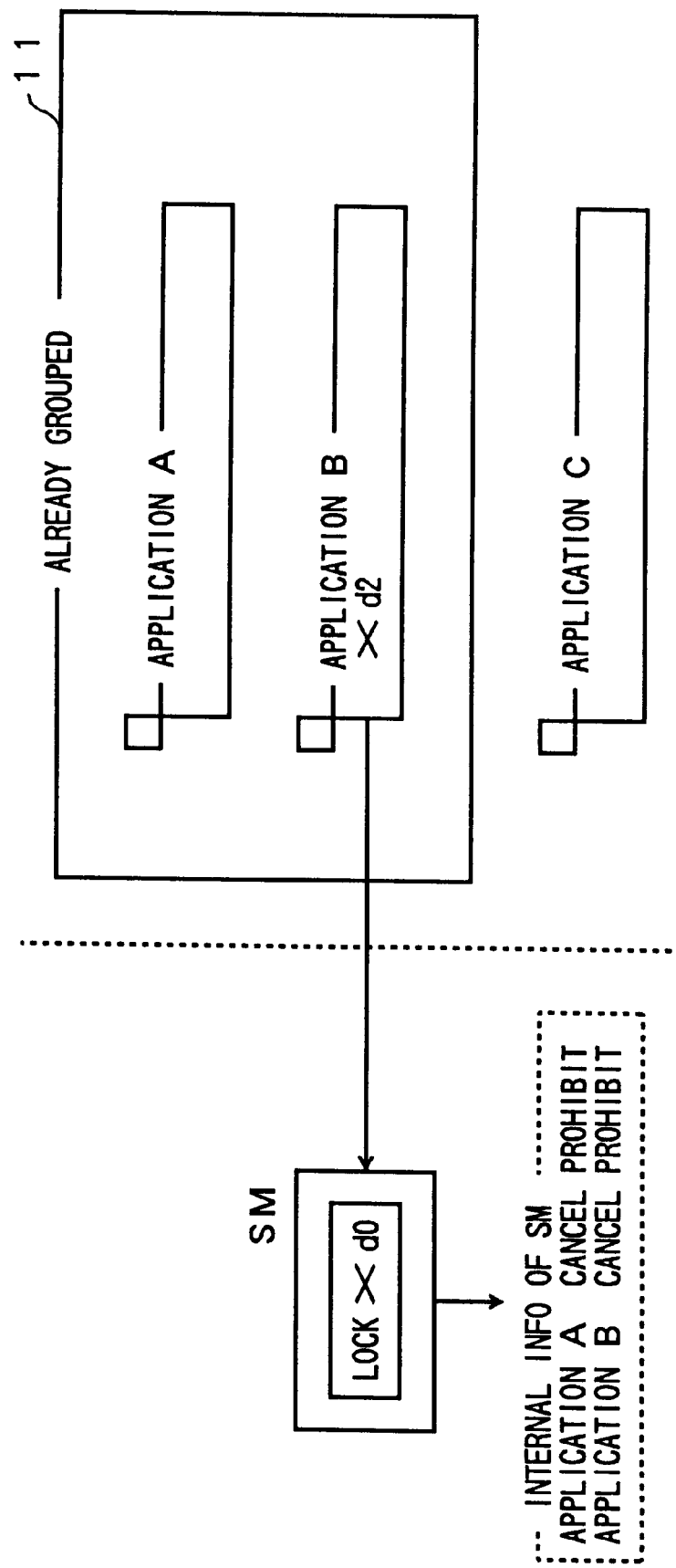
FIG. 51 is a diagram for explaining the pairing/grouping cancel prohibit function.

FIG. 49 is a flow chart for explaining the pairing/grouping cancel prohibit function. For the sake of convenience, it is assumed that the applications A through C are already started, and that the applications A and B are already paired as shown in FIG. 50.

In FIG. 49, the operator turns the pair/group lock command button 71 ON by clicking the mouse at the pair/group lock command button 71 within the window 7 of the system manager SM in a step S211, thereby selecting the pairing/grouping cancel prohibit function. In a step S212, the operator selects the pairing which is to be prohibited from being cancelled by clicking the mouse within the window 3 of one of the applications A and B which are already paired. In the case shown in FIG. 51, the window 3 of the application B is hit. In a step S213, a notification is made to notify the system manager SM that a pair/group cancel prohibit command is issued with respect to the application B to which the window 3 hit in the step S212 belongs. In addition, the step S213 turns ON a pair/group cancel prohibit flag FLGB with respect to the application B to store the pair/group cancel prohibit command issued with respect to the application B as internal information of the system manager SM.

Figure 52:
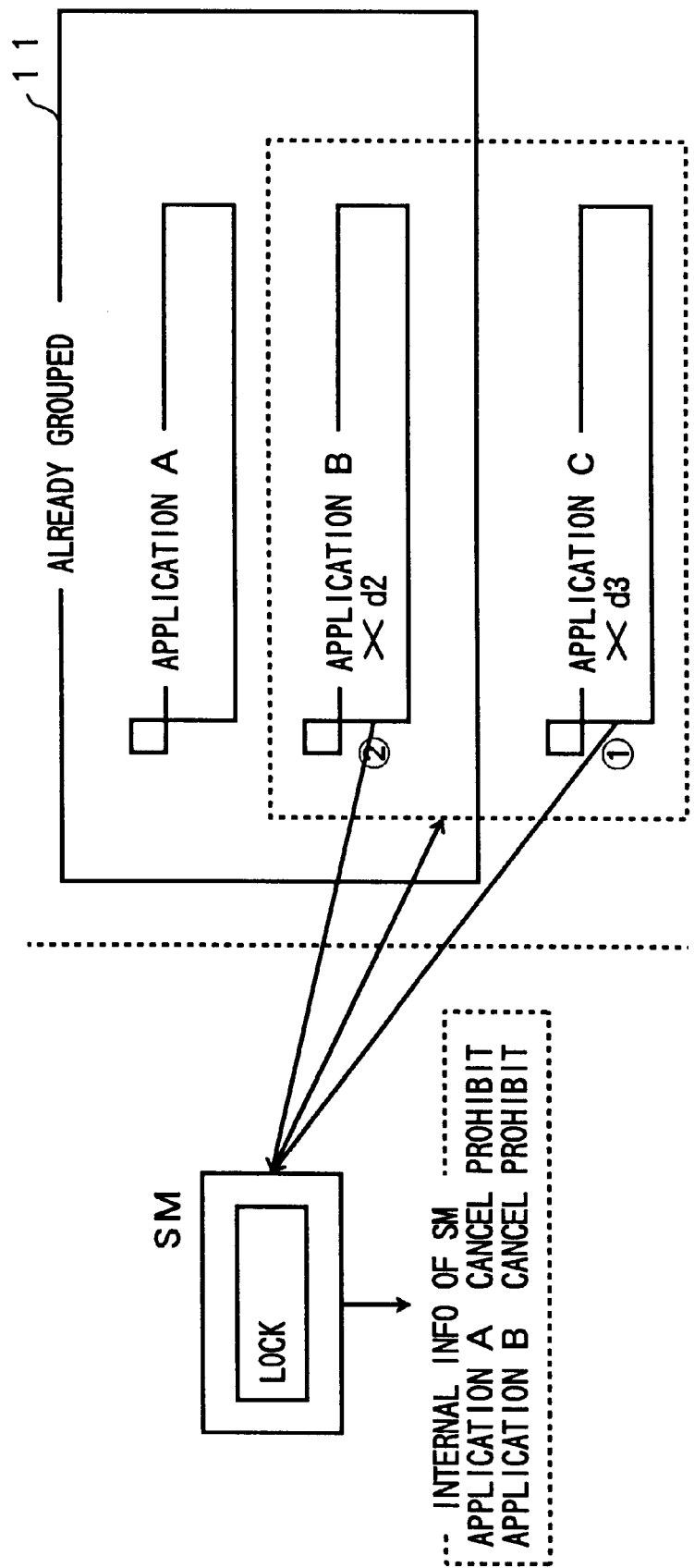
FIG. 52 is a diagram for explaining the pairing/grouping cancel prohibit function.

Thereafter, in a step S214, the operator clicks the mouse at the pairing command button 7-2 in order to pair the applications B and C. Then, the operator first clicks the window 3 of the application B in a step S215 as shown in FIG. 52. A step S216 decides whether or not the pair/group cancel prohibit flag FLGB with respect to the application B is ON. In this particular case, the pair/group cancel prohibit flag FLGB is ON and the decision result in the step S216 is YES. Hence, the pairing is discontinued in a step S219, and the process ends.

On the other hand, if the decision result in the step S216 is NO, the operator clicks the window 3 of the application C in a step S217. A step S218 decides whether or not a pair/group cancel prohibit flag FLGC with respect to the application C is ON, and the process advances to the step S219 if the decision result in the step S218 is YES. In addition, if the decision result in the step S218 is NO, a pairing process is carried out with respect to the applications B and C in a step S220. The pairing process that is carried out in this case is the same as that of the first embodiment described above.

The cancelling of the grouping can be prohibited similarly to prohibiting the cancelling of the pairing.

Therefore, by providing the pairing/grouping cancel prohibit function, it is possible to prevent the pair or group from being cancelled by an erroneous operation made by the operator. As a result, it is possible to reduce the load on the operator and also improve the operation ease of the system.

Before the application is started, it may be known in advance that a pairing or grouping process is to be carried out. In such a case, it would be very convenient if the pairing or grouping process is carried out automatically without the need to carry out the series of operations associated with the pairing or grouping process. Hence, a description will now be given of an automatic grouping function.

Figure 53:
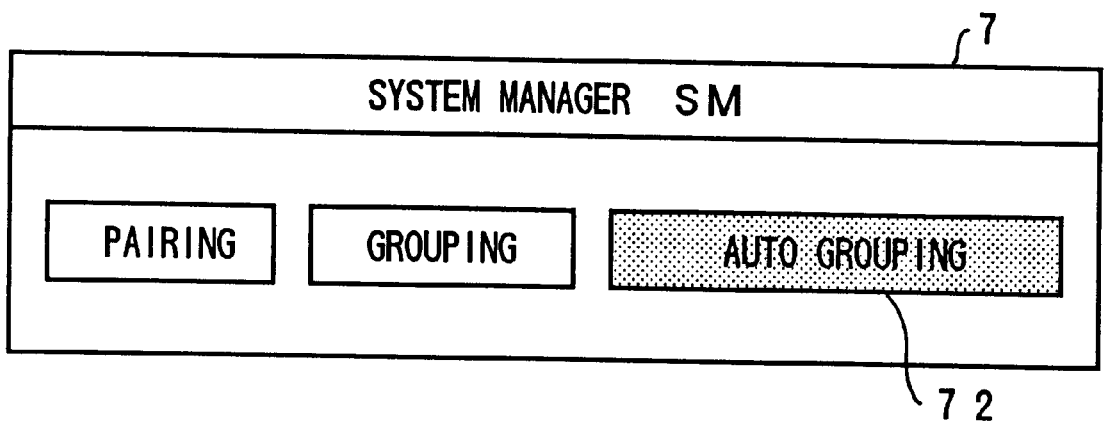
FIG. 53 is a diagram showing an automatic grouping command button provided within the window of the system manager.

FIGS. 53 through 60 are diagrams for explaining the automatic grouping function. FIG. 53 is a diagram showing an automatic grouping command button 72 which is provided within the window 7 of the system manager SM and is used to select the automatic grouping function. When the automatic grouping command button 72 is clicked by the mouse and turned ON before the application is started, the grouping process which includes the pairing process is carried out automatically every time an application is selected and started.

The automatic grouping function can generally be categorized into a new group type, a group adding type, and a group reserve type. According to the new group type automatic grouping function, an application that is started after selecting this new group type automatic grouping function is automatically grouped by distinguishing the group from existing groups. According to the group adding type automatic grouping function, an application that is started after selecting this group adding type automatic grouping function is automatically added to an existing group. In addition, according to the group reserve type automatic grouping function, a combination of the applications to be grouped is registered in advance in the system manager SM. When an application belonging to the registered combination is selected after selecting the group reserve type automatic grouping function, the application of the registered combination is automatically grouped in accordance with the reservation.

Figure 54:
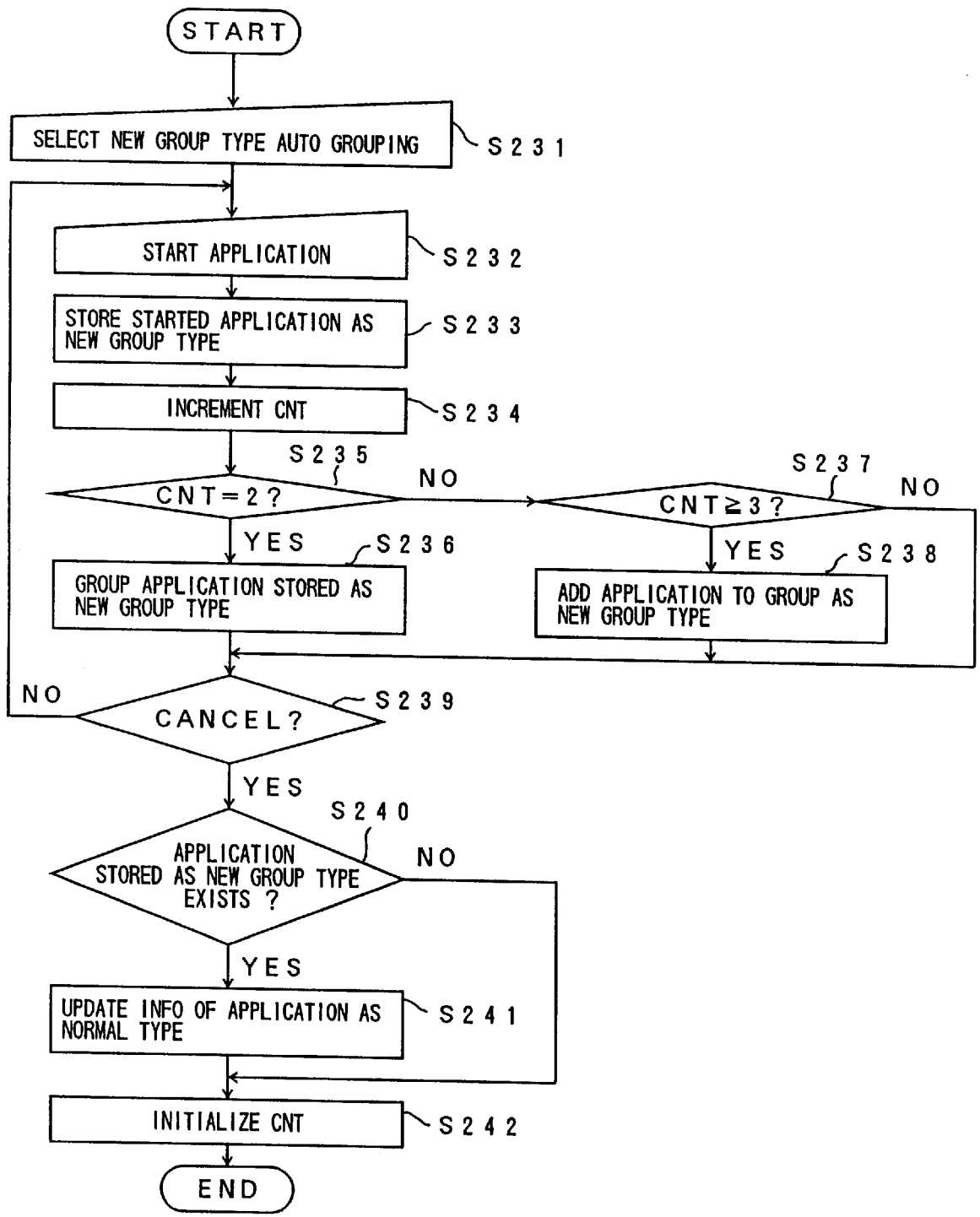
FIG. 54 is a flow chart for explaining a new group type automatic grouping function.

FIG. 54 is a flow chart for explaining a new group type automatic grouping function. For the sake of convenience, it is assumed that a new group is automatically generated when 2 or more applications are started after selecting this new group type automatic grouping function.

In FIG. 54, the operator clicks the mouse at the automatic grouping command button 72 or the like in a step S231, and turns ON the automatic grouping command button 72 to select the new group type automatic grouping function. In a step S232, the operator selects an application and this application is started. A step S233 stores the started application into the system manager SM as being of the new group type. More particularly, the system manager SM turns ON and stores a new group type flag FLGN with respect to the new group type application.

A step S234 increments a counter within the system manager SM. A step S235 decides whether or not a counted value CNT of the counter is "2". If the decision result in the step S235 is YES, a step S236 automatically groups the application which is stored in the system manager SM as being of the new group type, that is, the application with respect to which the new group type flag FLGN is turned ON, and the process advances to a step S239. On the other hand, if the decision result in the step S235 is NO, a step S237 decides whether or not the counted value CNT of the counter is "3" or greater. The process advances to the step S239 if the decision result in the step S237 is NO. If the decision result in the step S237 is YES, a step S238 adds the application with respect to which the new group type flag FLGN is turned ON to the group of applications which are grouped as being of the new group type, and the process advances to the step S239.

The step S239 decides whether or not the automatic grouping command button 72 is clicked by the mouse and turned OFF, and the process returns to the step S232 if the decision result in the step S239 is NO. Of course, a cancel button (not shown) may be provided in the window 7 of the system manager SM to be manipulated when cancelling one of the various functions. In this case, the new group type automatic grouping function can be cancelled by manipulating such a cancel button.

If the decision result in the step S239 is YES, a step S240 decides whether or not an application is stored in the system manager SM as being of the new group type, that is, whether or not the application with respect to which the new group type flag FLGN is turned ON exists. If the decision result in the step S240 is YES, a step S241 updates the application which is stored as being of the new group type as an application of the normal type. In other words, the step S241 turns OFF the new group type flag FLGN that is ON. After the step S241 or when the decision result in the step S240 is NO, a step S242 initializes the counted value CNT of the counter, and the process ends.

Figure 55A:
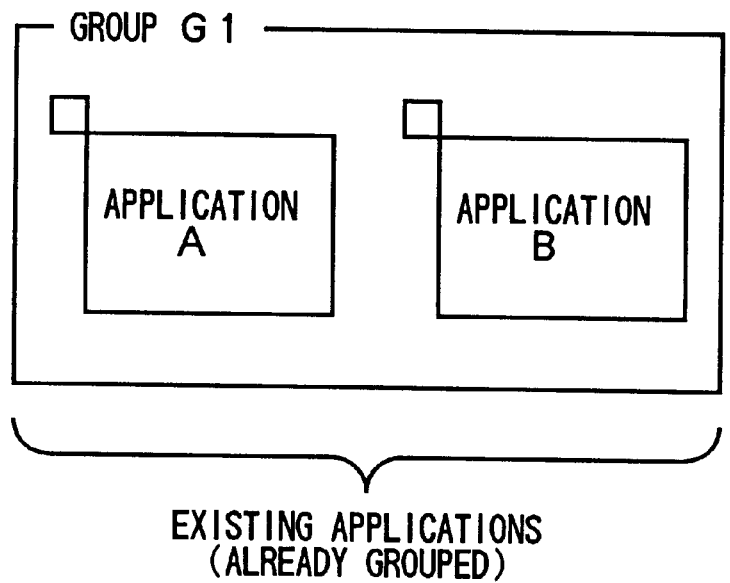
FIGS. 55A and 55B respectively are diagrams for explaining the new group type automatic grouping function.
Figure 55B:
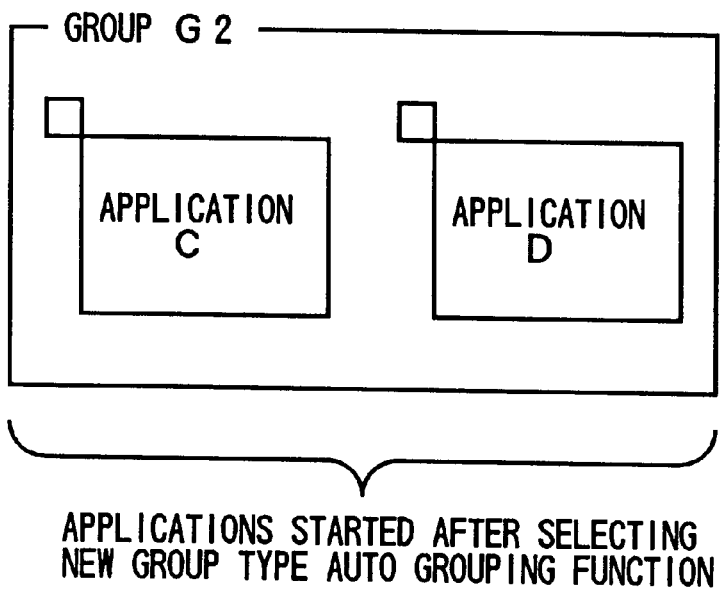

Therefore, if the applications A and B are already grouped to form a group G1 as shown in FIG. 55A and the new group type automatic grouping function is selected in this state, the applications C and D are automatically grouped to form a new group G2 as shown in FIG. 55B when the applications C and D are thereafter started. Hence, the operator does not need to specify the grouping of the applications C and D, and the grouping of the applications can be made by a simple operation.

Figure 56:
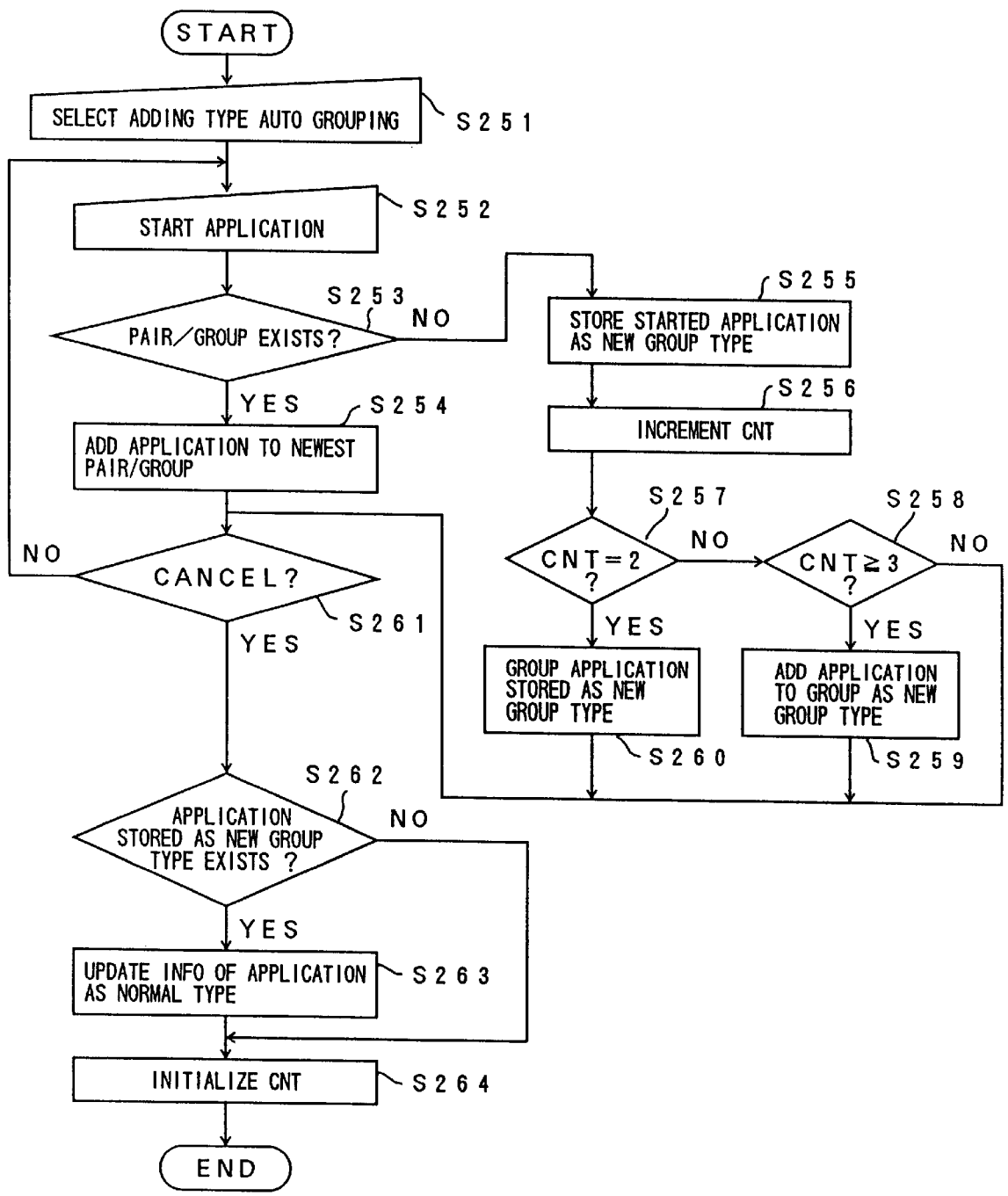
FIG. 56 is a flow chart for explaining a group adding type automatic grouping function.

FIG. 56 is a flow chart for explaining the group adding type automatic grouping function.

In FIG. 56, the operator clicks the mouse at the automatic grouping command button 72 or the like in a step S251, and turns ON the automatic grouping command button 72 to select the group adding type automatic grouping function. In a step S252, the operator selects an application and this application is started. A step S253 confirms information stored in the system manager SM, and decides whether or not a group which includes a pair exists. If the decision result in the step S253 is YES, a step S254 adds the started application to a newest group, and the process advances to a step S261.

On the other hand, if the decision result in the step S253 is NO, a step S255 stores the started application in the system manager SM as being of the new group type. More particularly, the system manager SM turns ON and stores the new group type flag FLGN with respect to the new group type application. A step S256 increments a counter within the system manager SM. A step S257 decides whether or not the counted value CNT of the counter is "2". If the decision result in the step S257 is YES, a step S260 automatically groups the application which is stored in the system manager SM as being of the new group type, that is, the application with respect to which the new group type flag FLGN is turned ON, and the process advances to the step S261. On the other hand, if the decision result in the step S257 is NO, a step S258 decides whether or not the counted value CNT of the counter is "3" or greater. The process advances to the step S261 if the decision result in the step S258 is NO. If the decision result in the step S258 is YES, a step S259 adds the application with respect to which the new group type flag FLGN is ON to the group of applications which are grouped as being of the new group type, and the process advances to the step S261.

The step S261 decides whether or not the automatic grouping command button 72 is clicked by the mouse and turned OFF. The process returns to the step S252 if the decision result in the step S261 is NO. Of course, the cancel button (not shown) may be provided in the window 7 of the system manager SM to be manipulated when cancelling one of the various functions. In this case, the group adding type automatic grouping function can be cancelled by manipulating such a cancel button.

If the decision result in the step S261 is YES, a step S262 decides whether or not an application is stored in the system manager SM as being of the new group type, that is, whether or not the application with respect to which the new group type flag FLGN is turned ON exists. If the decision result in the step S262 is YES, a step S263 updates the application which is stored as being of the new group type as an application of the normal type. In other words, the step S263 turns OFF the new group type flag FLGN that is ON. After the step S263 or when the decision result in the step S262 is NO, a step S264 initializes the counted value CNT of the counter, and the process ends.

Figure 57:
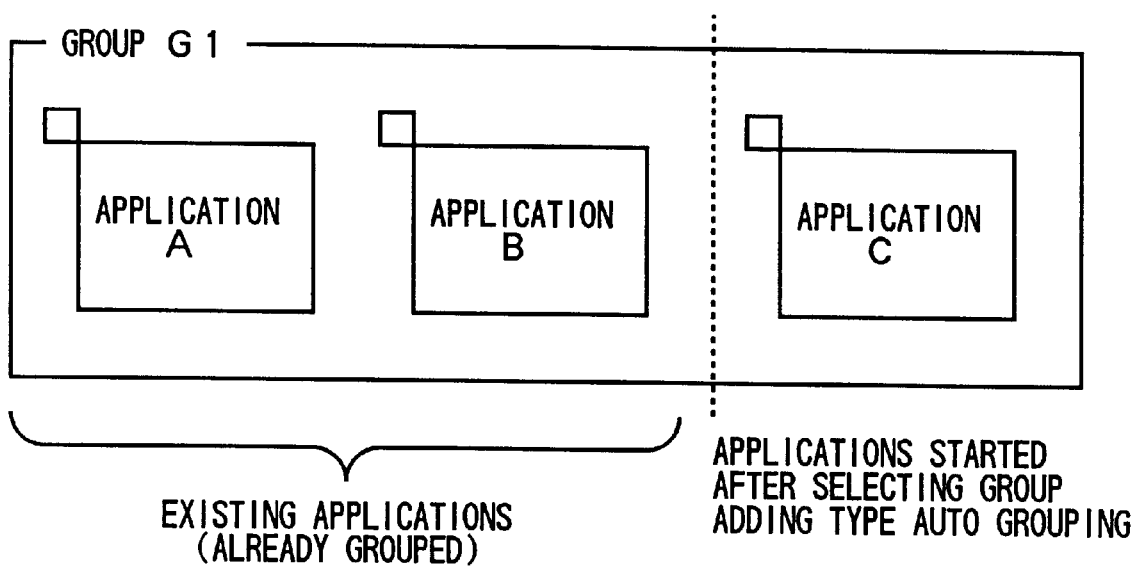
FIG. 57 is a diagram for explaining the group adding type automatic grouping function.

Therefore, if the applications A and B are already grouped to form a group G1 as shown in FIG. 57 and the group adding type automatic grouping function is selected in this state, the application C is automatically added to the group G1 as shown in FIG. 57 when the application C is thereafter started. Hence, the operator does not need to specify the grouping of the application C, and the grouping of the applications can be made by a simple operation. When there is o existing group, the operation becomes substantially the same as that of the new group type automatic grouping function described above.

Figure 58:
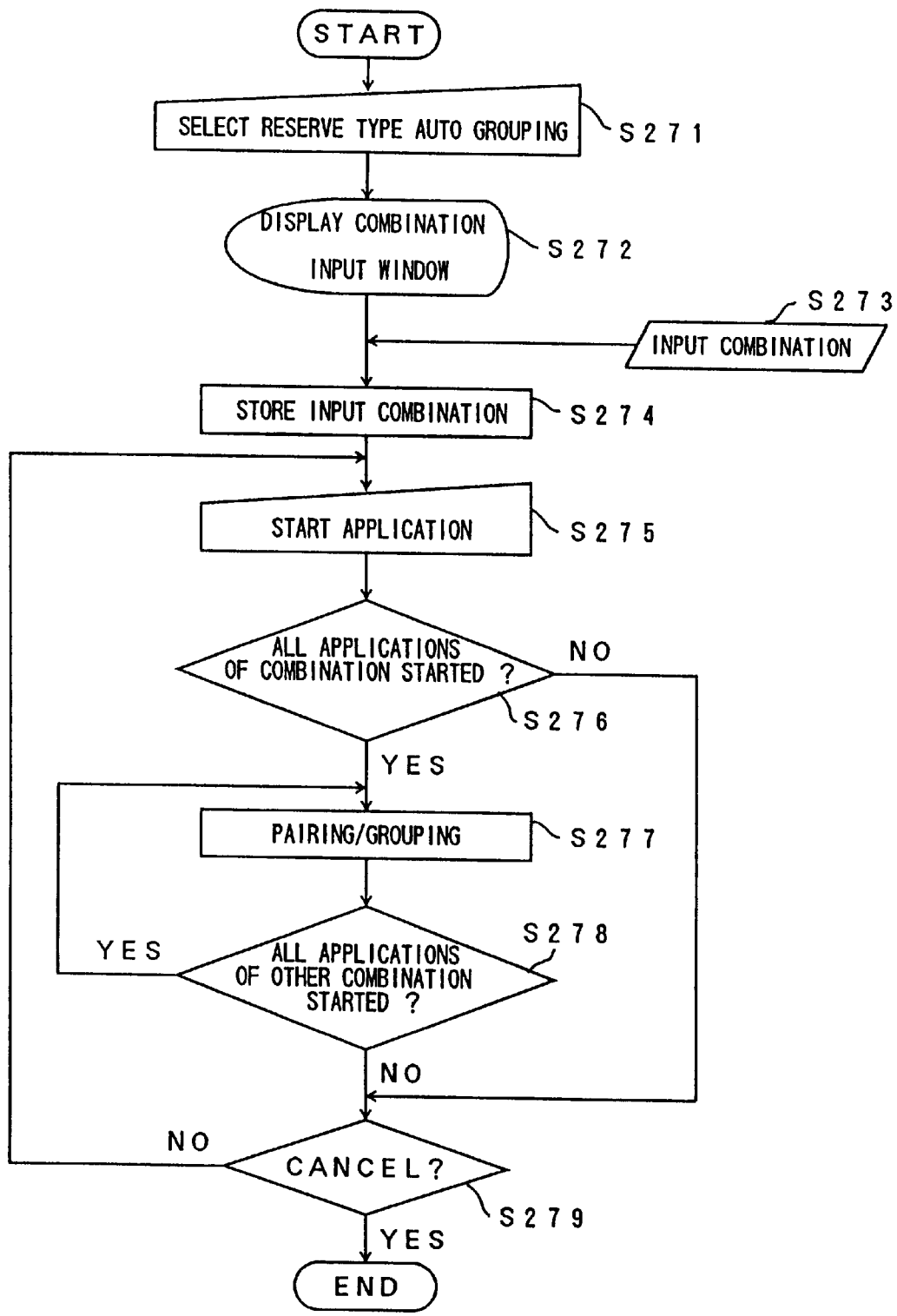
FIG. 58 is a flow chart for explaining a group reserve type automatic grouping function.

FIG. 58 is a flow chart for explaining the group reserve type automatic grouping function.

In FIG. 58, the operator clicks the mouse at the automatic grouping command button 72 or the like in a step S271, and turns ON the automatic grouping command button 72 to select the group reserve type automatic grouping function. A step S252 displays a window for inputting the combination of the applications on the display, and the operator inputs the combination of the applications to be reserved in a step S273 from the keyboard, text file or the like. A step S274 stores the input combination of the applications, that is, the reserved combination, in the system manager SM. The operator selects and starts an application in a step S275.

A step S276 decides whether or not all of the applications included in the reserved combination are started. If the decision result in the step S276 is YES, a step S277 groups the started applications which are included in the reserved combination. A step S278 decides whether or not all of the applications included in another reserved combination are started, and the process returns to the step S277 if the decision result in the step S278 is YES. If the decision result in the step S278 or S276 is NO, a step S279 decides whether or not the automatic grouping command button 72 is clicked by the mouse and turned OFF. The process returns to the step S275 if the decision result in the step S279 is NO. Of course, the cancel button (not shown) may be provided in the window 7 of the system manager SM to be manipulated when cancelling one of the various functions. In this case, the group reserve type automatic grouping function can be cancelled by manipulating such a cancel button. The process ends if the decision result in the step S279 is YES.

Figure 59:
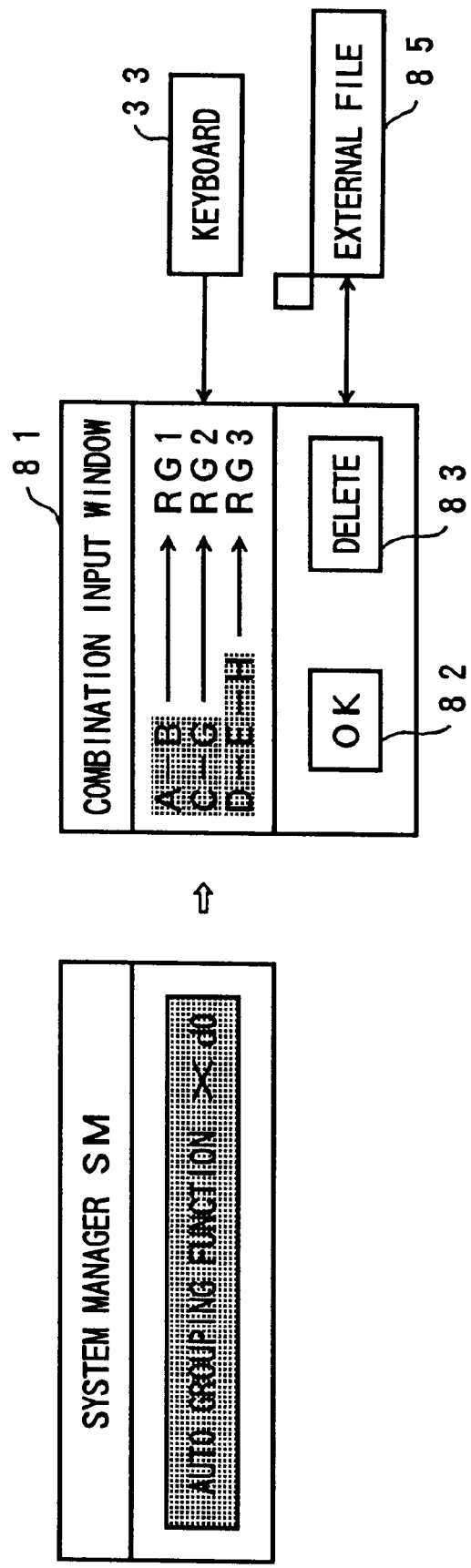
FIG. 59 is a diagram for explaining the group reserve type automatic grouping function.

Therefore, when the group reserve type automatic grouping function is selected, a combination input window 81 shown in FIG. 59 is displayed on the display 11, for example. In this particular case, a reserved combination RG1 is made up of the applications A and B, a reserved combination RG2 is made up of the applications C and G, and a reserved combination RG3 is made up of the applications D, E and H. Each of the reserved combinations RG1 through RG3 can be set by manipulating an OK-button 82 within the combination input window 81 and be deleted by manipulating a delete button 83. As described above, each of the reserved combinations RG1 through RG3 can be input from the keyboard 33, an external file 85 or the like.

Figure 60:
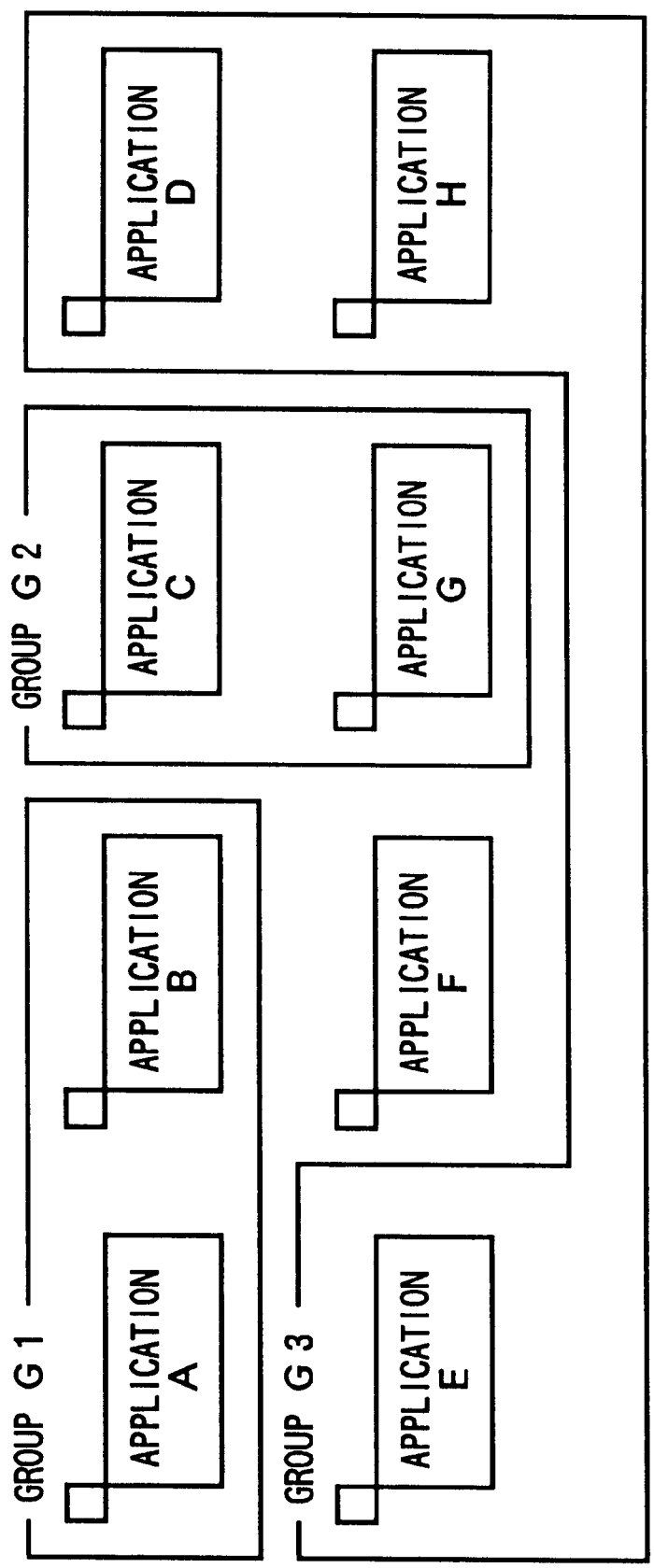
FIG. 60 is a diagram for explaining the group reserve type automatic grouping function.

FIG. 60 is a diagram for explaining the automatic grouping for a case where the applications A through H are started in this sequence after the group reserve type automatic grouping function is selected. In this particular case, the reserved combination RG1 stands when the applications A and B, that is, the applications up to the application B are started, and the group G1 is created. In addition, the reserved combination RG2 stands when the applications A through G, that is, the applications up to the application G are started, and the group G2 is created. Furthermore, the reserved combination RG3 stands when the applications A through H, that is, the applications up to the application H are started, and the group G3 is created.

Accordingly, when the group reserve type automatic grouping function is employed and the combinations of the applications are reserved and registered in the system manager SM, it becomes unnecessary to re-group the applications regardless of how many times the end and start of the applications are repeated. In addition, the combination of the applications to be reserved can be input and output between the system manager SM and the external file 85, and the external file 85 can be written from an editor. Moreover, it is possible to store the information related to the reserved combination that is once made. Therefore, even in a case where the system manager SM is once ended and re-started thereafter, it is unnecessary to input the same combination again.

Further, the present invention is not limited to these embodiments, but various variations and modifications may be made without departing from the scope of the present invention.

What is claimed is:

1. An application program grouping method which specifies a group in a multi-window system, said group being a combination of application programs which carry out a process by linking with each other, said multi-window system being capable of simultaneously executing in parallel a plurality of application programs respectively having one or a plurality of conversational or interactive windows that are displayed on a display, said application program grouping method comprising the steps of:

(a) dynamically specifying at least two of said application programs which are to belong to one group in said multi-window system capable of simultaneously executing said at least two of said application programs in parallel to manipulate a set data by a first application program of said at least two application programs and simultaneously processing said set of data by at least a second application program of said at least two application programs while said first application program processes said set of data;

(b) carrying out a grouping process which automatically generates one group made up of said at least two of said application programs which are linked together by said grouping process to carry out said process in said combination in said multi-window system, said grouping process being carried out using a common conversational or interactive window system structuring tool that is included in each of the application programs; and (c) automatically changing during the grouping process, a display format of the window of each of the application programs belonging to said one group to a display format which is the same within said one group but is different from a display format of the window of an application program not belonging to said one group.

2. The application program grouping method as claimed in claim 1, wherein said step (a) specifies a predetermined application program to be included in said one group on the display.

3. The application program grouping method as claimed in claim 2, wherein said step (a) specifies the predetermined application program to be included in said one group by hitting an arbitrary position within the window of the predetermined application program by a pointing device.

4. The application program grouping method as claimed in claim 2, wherein said step (a) selects the predetermined application program to be included in said one group from a list of application programs displayed on the display.

5. The application program grouping method as claimed in claim 1, wherein said step (c) changes the display format by changing a background color within the window displayed on the display or a color of a frame of the window displayed on the display.

6. The application program grouping method as claimed in claim 1, wherein said step (c) changes the display format of the window of each of the application programs belonging to said one group so that the display format during the grouping process is different from the display format after completion of the grouping process.

7. The application program grouping method as claimed in claim 1, wherein said steps (b) and (c) include a function which generates the window of the application program, a communication function which communicates between the application programs and a function which represents grouping of the application programs by use of the communication function, and automatically changing the grouping process and a display format of the window in each application program using the common conversational or interactive window system structuring tool that is included in each of the application programs.

8. The application program grouping method as claimed in claim 7, wherein the grouping process of said step (b) is managed by a system manager which is startable independently of the application programs, and exchange of information necessary for the grouping process is carried out by the conversational or interactive window system structuring tool of the application programs and a structuring tool included in the system manager, said structuring tool of the system manager having the same construction as the conversational or interactive window system structuring tool of the application programs.

9. The application program grouping method as claimed in claim 8, wherein said step (c) manages information related to the display format, including color, of the windows of the application programs by the system manager.

10. The application program grouping method as claimed in claim 8, which further comprises the steps of:

(d) storing in the system manager cancel prohibit information related to a group which is prohibited from being cancelled; and (e) determining whether or not to cancel the group based on the cancel prohibit information stored in the system manager when a group cancel request is generated.

11. The application program grouping method as claimed in claim 8, which further comprises the steps of:
- (d) storing in the system manager grouping information related to application programs which are to be automatically grouped when an automatic grouping request is generated; and
- (e) automatically carrying out the grouping process with respect to the application programs based on the grouping information stored in the system manager when an application program is started after the automatic grouping request is generated.

12. The application program grouping method as claimed in claim 11, wherein the automatic grouping request is selected from a group consisting of:
- a new group automatic grouping request which requests automatic grouping of each application program started after generation of the automatic grouping request as a new group;
- a group adding type automatic grouping request which requests automatic grouping such that each application program started after generation of the automatic grouping request is added to an existing group; and
- a group reserve type automatic grouping request which requests automatic grouping of each application program started after generation of the automatic grouping request if each started application is included in a reserved group.

13. An application program grouping apparatus which specifies a group in a multi-window system, said group being a combination of application programs which carry out a process by linking with each other, said multi-window system being capable of simultaneously executing in parallel a plurality of application programs respectively having one or a plurality of conversational or interactive windows that are displayed on a display, said application program grouping apparatus comprising:
- first means for dynamically specifying at least two of said application programs which are to belong to one group in said multi-window system capable of simultaneously executing said at least two of said application programs in parallel and manipulating a set data by a first application program of said at least two application programs and simultaneously processing said set of data by at least a second application program of said at least two application programs while said first application program manipulates said set of data; and
- second means for carrying out a grouping process which automatically generates one group made up of said at least two of said application programs which are linked together by said grouping process to carry out said process said combination in said multi-window system, said grouping process being carried out using a common conversational or interactive window system structuring tool that is included in each of the application programs; and
- third means for automatically changing, during the grouping process, a display format of the window of each of the application programs belonging to said one group to a display format which is the same within said one group but is different from a display format of the window of an application program not belonging to said one group.

14. The application program grouping apparatus as claimed in claim 13, wherein said first means includes means for specifying a predetermined application program to be included in said one group on the display.

15. The application program grouping apparatus as claimed in claim 14, wherein said first means includes a pointing device which specifies the predetermined application program to be included in said one group by hitting an arbitrary position within the window of the predetermined application program.

16. The application program grouping apparatus as claimed in claim 14, wherein said first means includes means for selecting the predetermined application program to be included in said one group from a list of application programs displayed on the display.

17. The application program grouping apparatus as claimed in claim 13, wherein said third means includes means for changing the display format by changing a background color within the window displayed on the display or a color of a frame of the window displayed on the display.

18. The application program grouping apparatus as claimed in claim 13, wherein said third means includes means for changing the display format of the window of each of the application programs belonging to said one group so that the display format during the grouping process is different from the display format after completion of the grouping process.

19. The application program grouping apparatus as claimed in claim 13,
- wherein the common conversational or interactive window system structuring tool included in each of the application programs has a function which generates the window of the application program, a communication function which communicates between the application programs and a function which represents grouping of the application programs by use of the communication function, and
- said second means and said third means automatically changing the grouping process and a display format of the window in each application program using said common conversational or interactive window system structuring tool.

20. The application program grouping apparatus as claimed in claim 19, which further comprises:
- a system manager startable independently of the application programs,
- said system manager including structuring tool which has the same construction as the conversational or interactive window system structuring tool of the application programs,
- said system manager managing the grouping process of said second means,
- exchange of information necessary for the grouping process being carried out by the conversational or interactive window system structuring tool of the application programs and the structuring tool included in the system manager.

21. The application program grouping apparatus as claimed in claim 20, wherein said third means manages information related to the display format, including color, of the windows of the application programs by the system manager.

22. The application program grouping apparatus as claimed in claim 20, which further comprises:
- fourth means for storing in the system manager cancel prohibit information related to a group which is prohibited from being cancelled; and
- fifth means for determining whether or not to cancel the group based on the cancel prohibit information stored in the system manager when a group cancel request is generated.

23. The application program grouping apparatus as claimed in claim 20, which further comprises:

fourth means for storing in the system manager grouping information related to application programs which are to be automatically grouped when an automatic grouping request is generated; and fifth means for automatically carrying out the grouping process with respect to the application programs based on the grouping information stored in the system manager when an application program is started after the automatic grouping request is generated.

24. The application program grouping apparatus as claimed in claim 23, wherein the automatic grouping request is selected from a group consisting of:

a new group automatic grouping request which requests automatic grouping of each application program started after generation of the automatic grouping request as a new group;

a group adding type automatic grouping request which requests automatic grouping such that each application program started after generation of the automatic grouping request is added to an existing group; and a group reserve type automatic grouping request which requests automatic grouping of each application program started after generation of the automatic grouping request if each started application is included in a reserved group.

* * * * *